May 24, 1938.  A. F. DITTMER  2,118,173
ISEIKONIC SPECTACLES AND THEIR MANUFACTURE
Filed Oct. 18, 1934   17 Sheets-Sheet 1
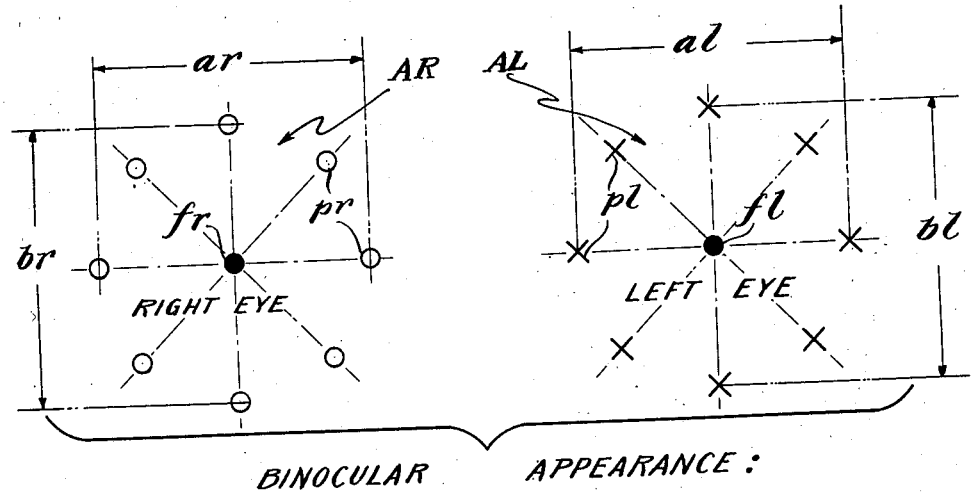
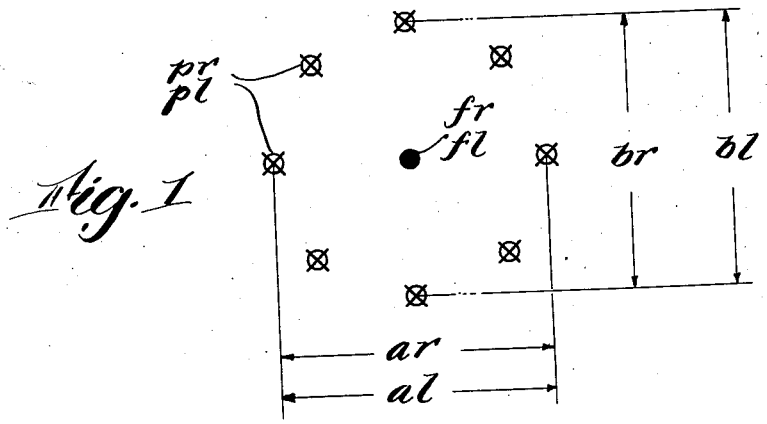
Fig. 1
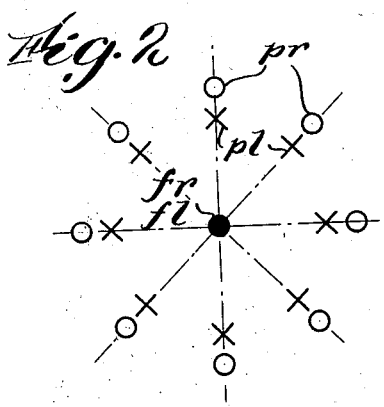
Fig. 2
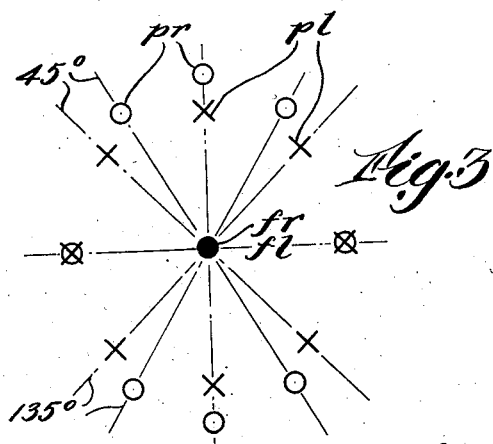
Fig. 3
Inventor
Arthur F. Dittmer
By Roberts, Cushman & Woodbury
Attys.

May 24, 1938.  A. F. DITTMER  2,118,173
ISEIKONIC SPECTACLES AND THEIR MANUFACTURE
Filed Oct. 18, 1934    17 Sheets-Sheet 2
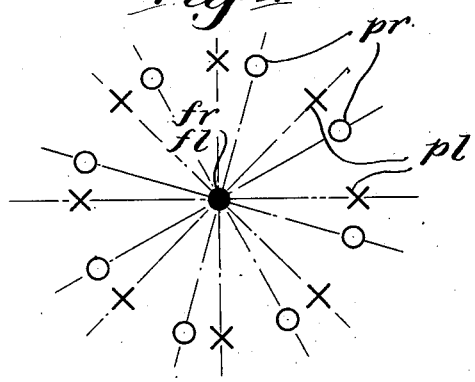
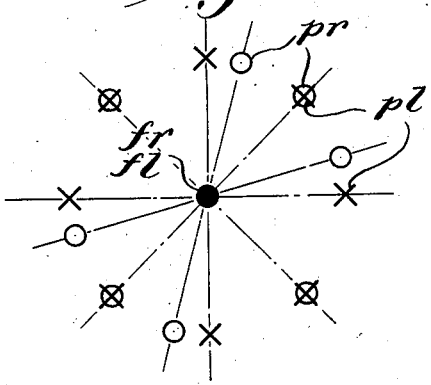
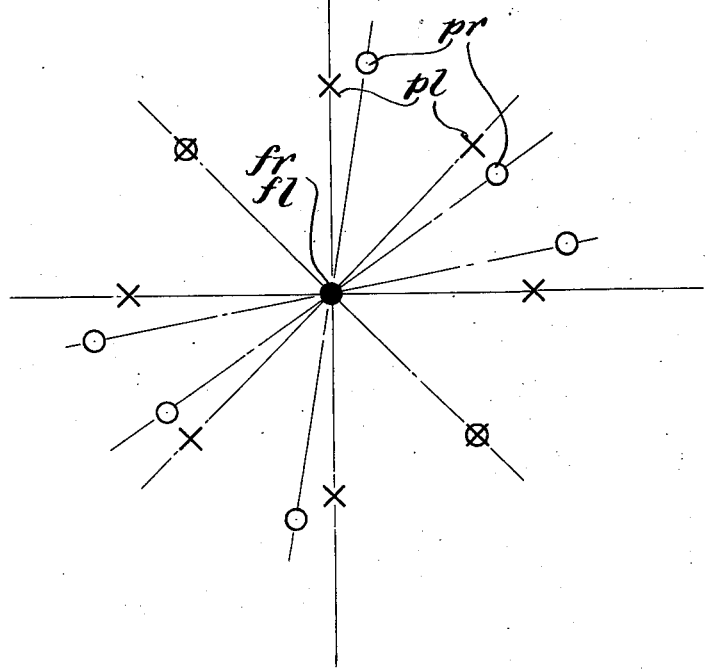
Inventor
Arthur F. Dittmer
By Roberts, Cushman & Woodberry
his Attys.

May 24, 1938.  A. F. DITTMER  2,118,173
ISEIKONIC SPECTACLES AND THEIR MANUFACTURE
Filed Oct. 18, 1934  17 Sheets-Sheet 3

Inventor
Arthur F. Dittmer
by Roberts, Cushman & Woodberry
Attys.

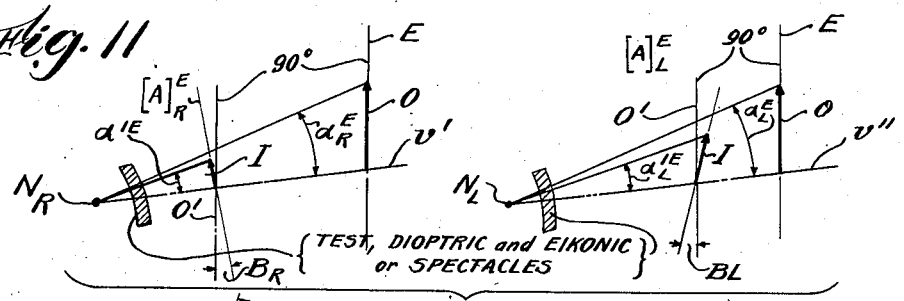
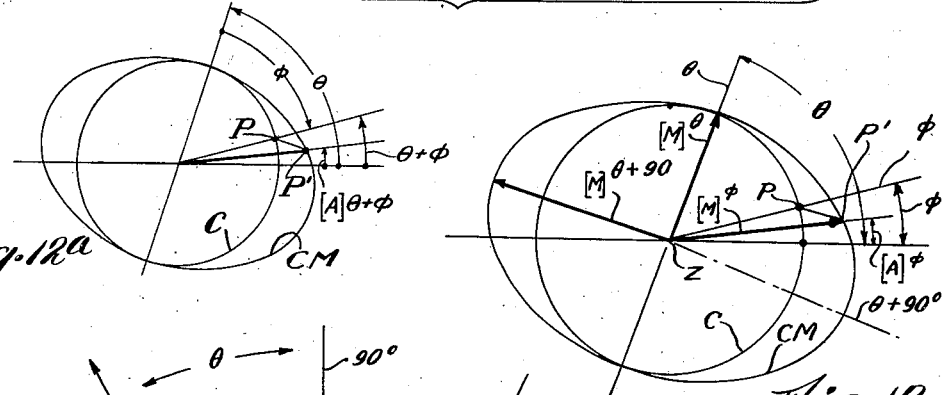
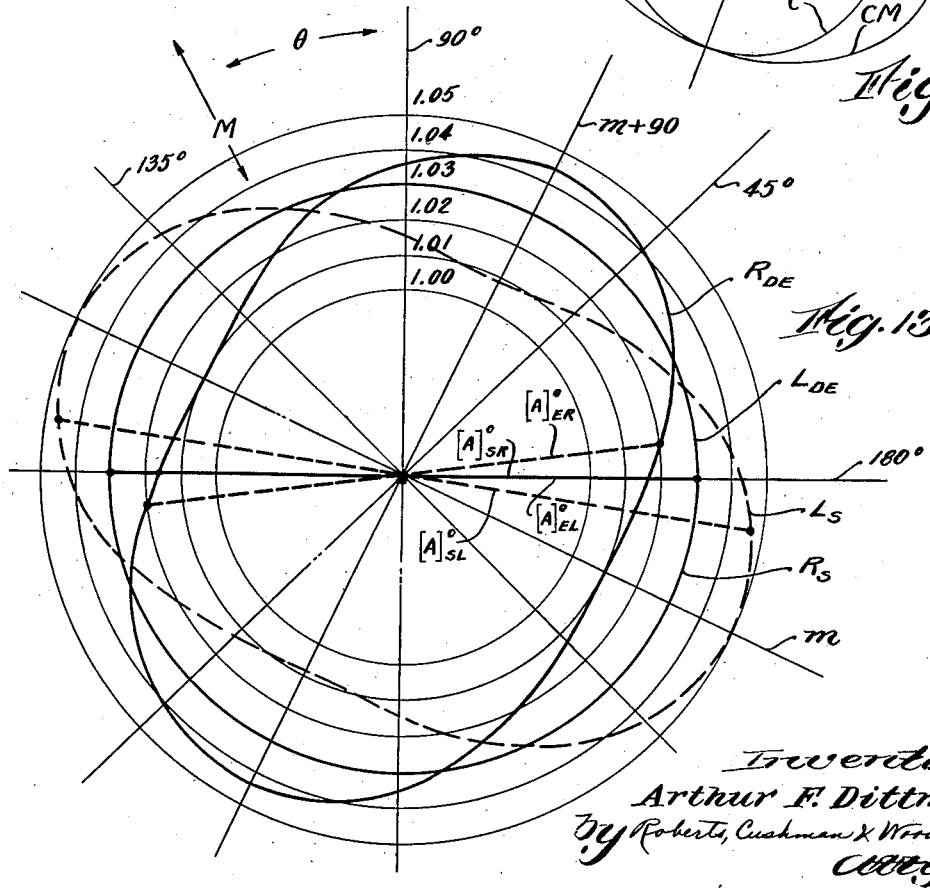

May 24, 1938.   A. F. DITTMER   2,118,173
ISEIKONIC SPECTACLES AND THEIR MANUFACTURE
Filed Oct. 18, 1934   17 Sheets-Sheet 5
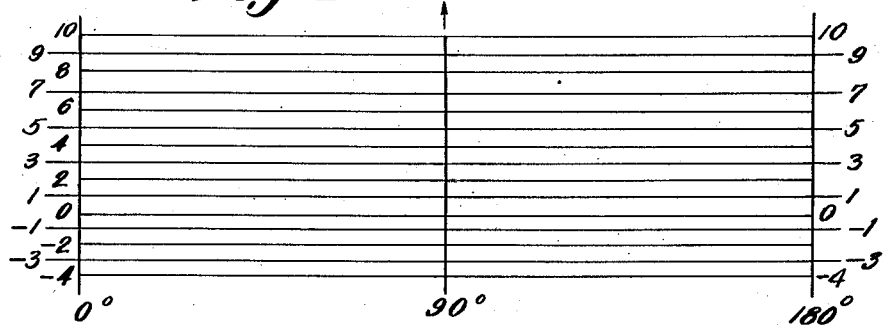
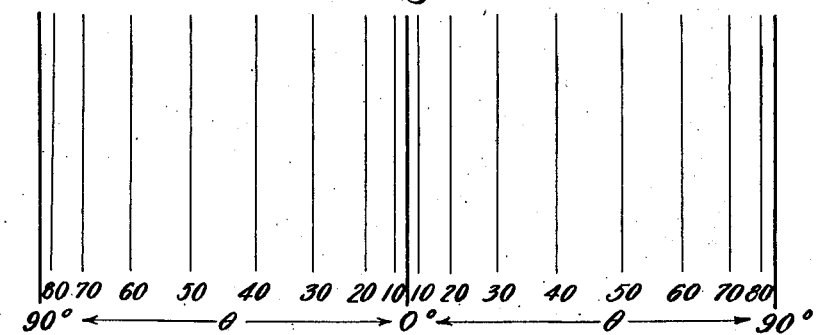
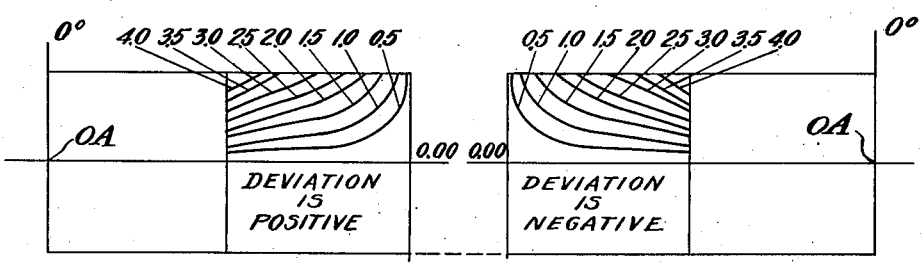
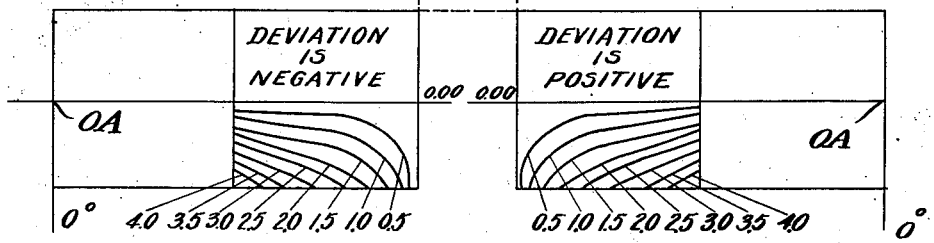
Inventor
Arthur F. Dittmer
by Roberts, Cushman & Woodbury
Attys.

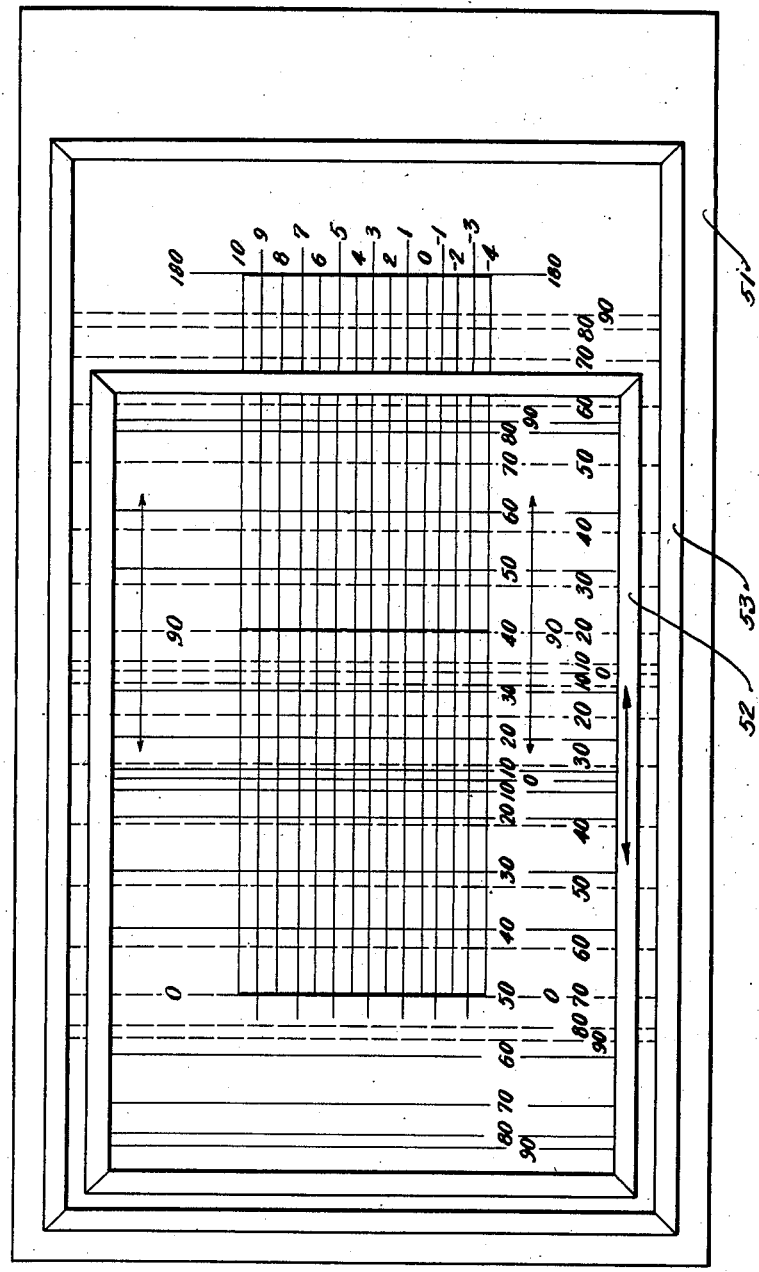

May 24, 1938.  A. F. DITTMER  2,118,173
ISEIKONIC SPECTACLES AND THEIR MANUFACTURE
Filed Oct. 18, 1934  17 Sheets-Sheet 7
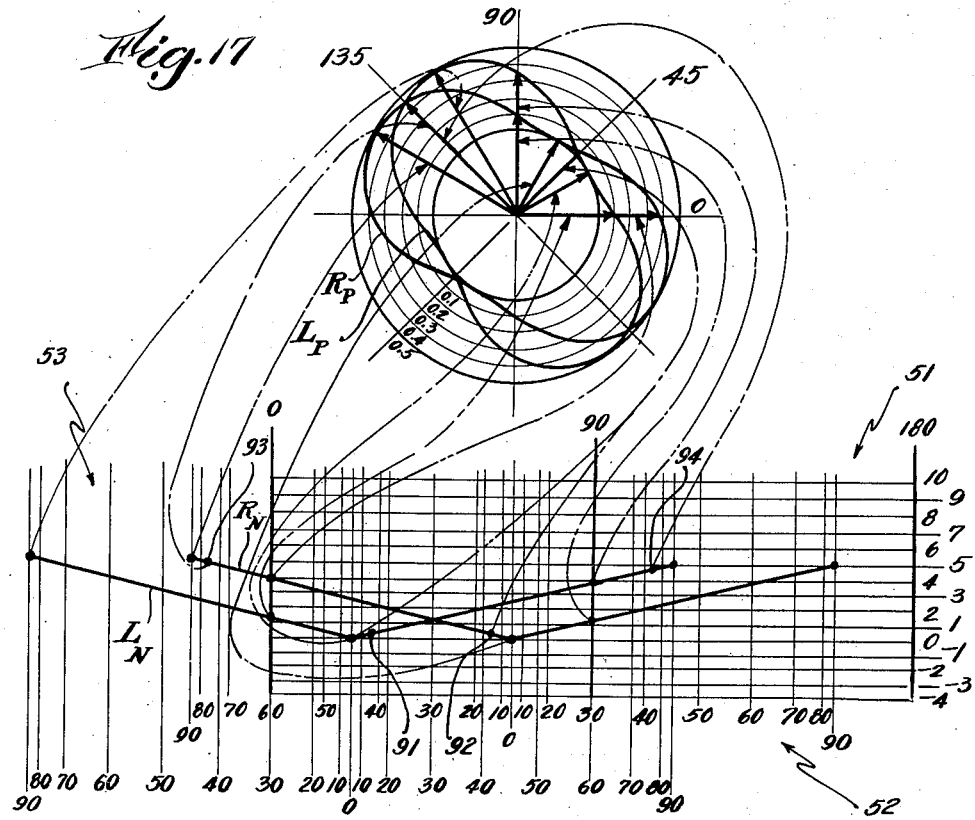
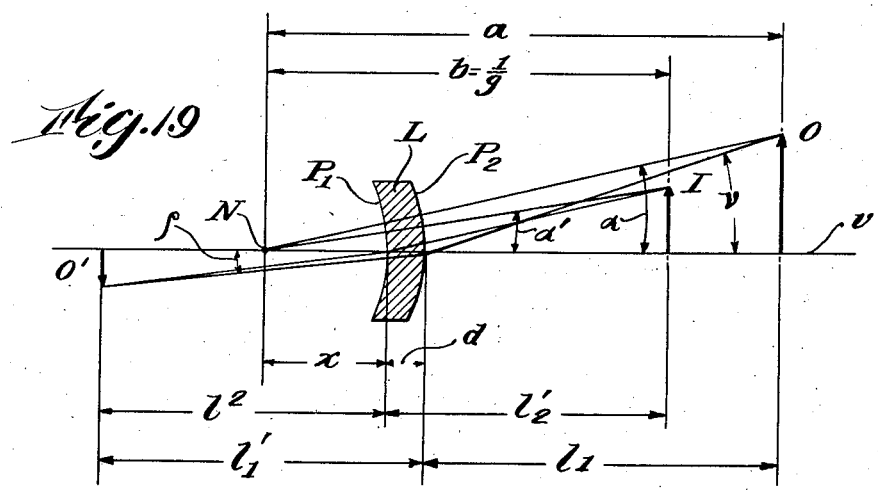
Inventor
Arthur F. Dittmer
by Roberts, Cushman & Woodbury
Attys.

May 24, 1938.  A. F. DITTMER  2,118,173
ISEIKONIC SPECTACLES AND THEIR MANUFACTURE
Filed Oct. 18, 1934   17 Sheets-Sheet 8

"A" CHART

Inventor
Arthur F. Dittmer
By Roberts, Cushman & Woodburg
Attys.

Fig. 21

| g RANGE | f | d |
|---|---|---|
| -15 to -12 | 13.5 and 12.5 | 3 and 4 |
| -12 to -9 | 13.5 and 12.5 | 3 and 4 |
| -9 to -6 | 13.5 and 12.5 | 2 and 3 |
| -6 to -3 | 13.5 and 12.5 | 2 and 3 |
| -3 to 0 | 12.5 and 11.5 | 2 and 3 |
| 0 to 3 | 12.5 and 11.5 | 2 and 3 |
| 3 to 6 | 12.5 and 11.5 | 1 and 2 |
| 6 to 9 | 12.5 and 11.5 | 1 and 2 |
| 9 to 12 | 11.5 and 10.5 | 1 and 2 |
| 12 to 15 | 11.5 and 10.5 | 1 and 2 |

Fig. 22

| f / Bevel | 13.5 #1 | 12.5 #2 | 11.5 #3 | 10.5 #4 |
|---|---|---|---|---|
| d 1 |  | GREEN | BLACK | VIOLET |
| d 2 | GREEN | BLUE | BROWN | RED |
| d 3 | BLACK | ORANGE | RED |  |
| d 4 | VIOLET | RED |  |  |

Fig. 24

| g RANGE | P₂ RANGE | f | d |
|---|---|---|---|
| -15 to -12 | 9 to 24 | 14.5 and 15.5 | 3 and 4 |
| -12 to -9 | 6 to 24 | 14.5 and 15.5 | 3 and 4 |
| -9 to -6 | 3 to 24 | 14.5 and 15.5 | 2 and 3 |
| -6 to -3 | 0 to 24 | 14.5 and 15.5 | 2 and 3 |
| -3 to 0 | -3 to 21 | 14.5 and 15.5 | 2 and 3 |
| 0 to 3 | -6 to 18 | 14.5 and 15.5 | 2 and 3 |
| 3 to 6 | -9 to 15 | 15.5 and 16.5 | 1 and 2 |
| 6 to 9 | -12 to 12 | 15.5 and 16.5 | 1 and 2 |
| 9 to 12 | -15 to 9 | 15.5 and 16.5 | 1 and 2 |
| 12 to 15 | -18 to 6 | 15.5 and 16.5 | 1 and 2 |

Fig. 25

| f / Bevel | 14.5 #1 | 15.5 #2 | 16.5 #3 | 17.5 #4 |
|---|---|---|---|---|
| d 1 |  | GREEN | BLACK | VIOLET |
| d 2 | GREEN | BLUE | BROWN | RED |
| d 3 | BLACK | ORANGE | RED |  |
| d 4 | VIOLET | RED |  |  |

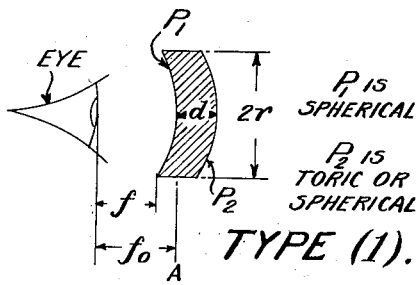

TYPE (1).

Fig. 26

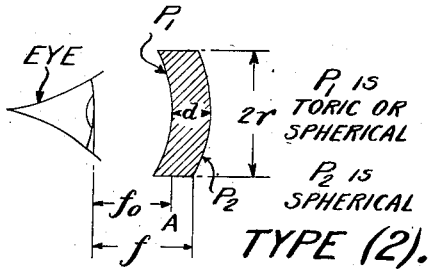

TYPE (2).

Fig. 27

May 24, 1938.  A. F. DITTMER  2,118,173
ISEIKONIC SPECTACLES AND THEIR MANUFACTURE
Filed Oct. 18, 1934   17 Sheets-Sheet 10
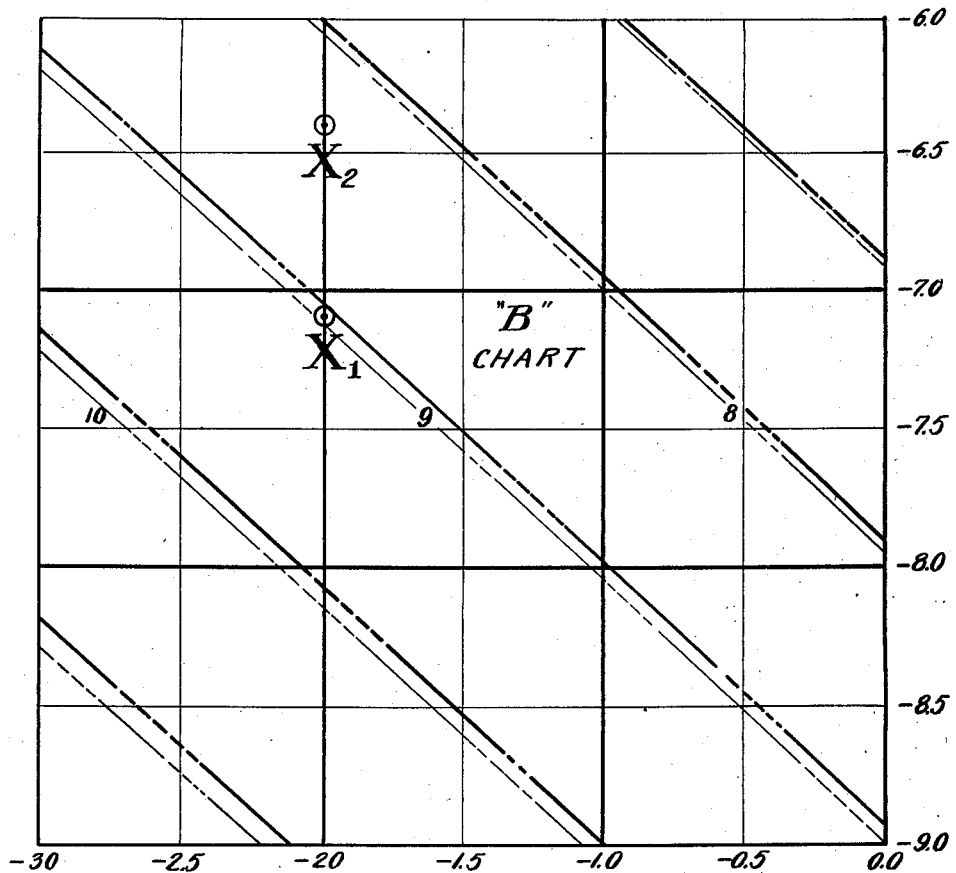
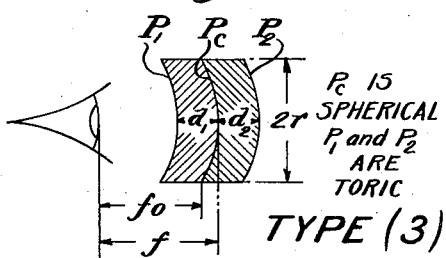
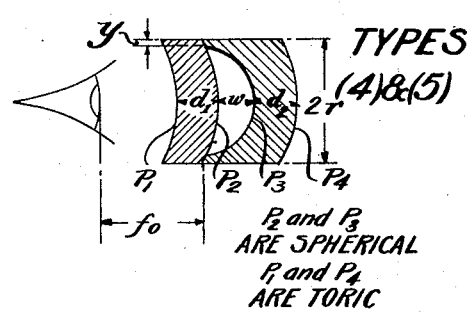
Inventor
Arthur F. Dittmer
By Roberts, Cushman & Woodbury
Attys.

May 24, 1938.  A. F. DITTMER  2,118,173
ISEIKONIC SPECTACLES AND THEIR MANUFACTURE
Filed Oct. 18, 1934   17 Sheets-Sheet 11

| g RANGE | $d_1$ | $d_2$ |
|---|---|---|
| 15 to -12 | 1 & 2 & 3 | 1 & 2 & 3 |
| -12 " -9 | 1 & 2 & 3 | 1 & 2 & 3 |
| -9 " -6 | 1 & 2 & 3 | 1 & 2 & 3 |
| -6 " -3 | 1 & 2 & 3 | 1 & 2 & 3 |
| -3 " 0 | 1 & 2 & 3 | 1 & 2 & 3 |
| 0 " 3 | 1 & 2 & 3 | 1 & 2 & 3 |
| 3 " 6 | 1 & 2 | 1 & 2 |
| 6 " 9 | 1 & 2 | 1 & 2 |
| 9 " 12 | 1 & 2 | 1 & 2 |
| 12 " 15 | 1 & 2 | 1 & 2 |

| $d_1$ | 1 | 2 | 3 |
|---|---|---|---|
| $d_2$ 1 | RED | BLACK | DOUBLE BLACK |
| 2 | GREEN | BLUE | BROWN |
| 3 | DOUBLE GREEN | ORANGE | VIOLET |

Inventor
Arthur F. Dittmer
by Roberts, Cushman & Woodberry
Attys.

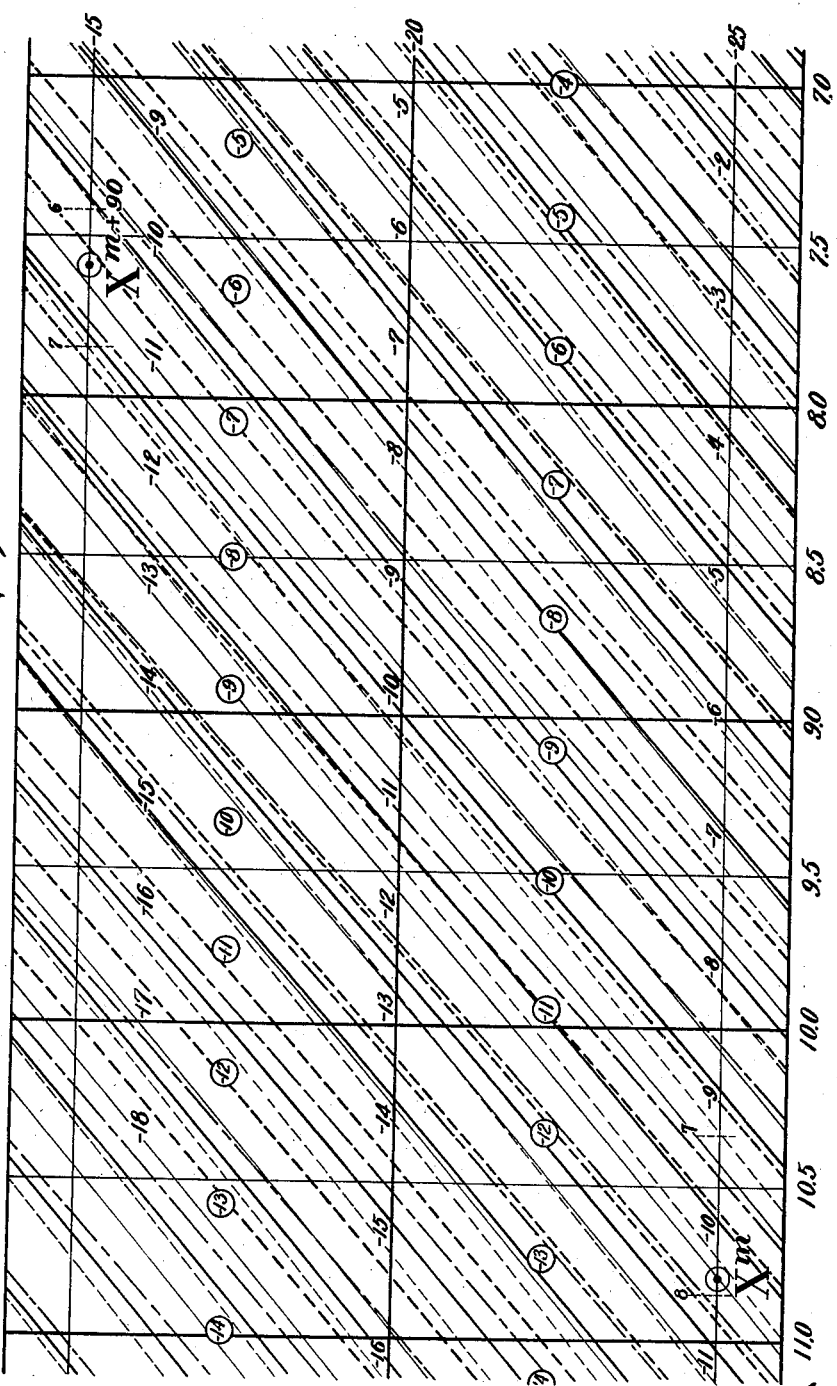

May 24, 1938.  A. F. DITTMER  2,118,173
ISEIKONIC SPECTACLES AND THEIR MANUFACTURE
Filed Oct. 18, 1934   17 Sheets-Sheet 13
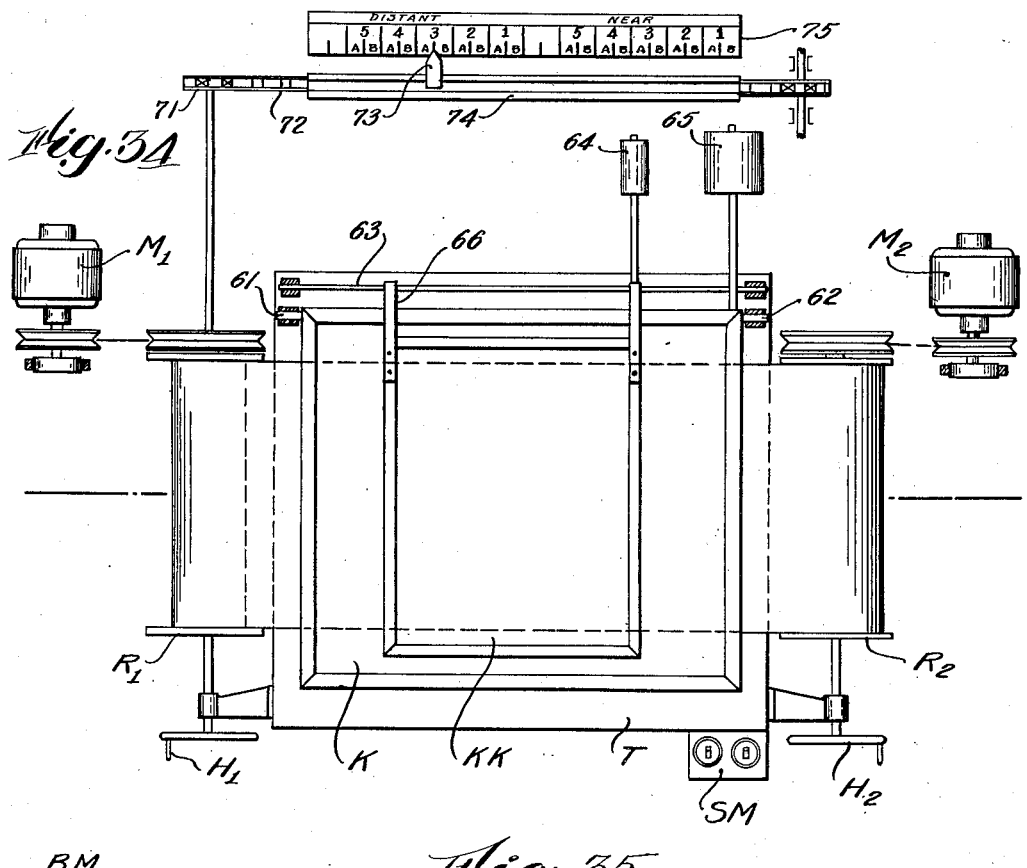
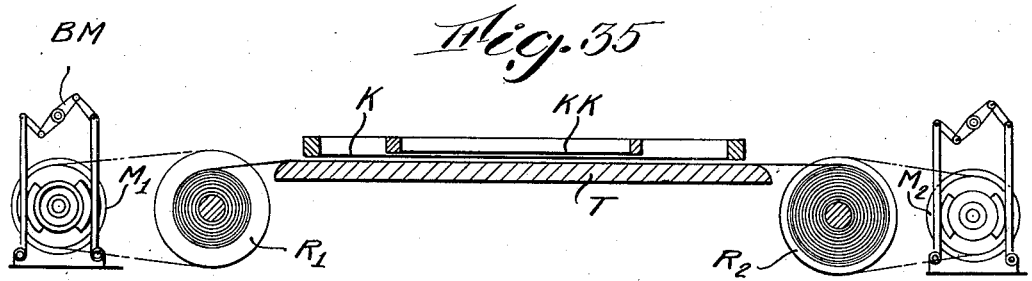
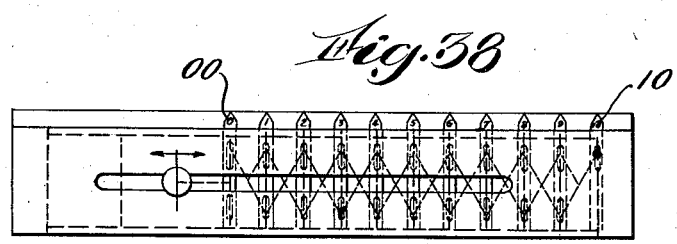
Inventor
Arthur F. Dittmer
by Roberts, Cushman & Woodberg
Attys.

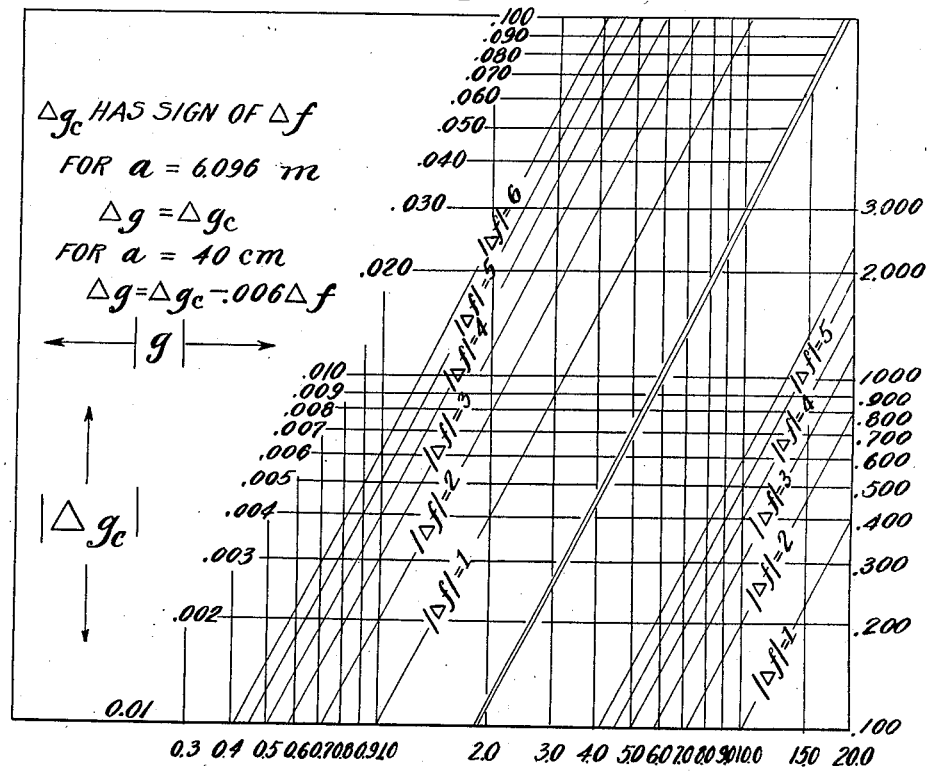

WHEN Δf IS POSITIVE USE VALUE FOR NEGATIVE
Δf WITH OPPOSITE SIGN

Inventor
Arthur F. Dittmer

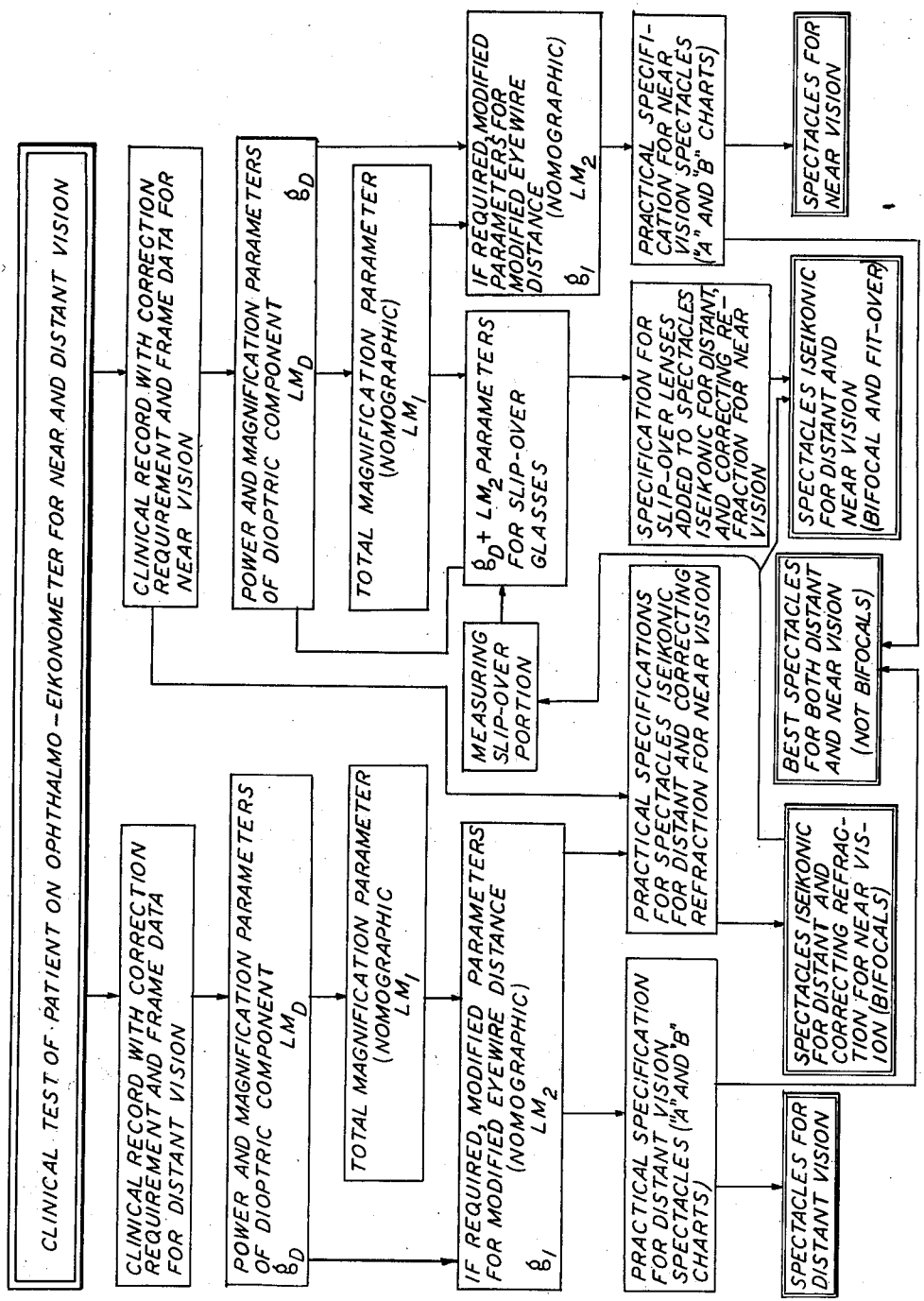

Patented May 24, 1938

2,118,173

UNITED STATES PATENT OFFICE 2,118,173

ISEIKONIC SPECTACLES AND THEIR MANUFACTURE

Arthur F. Dittmer, Hanover, N. H., assignor to Trustees of Dartmouth College, Hanover, N. H., a corporation of New Hampshire Application October 18, 1934, Serial No. 748,788

16 Claims. (Cl. 88—54)

The human eyes are subject to refractory defects which can be corrected by the well known eyeglasses prescribed for this purpose, and in addition to defects involving differences in the size and/or shape of the ocular images, which may be described as the impressions formed in the higher brain centers through the vision of each eye, and are determined not only by the properties of the dioptric images that are formed on the retinas of the eyes, but also by the modifications imposed upon those images by the anatomical properties and physiological processes which carry them to these centers.

Herein, the conditions which have to do with differences in the size and/or shape of the ocular images will be called "eikonic" conditions. The condition in which the size and shape of the ocular images of a person are equal will be referred to as "iseikonia", whereas the condition in which the size and/or shape of the ocular images are unequal will be termed "aniseikonia".

As explained in Letters Patent No. 1,933,578, of November 7, 1933, to Adelbert Ames, Jr. and Gordon H. Gliddon, aniseikonia may not only impair binocular vision, but also the general well being of the person having such defects, and glasses eliminating or at least alleviating aniseikonia, or "iseikonic lenses", are described and claimed in this patent. As also pointed out in the aforesaid patent, the ratio of ocular images may be the same in all meridians (overall aniseikonia) or it may be symmetrical to one meridian (meridional aniseikonia). The ocular image differences may also be quite irregular and unsymmetrical, in which case they are referred to as ocular image "shape" differences. Herein, all three types of ocular image differences will be shortly referred to as "aniseikonia", unless it is specifically stated that only one of these several types of differences (which may, and often are, co-existent) is discussed in any particular instance, when they will be termed "overall", "meridional" and "irregular" aniseikonias, respectively.

In many cases, aniseikonia is co-existent with refractive defects and is often partly or wholly caused by these defects and/or the means effecting corrections thereof. Therefore, refractive defects and eikonic differences must be correlated for optimum correction. For this purpose combined iseikonic lenses, as described in the aforementioned patent, with one element correcting all refractive defects and a superposed lens correcting only image differences (inherent and/or introduced by the refractory correction) can be worn. These, however, are often cumbersome and are also unsightly and hard to clean. The said patent, therefore, also contemplates the use of single lenses effecting all necessary corrections, and of lens combinations, where four surfaces cooperate in correcting the defects, whereas any lens element alone does not have any specific function, as for example size correction only. In the very large majority of cases, it is possible to compute and to manufacture spectacles with lenses of this type which are not unduly different from the customary eyeglasses, nor too heavy, or otherwise inconvenient. However, the computation of such lenses could heretofore only be carried out by haphazard and very tedious methods, mainly by trial and error, which made the procedure difficult and expensive. Therefore, the, for obvious reasons desirable, widespread use of the new and very beneficial spectacles, necessarily based on a commercial supply of prescriptions and of the eyeglasses themselves, was severely handicapped not only by excessive cost but also by the difficulty of securing persons trained and able to make the necessary involved and lengthy calculations.

Also, the lenses cited in the aforementioned patent were contemplated to correct overall and meridional aniseikonia only. In many cases there also exist irregular size differences and differences in the angular position of lines in the ocular images which may in many cases be of such magnitude as to be very injurious to the patient. In these cases it is in general not possible completely to correct all the differences with practical eyeglasses. It is however, possible to find the best practical eyeglasses which will substantially correct some of the differences, and partially correct the others, the choice as to which differences are to be wholly corrected, and which are to be only partially corrected being largely determined by known facts regarding the relative importance of these differences in the functioning of the eyes in binocular vision.

It is, therefore, the main object of the present invention to provide practical eyeglasses, that is eyeglasses that can be practically computed, manufactured and worn, for the correction of all types of refractive defects and eikonic differences, which substantially correct the defects and differences found and measured when testing the eyes, and to provide methods for quickly, efficiently, and reliably producing such eyeglasses, starting with the clinician's test record and ending with the practical iseikonic eyeglass permanently worn by the patient, and devices for carrying out such methods.

These and other objects, aspects and features will be apparent from the following detailed explanations of the invention which refer to drawings in which:

Fig. 1 is a diagrammatical representation of one of the tests upon which the present invention is based;

Fig. 2 is a diagram showing the appearance of the eikonic test target with fused binocular vision when only an overall size difference is present;

Fig. 3 is a diagram similar to Fig. 2 showing the appearance when a simple type of meridional size difference is present;

Fig. 4 is a diagram similar to Fig. 2 showing the appearance when only an overall angular difference is present;

Fig. 5 is a diagram similar to Fig. 2 showing the appearance when an irregular angular difference is present;

Fig. 6 is a diagram similar to Fig. 2 showing the appearance when both an irregular size and an irregular angular difference are present;

Fig. 11 is a diagram explaining the conditions which must be fulfilled in order to correct the measured defects in size and/or shape;

Figs. 12 and 12a are diagrams explaining some of the terms used in the present description;

Fig. 13 is a diagram explaining the general conditions of equivalence for parallel principal meridians;

Figs. 14 and 15 show nomographic diagrams employed for purposes of this invention;

Fig. 16 shows superimposed diagrams Figs. 14 and 15;

Fig. 17 is a diagram explaining the nomographic diagram shown in Fig. 16;

Fig. 18 is another nomographic diagram employed for purposes of the present invention;

Fig. 19 is a diagram somewhat similar to Fig. 9;

Figs. 21 and 22 are tables explaining the A chart part of which is shown in Fig. 20;

Fig. 23 is part of a so-called "B chart" for lenses of type (;);

Figs. 24 and 25 are tables similar to Figs. 21 and 22, explaining the A and B charts for lenses of type (2);

Fig. 26 is a diagram showing lenses of type (1);

Fig. 27 is a diagram showing lenses of type (2);

Fig. 28 is a diagram showing lenses of type (3);

Fig. 29 is a diagram showing lenses of types (4) and (5);

Fig. 32 is a part of the A chart for lenses of type (4);

Figs. 34 and 35 show, in top and sectional views respectively, the manner in which the A and B charts are preferably mounted for use;

Fig. 38 is a diagram of a special interpolation ruler used with the A and B charts;

Fig. 39 is a table giving the specifications of a particular lens of type (4);

Fig. 40 is a chart for obtaining modified $g$ values;

Fig. 42 is a flow diagram explaining the method according to the present invention.

Figure 7:
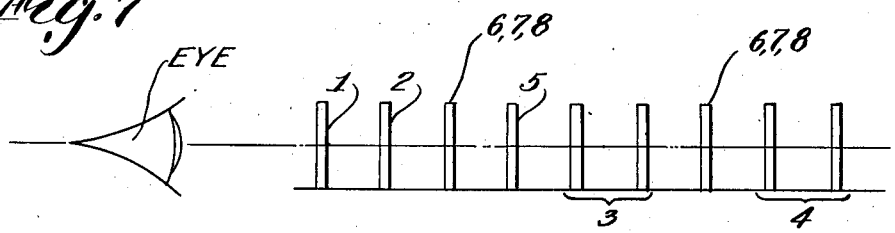
Fig. 7 is a schematical view of the opthalmo-eikonometer testing means before each eye.

The refractive defects and eikonic differences to be corrected with eyeglasses of the type above discussed are detected and their magnitude determined with instruments as for example described in Letters Patent No. 1,944,871, of January 30, 1934, to Adelbert Ames, Jr. and Gordon H. Gliddon, No. 1,946,925, of February 20, 1934, to Adelbert Ames, Jr. No. 2,063,015 of Dec. 8, 1936 and No. 2,095,235 of Oct. 12, 1937. These instruments, called ophthalmo-eikonometers, yield test data which measure the defects and differences present, that is, the ordinary and astigmatic refractive defects as measured by spherical and cylindrical dioptric test lenses with the aid of dioptric test targets, and the eikonic differences present, after correction of the refractive defects with the dioptric test lenses, as measured by suitable iseikonic test lenses with the aid of the peculiar test targets described in the above-identified patents and applications.

As diagrammatically shown in Fig. 1, test target appearances AL and AR are represented to the left and right eyes, respectively, with similar and therefore fusible fixation objects $fl$ and $fr$, and dissimilar non-fusible test patterns $pl$ and $pr$ which, however, are arranged similar with respect to their fixation objects. In fused binocular vision, the appearance of the test patterns relative to each other and to the fused fixation object permits exact determination of the eikonic differences present, and controlled measurement thereof. For example if LR of Fig. 1 is the appearance of the test means after application of the dioptric lenses which correct the refractive errors and suitable iseikonic test lenses to equalize the size and/or shape of the ocular images, equality of distance $al$ and $ar$, and $bl$ and $br$, respectively, indicates that the image size differences have been completely eliminated in the horizontal and vertical meridians. The figure also shows that image size differences have been eliminated in the 45° and 135° meridians and that lines joining the similarly placed non-fusible test objects represented to the right and left eyes would appear parallel to one another in the four meridians shown.

The appearance of the test target in fused binocular vision when aniseikonia of various kinds is present is shown in Figs. 2, 3, 4, 5, and 6.

Fig. 2 shows the appearance when overall aniseikonia is present. In this case the image seen by the right eye is larger than that seen by the left eye.

Fig. 3 shows the appearance when a simple type of meridional aniseikonia is present. In this case the image seen by the right eye is larger than that seen by the left eye in the vertical meridian. In the forty-five degree (45°) and one hundred and thirty-five degree (135°) meridians the difference is made up of a difference in the size of the images and a difference in the angular position of lines connecting the similarly placed test objects.

Fig. 4 shows the appearance when an overall angular difference is present.

Fig. 5 shows the appearance when an irregular angular difference is present.

Fig. 6 shows the appearance when both irregular size differences and irregular angular differences are present.

This ophthalmo-eikonometer measurement is accomplished with the aid of lenses having vergence power (this term being employed to designate the effect of changing the image distance) in all meridians and in selected meridians of astigmatism (of the same or different inclination for both eyes), lenses without power which change the size in all meridians and in selected meridians, and lenses without power which change the relative angular positioning of the ocular images of any selected meridian.

Generally speaking, there will be placed in front of each eye dioptric test lens 1, for spherical refractive correction, and dioptric test lens 2 for astigmatic correction as indicated in Fig. 7, supported in a holder as shown in the above-mentioned Patent No. 2,095,235. There will be further a calibrated lens system 3 for changing the overall size of the ocular image and a calibrated lens system 4 for changing the size of the ocular image in a single meridian but leaving the size unchanged in the meridian ninety degrees (90°) removed from that single meridian. Systems 3 and 4 may be elements of trial sets comprising stepped glasses effecting known changes of image size, or, preferably, they are lens sets for the continuous change of image size without change of power (also called "adjustable iseikonic lenses"), as described and claimed in the copending application Serial No. 713,701, filed March 2, 1934, and they are so indicated in Fig. 7. There will also be test lens or lenses 5. These are lenses without power which change the size in a single meridian by a fairly large amount, e. g. four per cent (4%) leaving the size in the meridian ninety degrees (90°) removed unchanged or at most very slightly changed. These lenses are used to measure the angular differences of the ocular images in the following manner. They are mounted so as to be free to rotate about their optic axes. If it is desired to measure the angular difference in any single meridian, e. g. the horizontal meridian, the test lens 5 is rotated about its optic axis until a line joining the two dark spots which are in the horizontal meridian of the eikonic target would appear parallel to a line joining the two light points in the horizontal meridian of the eikonic target. The amount of angular difference present after the refractive errors have been corrected with the dioptric test lenses can be found from the record of the axis setting of lens 5 necessary to correct it, by well known optical rules. If it is desired to measure the angular difference in any other meridian, a separate measurement is made with lens or lenses 5.

The angular difference may also be measured with the ophthalmo-eikonometer described in the above-identified Letters Patent No. 1,946,925, by rotating one of the eikonic targets until lines joining the non-fusible test objects in the meridian in which the difference is being measured would appear parallel in fused binocular vision. The amount of rotation, as read on the calibrated scale of the rotated target, necessary to make such lines appear parallel is then a measure of the angular difference in the meridian in which it is being measured.

Figure 8:
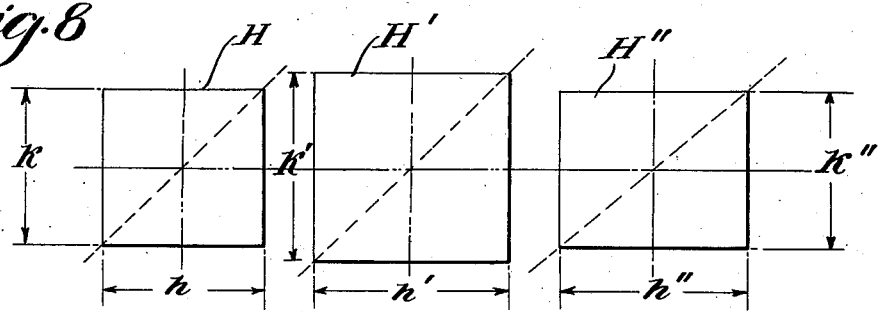
Fig. 8 is a diagram explaining the notation of size difference.

The angular difference measured by lens system 5 may be only the remainder after some or all of the size differences have been eliminated with lens systems 3 and 4. In general the axis setting of lens system 5 together with the known lens systems 1, 2, 3, 4, before both eyes gives a measure of the angular difference present, as will be apparent from the following explanation referring to Fig. 8.

There may be in addition test lenses 6 and/or 7 and/or 8 taking care of special corrections, for example certain large steps of eikonic correction, (auxiliary iseikonic lenses) used to extend the range of the adjustable iseikonic lenses or certain small steps in dioptric correction, used to obtain smaller steps than are usually furnished in dioptric test sets. Since the use of these lenses is immaterial with regard to the following description, they will be omitted therefrom in order to simplify it.

Thus, after having examined the patient, the clinician has a measurement of the refractive defects of the patient in terms of dioptric test lenses 1 and 2, and measurements of the differences, both size and angular, of the ocular images in terms of lenses or lens systems 3, 4 and 5. It should be understood that a single setting of lens systems 3 and 4 may eliminate only the size differences in two meridians at right angles to each other, while a single setting of lens or lenses 5 may eliminate only the angular difference in a single meridian. Hence a complete measurement of a single patient may consist of more than one record of the settings of lenses 3 and 4, if that is necessary to eliminate the size differences in more than two meridians at right angles to one another, and more than one record of the setting of lens or lenses 5 if that is necessary to eliminate the angular difference in all meridians.

Tests are made for distant vision and for reading position. The test for distant vision is usually made with the fusible objects in the eikonic test target (or its image as formed by lenses) at a distance of six meters (6 m.) from the eyes on a horizontal line which is perpendicular to and bisects the line joining the poles of the corneas of the patient's eyes. The test for reading position is usually made with the fusible objects in the eikonic test target (or its image as formed by lenses) at a distance of forty centimeters (40 cms.) from the eyes on a line inclined twenty degrees (20°) downward from the horizontal and which is perpendicular to and bisects the line joining the poles of the corneas of the patient's eyes.

It is to be understood that the above means for detecting and measuring the refractive defects and eikonic differences are here given for purposes of illustration only and that the method of quickly and easily providing practical eyeglasses which correct these measured refractive defects and eikonic differences as completely as possible is not restricted to these methods of measurement, but is applicable to any measurements of the refractive defects and the ocular image differences which may be available.

It should be kept in mind that the data of test lenses 1 and 2 signify a certain refractive defect and in addition an eikonic difference that may be introduced by the lens which corrects the refractive defect, and that the data of lenses 3, 4 and 5 ordinarily import only image size changes and angular changes which measure the inherent size and angular differences plus such size and angular differences as may be introduced by test systems 1 and 2.

The data of systems 1 and 2 are given in diopters, as in the case of conventional ophthalmic test lenses, whereas the data of systems 3 and 4 is recorded in per cents of linear size change and the data of lens 5 is recorded in the conventional axis notation used for dioptric cylinder lenses.

The meaning of the data for systems 1 and 2 (ordinary and astigmatic refractive corrections) will be understood without further explanation. The data of systems 3, 4 and 5 are explained in Fig. 8, where H is a square with horizontal and vertical sides $h$ and $k$, respectively. If seen through overall magnifying system 3 when this system is set to magnify 3.00%, this square would appear as a square H' with $h'=h \times 1.03$ and $k'=k \times 1.03$. If seen through meridional system 4 when this system is set to magnify 3.00% in the horizontal meridian (i. e. with its axis in the vertical meridian) the square H would appear as rectangle H'' with $h''=h \times 1.03$ and $k''=k$. Rectangle H'' also shows how the angular appearance of lines is altered by lens or lenses 5, which, it should be remembered, are lenses which magnify symmetrically about an axis. If lens 5 (giving, as previously assumed, a 4.00% magnification) is set with its axis vertical, square H would appear as rectangle H'' with $h''=h \times 1.04$ and $k''=k$. The line which is the diagonal of H would now be seen as the diagonal of H'' and it is easily seen that the angular appearance has been changed. The amount of the change in angular appearance of any line at a known angle to the axis of symmetry of lens 5 can be found by well known optical rules.

The axes of astigmatism are indicated in the usual manner. The meridians in which to measure the size and angular ocular differences are chosen in such a way so as to give a sufficient measurement of the differences present without an undue expenditure of time on the part of the clinician. In the method of measurement herein used for purpose of illustration, these meridians are the 0° (or 180°), 45°, 90° and 135° meridians. It should be understood in this connection that for reasons of convenience, these axes and meridians are identified not as seen by the patient, but as seen by the clinician, so that a plane through the line of vision intersecting a horizontal plane at 45° as seen by the patient signifies the 135° meridian according to the nomenclature herein used.

The problem is now to provide iseikonic eyeglasses which will as nearly as possible correct the measured refractive defects and eikonic differences, and in addition fulfill certain practical conditions which will be discussed hereinafter.

For purposes of the present invention, the clinical measurements of the defects present, as laid down in the clinical record, and the optical properties of the finally worn iseikonic spectacles are correlated according to the method now to be described, which is also outlined in Fig. 42.

The iseikonic spectacles must be of such properties that (I) they correct the refractive errors of the eyes by exactly the amounts these defects are corrected by the dioptric test lenses used in the ophthalmo-eikonometer, and (II), correct all size and angular ocular differences which were detected and measured by the ophthalmo-eikonometer as nearly as they can be corrected with practical spectacle lenses, with the remaining uncorrected amounts of difference allotted according to their relative importance in the physiological functioning of the eyes in binocular vision.

Condition (I) is fulfilled if the images of the object of attention formed by rays in the two meridians of the iseikonic spectacle lenses which are perpendicular and parallel to the axes of astigmatism (hereinafter shortly referred to as "principal meridians") are located at exactly the same distance from a fixed point in the eye (for example the nodal point) as the corresponding images formed by the dioptric test lenses which corrected the refractive defects in the ophthalmo-eikonometer.

Condition (II) is fulfilled for practical purposes if condition (I) is fulfilled and in addition thereto the angles at a fixed point in each eye (e. g. the nodal points) between rays coming from two points of an object at the point of attention in each "eikonic meridian" (that is the meridians chosen for defining eikonic equivalency) and intersecting at the fixed points are in the same ratio for the iseikonic spectacles and the ophthalmo-eikonometer lenses used to eliminate the size difference in each meridian, and if corresponding eikonic meridians of each eye are imaged in angular relationship (one eye to the other) which is the same as the angular relationship each meridian is imaged by the ophthalmo-eikonometer lenses used to eliminate the angular difference of the ocular images of that meridian.

Another way of stating the eikonic condition of equivalence (II) is to state that the ratios (one eye to the other) in the eikonic meridians of the angles formed by rays from two points in each eikonic meridian of an object at the point of attention and intersecting at the fixed points are different for the iseikonic spectacles than for the dioptric test lenses by exactly the amount of size difference detected and measured in each "eikonic meridian" by systems 3 and 4; and if each "eikonic meridian" is imaged in angular relationship (one eye to the other) which is different for the iseikonic spectacles than for the dioptric test lenses by exactly the amount of angular difference detected and measured in each meridian by lens or lenses 3 and/or 4 and/or 5.

It should be observed that the selection of the meridians for defining eikonic equivalency (herein called "eikonic meridians") is determined in such way as to give reasonably complete measurements of the size and angular differences all over the field and that the relative importance of the ocular image differences in any one of these meridians is determined by the physiological facts of binocular vision, for which the position of the eyes symmetrically to the medial plane of the body is significant.

These conditions of equivalency can perhaps be better visualized with the aid of the following explanation.

Figure 9:
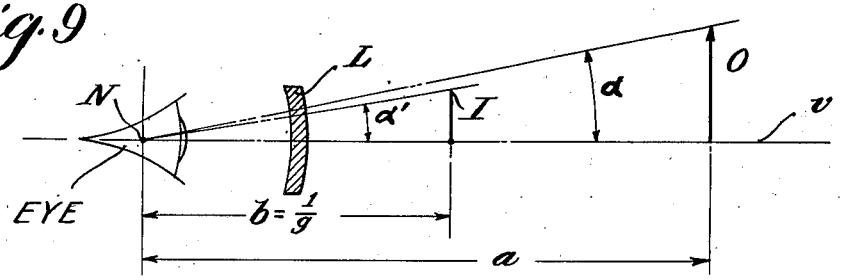
Fig. 9 is a diagram explaining some of the terms used in the present description.

Referring to Fig. 9, some of the terms of this explanation will first be defined. In this figure an eye with nodal point N is indicated, $v$ is the axis of vision, O is an object, and I is the image formed of object O by the iseikonic spectacle or dioptric test lenses indicated at L. $a$ is the object distance, and $b$ the image distance from N; these distances are counted positive in front of N, and negative back of N. $\alpha$ is the angle subtended at N by axis $v$ and a line joining N to a point of the object, and $\alpha'$ is the angle subtended at N by axis $v$ and a line joining N to the corresponding point of the image. The ratio $\alpha'/\alpha$ is the angular magnification of L about the point N and is designated by the letter M.

Condition I states that the distance $b$ must be the same in the four principal meridians for the iseikonic spectacles as it is for the dioptric test lenses which corrected the refractive errors of the patient. For convenience the reciprocal of this distance, designated by $g$ is used. The test lenses for the measurement of eikonic differences are of zero vergence power for test distance $a$, i. e. image and object are at the same distance from N. Since they are always placed between the dioptric test lenses and the eikonic targets they have no effect upon the image distance. For this reason only the dioptric test lenses need be considered in conditions of equivalency I.

Condition of equivalency (I) can, therefore, be expressed as:

$$\left.\begin{array}{l} [g]\underset{\text{spec}}{R}^{m} = [g]\underset{\text{test}}{R}^{m} \quad 1' \\ [g]\underset{\text{spec}}{L}^{n} = [g]\underset{\text{test}}{L}^{n} \quad 2' \\ [g]\underset{\text{spec}}{R}^{m+90°} = [g]\underset{\text{test}}{R}^{m+90°} \quad 3' \\ [g]\underset{\text{spec}}{L}^{n+90°} = [g]\underset{\text{test}}{L}^{n+90°} \quad 4' \end{array}\right\} \text{I}$$

In these expressions, $m$ signifies a principal meridian of the right eye and $n$ a principal meridian of the left eye, and R and L the right and left eyes, respectively, and "spec" and "test" iseikonic spectacles and dioptric test lenses, respectively.

It is herein assumed that the above referred to "adjustable size lenses" which have no vergence power, or other size adjusting elements without power, are used. If size adjusting elements are employed which introduce a change in vergence power, the latter must be included in condition (I).

Figure 10:
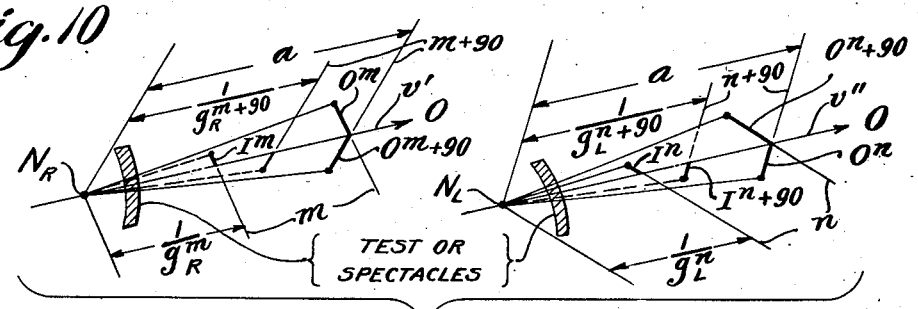
Fig. 10 is a diagram explaining the conditions which must be fulfilled in order to correct the measured refractive defects.

Referring to Fig. 10 which corresponds to Fig. 9 and where NR and NL are the nodal points of the right and left eyes, respectively, $v'$ and $v''$ the corresponding visual axes, $m$ and $n$ corresponding principal meridians and O and I an object of a certain dimension and its image, condition (I) means that all the distances NR—I and NL—I must be the same for both spectacles and dioptric test lenses.

Before expressing the eikonic conditions of equivalency II it is necessary to specify more exactly the fixed point in the eye about which the angular magnifications are to be measured. This is especially necessary when dealing with the angular magnification of cylinder lenses in other meridians than the principal ones and in dealing with the angular relationship in which radial lines in the plane of the eikonic target are imaged by either the dioptric test lenses or by the iseikonic spectacle lenses. These two subjects have a definite meaning only when the rays which form the images are restricted to a narrow pencil passing through the pupil of the system. For a wide field of view with the eye stationary the pupil of the system is the entrance pupil of the eye. For a narrow field of view for any one eye position but with the eye embracing a large field of view by moving in its orbit to fix on various parts of the object of attention in turn the center of rotation of the eye constitutes the pupil of the system. Actual vision of a fairly wide field is carried out by a combination of the two. Since the conditions of equivalency can only be fulfilled with a single pupil, the nodal point of the eye which is between the entrance pupil and the center of rotation has been adopted as the pupil of the system. In most actual cases there is no practical difference in the results obtained if either of the above three pupils is used, provided that the dioptric test lenses and the iseikonic spectacles are referred to the same pupil. This is because the conditions of equivalency II are all expressed as identities in ratio of the angular magnifications and as differences of the angular image relationship and a shift of the pupil of the system changes both factors in the ratio or both terms of the difference by almost the same amount, leaving the ratio or difference practically unchanged.

The method according to the present invention is applicable to any chosen pupil of the optical system, although the description given herein refers to the case when the nodal point of the eye is used as the pupil of the optical system.

The angular magnification M has been defined above as the ratio of $\alpha'$ to $\alpha$ in Fig. 9. In the case of cylinder lenses, this definition is applicable only in the principal meridians thereof. In other meridians the angular magnification is defined as the radius vector of an ellipse whose two axes are the angular magnifications in the principal meridians. The angular relationship of radial lines in the plane of the eikonic test targets and their images formed by cylinder lenses is defined in a similar way. Each radial line in the object is imaged as the corresponding radius vector in the ellipse of magnification. Fig. 12 explains this relationship. The circle C with center Z shown in that figure is magnified in meridian $\theta+90$ by multiplying the distance of each point in the circle from meridian $\theta$ by the same factor. As is well known this gives an ellipse which is shown at CM. Point P' in the ellipse corresponds to point P in any selected meridian $\phi$ of the circle and radius vector ZP' is the image f radius vector ZP. $[M]\phi$ represents then the angular magnification in meridian $\phi$.

The first part of conditions of equivalency (II), namely those which must be satisfied in addition to I in order to correct the size differences can therefore be expressed as follows, assuming that the eikonic test targets used provide for measurements in the 45°, 90°, 135° and 180° eikonic meridians, for reasons given hereinbefore.

$$\left.\begin{array}{l} \dfrac{[M]\underset{\text{spec}}{R}^{90°}}{90°} = \dfrac{[M]\underset{\text{test}}{R}^{90°}}{90°} \quad 5' \\ [M]\underset{\text{spec}}{L}^{90°} \quad [M]\underset{\text{test}}{L}^{90°} \\[4pt] \dfrac{[M]\underset{\text{spec}}{R}^{180°}}{180°} = \dfrac{[M]\underset{\text{test}}{R}^{180°}}{180°} \quad 6' \\ [M]\underset{\text{spec}}{L}^{180°} \quad [M]\underset{\text{test}}{L}^{180°} \\[4pt] \dfrac{[M]\underset{\text{spec}}{R}^{45°}}{45°} = \dfrac{[M]\underset{\text{test}}{R}^{45°}}{45°} \quad 7' \\ [M]\underset{\text{spec}}{L}^{45°} \quad [M]\underset{\text{test}}{L}^{45°} \\[4pt] \dfrac{[M]\underset{\text{spec}}{R}^{135°}}{135°} = \dfrac{[M]\underset{\text{test}}{R}^{135°}}{135°} \quad 8' \\ [M]\underset{\text{spec}}{L}^{135°} \quad [M]\underset{\text{test}}{L}^{135°} \end{array}\right\} \text{IIa}$$

In these expressions the left hand side of each equality refers to the iseikonic spectacles, while the right hand side of each equality refers to the dioptric test lenses and the test means used to eliminate the size difference in the meridian indicated by the superscript. For example, if lens systems 3 and 4 are used to eliminate the size difference then in equalities 5' and 6' the right side refers to the angular magnification of 3 and 4 when adjusted to eliminate the size difference in the 90° and 180° meridians and the dioptric test lenses and equalities 7' and 8' refer to the angular magnification of 3 and 4 when adjusted to eliminate the size difference in the 45° and 135° meridians and the dioptric test lenses.

Conditions of equivalency IIa will perhaps be better understood by referring to Fig. 11, analogous to Fig. 10, which indicates an object O in the vertical meridian and its images for the right and left eye, and the angles subtended at the nodal points.

In considering this figure, it should be remembered that $$M = \frac{\alpha'}{\alpha}$$

that the dimension of object O (which, for example, may be the distance from center fixation object to the non-fusible dark points and bright stars of the ophthalmo-eikonometer appearing to the patient) is the same for both eyes, and therefore angles $\alpha_L$ and $\alpha_R$ are necessarily the same for both eyes. As in Fig. 10, the diagrams as applied to ophthalmo-eikonometer correction and iseikonic spectacles are correlated through the conditions of equivalency. For example, identity (5') means in Fig. 11 that the ratio of angle $\alpha'$ in the 90° meridian for the iseikonic spectacle lens of the right eye and $\alpha'$ in the 90° meridian for the iseikonic spectacle lens of the left eye must be the same as the corresponding ratio for the dioptric test lenses and the lens systems 3 and 4 when these lens systems were so adjusted as to eliminate the size difference in the 90° meridian.

If the following notation is used the second part of conditions of equivalency II, namely those which must be satisfied to correct the angular differences can be set down similarly.

If a line in eikonic meridian E is imaged in the right eye in a meridian called $[A]_R^E$ and in the left eye in a meridian $[A]_L^E$ then the remaining conditions of equivalency can be set down as follows, whereby, in this context, the letter A signifies the angular position of the meridian indicated by the superscript given in the conventional notation for the axes of ophthalmic lenses.

$$\begin{aligned} [A]^{180}_{R\,spec} - [A]^{180}_{L\,spec} &= [A]^{180}_{R\,test} - [A]^{180}_{L\,test} & 9' \\ [A]^{45}_{R\,spec} - [A]^{45}_{L\,spec} &= [A]^{45}_{R\,test} - [A]^{45}_{L\,test} & 10' \\ [A]^{90}_{R\,spec} - [A]^{90}_{L\,spec} &= [A]^{90}_{R\,test} - [A]^{90}_{L\,test} & 11' \\ [A]^{135}_{R\,spec} - [A]^{135}_{L\,spec} &= [A]^{135}_{R\,test} - [A]^{135}_{L\,test} & 12' \end{aligned} \Bigg\} IIb$$

In these expressions the left hand side of each equality refers to the iseikonic spectacles while the right hand side of each equality refers to the dioptric test lenses and the lenses in lens system 3 and/or 4 and/or 5 when these lens systems were adjusted to eliminate the angular difference in the meridian to which the equality applies.

Conditions of equivalency IIb will perhaps be better understood by again referring to Fig. 11. In this figure lines O' are parallel to line O in eikonic meridian E. Angles $B_R$ and $B_L$ are the angles which the image of line O makes with O'. Then identity 11' means that the difference $B_R - B_L$ is the same for the iseikonic spectacles as the corresponding difference for the dioptric test lenses and the lens systems 3 and/or 4 and/or 5 when these lens systems are so adjusted as to eliminate the angular difference in the 90° meridian.

The above are the exact conditions of equivalency which must be satisfied if the refractive errors are to be completely corrected and all radial and angular differences corrected in the 180°, 45°, 90° and 135° meridians. The present method provides spectacles which substantially satisfy the refractive conditions of equivalency (I) and for which the departure from each of the eikonic conditions (IIa and IIb) is exactly known. Hence if these conditions can be properly weighted in importance from the known physiological facts of binocular vision, the best practical spectacle can be quickly and easily provided in every case.

In the above formulation of the conditions of equivalency it is assumed that the refractive errors are sufficiently corrected if they are corrected in two meridians at right angles to each other (which meridians may be different in the two eyes) and that a sufficient correction of the ocular image differences over the whole field is given by correction of the size and angular differences in the four meridians: 180°, 45°, 90° and 135°.

The above given general conditions of equivalence can be expressed in simpler form in special cases. These special cases are characterized by (1) the nature of the refractive errors and (2) the nature of the size and angular eikonic differences which are present after the refractive errors have been corrected with dioptric test lenses.

Before taking up these special cases in detail it will be convenient to set up a system of notation which will be used throughout the remainder of this description. The letters $g$ and $M$ will be used as previously defined for the reciprocal of the distance from the nodal point of the eye to the image of the object of attention and for the angular magnification about the nodal point, respectively. The notation for the angular relationship in which radial lines in the object of attention are imaged will be as follows. As likewise mentioned before, the letter A is used for the meridian of the image, measured in the conventional axis notation for ophthalmic cylinder lenses. A system of subscripts and superscripts will be used to designate the particular lens or lens system, the particular meridian, and the particular eye to which the quantity applies. These will now be given.

The values for the dioptric test lenses will be indicated by the subscript D, the values for the eikonic test lenses by the subscript E, the values for the iseikonic spectacles by the subscript S, the meridian by the angular value in the conventional axis notation for opthalmic cylinders used as a superscript, and the eye to which the quantity applies by the additional subscript R for the right eye and L for the left eye. The letters are used without brackets in the principal meridians (that is, as pointed out before, the meridians of astigmatism) only, the values in other meridians being indicated by placing the letter in brackets with the sub and superscripts outside the brackets. In order further to clarify this didactically important system of notation, some examples thereof will now be given. Thus, the quantity $g_{DR}^{75}$ means the value of $g$ for the dioptric test lenses before the right eye in the principal meridian 75. The quantity $[M]_{ER}^{60}$ means the value of the angular magnification of the eikonic test lenses before the right eye in the 60° meridian. The quantity $M_{SL}^{40}$ means the value of the angular magnification of the iseikonic spectacle lens before the left eye in the principal meridian 40. The quantity $[A]_{DR}^{0}$ means the meridian in which the image of the zero meridian of the eikonic target is formed by the dioptric test lenses before the right eye. The quantity $[A]_{SL}^{135}$ means the meridian in which the image of the 135° meridian of the eikonic target is formed by the iseikonic spectacle lens before the left eye. It should be remembered that the bracketed quantities have meaning only when used with reference to a pupil of the optical system.

There will be need to use intermediate parameters which are not properties of lenses but which are advantageous for purposes of the present invention. These will be indicated by the subscripts 1, 2, 3, etc.; the meaning of each subscript will be given as it is used. For example, the quantity $[M]_{1R}^{45}$ means the value of an intermediate value of M in the 45° meridian of the right eye. The bracket indicates that the 45° meridian is not a principal meridian. The quantity $g_{1L}^{60}$ means an intermediate value of $g$ in the principal meridian 60 of the left eye.

Using the above notation the conditions of equivalence for some special classes of cases will now be given.

(A) When there is no astigmatism error in either eye and no size or angular eikonic difference present after the refractive errors have been corrected with the dioptric test lenses.

In this case the conditions of equivalence are the following:

$$\left.\begin{array}{l}g_{SR}=g_{DR}\\ g_{SL}=g_{DL}\end{array}\right\}\text{IA}$$

$$\frac{M_{SR}}{M_{SL}}=\frac{M_{DR}}{M_{DL}}\quad\text{IIA}$$

Each of these identities applies to all meridians.

The general conditions reduce to the above in this case since in the absence of astigmatic and eikonic errors general conditions IIa are satisfied in all meridians by conditions IIA above. General conditions IIb are also satisfied since, as shown in the discussion of the general conditions of equivalence, the angular position of the images formed will be the same for all lens systems which have the same ratio of angular magnification in the principal meridians. Since that ratio is unity in this case for both the test lenses and the iseikonic spectacles, if there are no angular eikonic differences with the test lenses before the eyes there will be no angular eikonic differences with the iseikonic spectacles before the eyes.

(B) When there is no astigmatic error in either eye and an overall size change before one eye corrects all size and angular eikonic differences present after the refractive errors have been corrected with the dioptric test lenses.

In this case the conditions of equivalence are the following:

$$\left.\begin{array}{l}g_{SR}=g_{DR}\\ g_{SL}=g_{DL}\end{array}\right\}\text{IB}$$

$$\frac{M_{SR}}{M_{SL}}=\frac{M_{DR}\times M_{ER}}{M_{DL}\times M_{EL}}\quad\text{IIB}$$

Again, the quantities in each of these identities apply to all meridians.

The general conditions of equivalence reduce to the above since the angular magnification of the test lenses when used as they are used in the ophthalmo-eikonometer, (that is with the zero vergence power iseikonic test lenses between the dioptric test lenses and the eikonic target) is for obvious reasons the product of the angular magnification of the eikonic test lenses and the dioptric test lenses. The single relation II above satisfies the general conditions by the same reasoning given under (A).

(C) When there is no astigmatic error in either eye and an overall size change before one eye and a meridional size change before one or both eyes corrects all size and angular eikonic differences present after the refractive errors have been corrected with the dioptric test lenses.

Two cases must be distinguished under C: (1) when a meridional size change is introduced before only one eye or before both eyes with the meridians of symmetry at 90° to one another and (2) when a meridional size change is introduced before both eyes, the meridians about which the meridional size changes are symmetrical not being parallel or at 90° to one another.

For case (C1) the conditions of equivalence are the following:

$$\left.\begin{array}{l}g_{SR}=g_{DR}\\ g_{SL}=g_{DL}\end{array}\right\}\text{IC1}$$

$$\left.\begin{array}{l}\dfrac{M_{SR}^{m}}{M_{SL}^{m}}=\dfrac{M_{DR}\times M_{ER}^{m}}{M_{DL}\times M_{EL}^{m}}\\[6pt] \dfrac{M_{SR}^{m+90}}{M_{SL}^{m+90}}=\dfrac{M_{DR}\times M_{ER}^{m+90}}{M_{DL}\times M_{EL}^{m+90}}\end{array}\right\}\text{IIC1}$$

The quantities in conditions I apply to all meridians. In conditions II, $m$ or $m+90$ is the meridian about which the meridional size change is symmetrical.

The general conditions of equivalence IIa and IIb reduce to the above in this case for the following reasons, for whose explanation Fig. 13 will be followed. In this figure the value of $M_{DR}\times[M]_{ER}^{\theta}$ as a function of the angular value $\theta$ plotted in polar coordinates is shown by the curve marked $R_{DE}$ and the value of $M_{DL}\times[M]_{EL}^{\theta}$ as a function of the angular value $\theta$ plotted in polar coordinates is shown by the curve marked $L_{DE}$. In the example given the meridional size change is assumed to have been introduced before only the right eye, symmetrical about meridian $m$. Hence, $[M]_{EL}^{\theta}$ has the value unity for any value of $\theta$ and curve $L_{DE}$ is a circle of radius $M_{DL}$. The meridian of symmetry $m$ and the eikonic meridians 180°, 45°, 90° and 135° are shown in the figure.

The conditions of equivalence given above state that in corresponding diagrams for the iseikonic spectacles of which $R_s$ and $L_s$ of Fig. 13 are an example, the ratios of the radius vectors of curve R and curve L for the right and left eye, respectively, in the meridians $m$ and $m+90$ shall be the same as the ratios of the corresponding radius vectors for curves $R_{DE}$ and $L_{DE}$ in Fig. 13. Curves $R_S$ and $L_S$ of Fig. 13 are drawn with these ratios the same. Inspection of Fig. 13 shows that the ratios of the radius vectors of curves $R_S$ and $L_S$ in the eikonic meridians is substantially the same as the corresponding ratios for curves $R_{DE}$ and $L_{DE}$. In the same way this can be shown to be substantially true for any curves related to curves $R_{DE}$ and $L_{DE}$ by conditions of equivalence II above. Therefore in this special case (C1) conditions of equivalence II given above satisfy general conditions of equivalence II$a$.

Also in Fig. 13 lines $[A]^0_{ER}$ and $[A]^0_{EL}$ show the angular positions in which the 0 eikonic meridian is imaged by the test lenses before the right and left eyes respectively. Lines $[A]^0_{SR}$ and $[A]^0_{SL}$ show the corresponding angular positions in which the 0 meridian is imaged by the iseikonic spectacles characterized by curves $R_S$ and $L_S$. The angular deviations have been multiplied by the factor of 10 for clearness. Inspection of these curves shows that the iseikonic spectacles meet the general conditions of equivalence II$b$ for the 0 meridian. The same curves drawn for the other eikonic meridians show that the iseikonic spectacles meet the general conditions of equivalence II$b$ for the other eikonic meridians. It will now be evident that, for reasons shown in the same way, any iseikonic spectacles satisfying conditions of equivalence IIC1 given above satisfy general conditions of equivalence II$b$ for all the eikonic meridians.

For case (C2) the conditions of equivalence are the following:

$$\left.\begin{array}{l} \mathscr{E}^m_{SR} = \mathscr{E}^m_{DR} \\ \mathscr{E}^m_{SL} = \mathscr{E}^m_{DL} \end{array}\right\} \text{IC2}$$

$$\left.\begin{array}{l} \dfrac{M^m_{SR}}{M^{m+90}_{SR}} = \dfrac{M_{DR}}{M_{DR}} \times \dfrac{M^m_{ER}}{M^{m+90}_{ER}} \\ \dfrac{M^m_{SL}}{M^{m+90}_{SL}} = \dfrac{M_{DL}}{M_{DL}} \times \dfrac{M^n_{EL}}{M^{n+90}_{EL}} \\ \dfrac{M^m_{SR}}{M^n_{SL}} = \dfrac{M_{DR}}{M_{DL}} \times \dfrac{M^m_{ER}}{M^n_{EL}} \end{array}\right\} \text{IIC2}$$

In these conditions $m$ is the meridian about which the meridional size change before the right eye is symmetrical and $n$ is the meridian about which the meridional size change before the left eye is symmetrical.

The above conditions of equivalence IIC2 mean that the curves which show the relation between $[M]^\theta_{SR}$ and $\theta$ and between $[M]^\theta_{SL}$ and $\theta$, when these relations are plotted in polar coordinates, will be the same as the corresponding curves for the test lens except that the linear scale may be changed. Hence the ratios between the radius vectors of the curves in the eikonic meridians will be the same and all the angular positions in which the eikonic meridians are imaged will be the same for the iseikonic spectacles as for the test lenses. Therefore, iseikonic spectacles characterized by conditions of equivalence IC2 and IIC2 given above will satisfy the general conditions of equivalence I, II$a$ and II$b$.

(D) When there is an astigmatic error in one or both eyes with or without an ordinary refractive error in one or both eyes and no size or angular eikonic difference present after the refractive errors have been corrected with the dioptric test lenses.

Two cases must be distinguished here: (D1) when the principal meridians of the two eyes are parallel and (D2) when the principal meridians of the two eyes are not parallel.

The conditions of equivalence for case 1 are as follows:

$$\left.\begin{array}{l} \mathscr{E}^m_{SR} = \mathscr{E}^m_{DR} \\ \mathscr{E}^{m+90}_{SR} = \mathscr{E}^{m+90}_{DR} \\ \mathscr{E}^m_{SL} = \mathscr{E}^m_{DL} \\ \mathscr{E}^{m+90}_{SL} = \mathscr{E}^{m+90}_{DL} \end{array}\right\} \text{ID1}$$

$$\left.\begin{array}{l} \dfrac{M^m_{SR}}{M^m_{SL}} = \dfrac{M^m_{DR}}{M^m_{DL}} \\ \dfrac{M^{m+90}_{SR}}{M^{m+90}_{SL}} = \dfrac{M^{m+90}_{DR}}{M^{m+90}_{DL}} \end{array}\right\} \text{IID1}$$

In these conditions $m$ is a principal meridian of both eyes. Spectacles satisfying the above conditions of equivalence can be shown to satisfy the general conditions of equivalence in exactly the same way as explained under case (C1).

The conditions of equivalence for case (D2) are as follows:

$$\left.\begin{array}{l} \mathscr{E}^m_{SR} = \mathscr{E}^m_{DR} \\ \mathscr{E}^{m+90}_{SR} = \mathscr{E}^{m+90}_{DR} \\ \mathscr{E}^n_{SL} = \mathscr{E}^n_{DL} \\ \mathscr{E}^{n+90}_{SL} = \mathscr{E}^{n+90}_{DL} \end{array}\right\} \text{ID2}$$

$$\left.\begin{array}{l} \dfrac{M^m_{SR}}{M^{m+90}_{SR}} = \dfrac{M^m_{DR}}{M^{m+90}_{DR}} \\ \dfrac{M^n_{SL}}{M^{n+90}_{SL}} = \dfrac{M^n_{DL}}{M^{n+90}_{DL}} \\ \dfrac{M^m_{SR}}{M^n_{SL}} = \dfrac{M^m_{DR}}{M^n_{DL}} \end{array}\right\} \text{IID2}$$

In these conditions, $m$ is a principal meridian of the right eye and $n$ is a principal meridian of the left eye. Spectacles satisfying the above conditions of equivalence can be shown to satisfy the general conditions of equivalence in exactly the same way as explained under case (C2).

(E) When there is an astigmatic error in one or both eyes with or without an ordinary refractive error in one or both eyes and all size and angular eikonic differences present after the refractive errors have been corrected with the dioptric test lenses can be corrected by overall size changes before either eye and by meridional size changes which are symmetrical about a principal meridian of the eye before which the meridional size change is made.

Two cases must be distinguished here—(E1) when the principal meridians of the two eyes are parallel, and (E2) when the principal meridians of the two eyes are not parallel.

The conditions of equivalence for case 1 are as follows:

$$\left.\begin{array}{l} \mathscr{E}^m_{SR} = \mathscr{E}^m_{DR} \\ \mathscr{E}^{m+90}_{SR} = \mathscr{E}^{m+90}_{DR} \\ \mathscr{E}^m_{SL} = \mathscr{E}^m_{DL} \\ \mathscr{E}^{m+90}_{SL} = \mathscr{E}^{m+90}_{DL} \end{array}\right\} \text{IE1}$$

$$\left.\begin{array}{l} \dfrac{M^m_{SR}}{M^m_{SL}} = \dfrac{M^m_{DR} \times M^m_{ER}}{M^m_{DL} \times M^m_{EL}} \\ \dfrac{M^{m+90}_{SR}}{M^{m+90}_{SL}} = \dfrac{M^{m+90}_{DR} \times M^{m+90}_{ER}}{M^{m+90}_{DL} \times M^{m+90}_{EL}} \end{array}\right\} \text{IIE1}$$

In these conditions $m$ is a principal meridian of both eyes. Spectacles satisfying the above conditions of equivalence can be shown to satisfy the general conditions of equivalence in exactly the same way as explained under case (C1).

The conditions of equivalence for case 2 are as follows:

$$\left.\begin{array}{l} g_{SR}^m = g_{DR}^m \\ g_{SR}^{m+90} = g_{DR}^{m+90} \\ g_{SL}^n = g_{DL}^n \\ g_{SL}^{n+90} = g_{DL}^{n+90} \end{array}\right\} \text{IE2}$$

$$\left.\begin{array}{l} \dfrac{M_{SR}^m}{M_{SR}^{m+90}} = \dfrac{M_{DR}^m \times M_{ER}^m}{M_{DR}^{m+90} \times M_{ER}^{m+90}} \\[6pt] \dfrac{M_{SL}^n}{M_{SL}^{n+90}} = \dfrac{M_{DL}^n \times M_{EL}^n}{M_{DL}^{n+90} \times M_{EL}^{n+90}} \\[6pt] \dfrac{M_{SR}^m}{M_{SL}^n} = \dfrac{M_{DR}^m \times M_{ER}^m}{M_{DL}^n \times M_{EL}^n} \end{array}\right\} \text{IIE2}$$

In these conditions $m$ is a principal meridian of the right eye and $n$ is a principal meridian of the left eye.

Spectacles satisfying the above conditions of equivalence can be shown to satisfy the general conditions of equivalence in exactly the same way as explained under case (C2).

(F) When there is an astigmatic error in one or both eyes with or without an ordinary refractive error and all size and angular eikonic differences present after the refractive errors have been corrected with the dioptric test lenses can be corrected by an overall size change before one eye and a meridional size change, which is not symmetrical about a principal meridian of the eye before which it is placed, before one or both eyes.

In this case the conditions of equivalence are the following:

$$\left.\begin{array}{l} g_{SR}^m = g_{DR}^m \\ g_{SR}^{m+90} = g_{DR}^{m+90} \\ g_{SL}^n = g_{DL}^n \\ g_{SL}^{n+90} = g_{DL}^{n+90} \end{array}\right\} \text{IF}$$

In these conditions $m$ is a principal meridian of the right eye and $n$ a principal meridian of the left eye.

$$\left.\begin{array}{l} \dfrac{[M]_{SR}^{45}}{[M]_{SL}^{45}} = \dfrac{[M]_{DR}^{45} \times [M]_{ER}^{45}}{[M]_{DL}^{45} \times [M]_{EL}^{45}} \\[6pt] \dfrac{[M]_{SR}^{90}}{[M]_{SL}^{90}} = \dfrac{[M]_{DR}^{90} \times [M]_{ER}^{90}}{[M]_{DL}^{90} \times [M]_{EL}^{90}} \\[6pt] \dfrac{[M]_{SR}^{135}}{[M]_{SL}^{135}} = \dfrac{[M]_{DR}^{135} \times [M]_{ER}^{135}}{[M]_{DL}^{135} \times [M]_{EL}^{135}} \\[6pt] \dfrac{[M]_{SR}^{180}}{[M]_{SL}^{180}} = \dfrac{[M]_{DR}^{180} \times [M]_{ER}^{180}}{[M]_{DL}^{180} \times [M]_{EL}^{180}} \end{array}\right\} \text{IIaF}$$

$$\left.\begin{array}{l} [A]_{SR}^{45} - [A]_{SL}^{45} = [A]_{DR}^{45} - [A]_{DL}^{45} + [A]_{ER}^{45} - [A]_{EL}^{45} \\ [A]_{SR}^{90} - [A]_{SL}^{90} = [A]_{DR}^{90} - [A]_{DL}^{90} + [A]_{ER}^{90} - [A]_{EL}^{90} \\ [A]_{SR}^{135} - [A]_{SL}^{135} = [A]_{DR}^{135} - [A]_{DL}^{135} + [A]_{ER}^{135} - [A]_{EL}^{135} \\ [A]_{SR}^{180} - [A]_{SL}^{180} = [A]_{DR}^{180} - [A]_{DL}^{180} + [A]_{ER}^{180} - [A]_{EL}^{180} \end{array}\right\} \text{IIbF}$$

It will be noticed that the conditions of equivalence given under case (F) are the previously given general conditions of equivalence written in the adopted notation. They can be written in somewhat simpler form if the finished iseikonic spectacles are to be made up as a spectacle of the form according to the present invention as for example shown in Figs. 26 to 30 with the addition in the form of an auxiliary meridional magnifier before one or both eyes of the meridional size change found necessary to correct the size and angular eikonic differences, present after the refractive errors have been corrected with the dioptric test lenses and the overall size change necessary has been placed before one eye.

The spectacles, according to the present invention, without the above auxiliary meridional magnifiers must meet the conditions of equivalence IF1 and the following conditions. Two cases must be distinguished (1) when the principal meridians of the two eyes are parallel and (2) when the principal meridians of the two eyes are not parallel. In case (1) the conditions II for the ordinary spectacle are then given under IIE1 where the subscript E applies only to the overall size change introduced. In case (2) the conditions II for the ordinary spectacle are then given in IIE2 where again the subscript E applies only to the overall size change introduced. The finished iseikonic spectacles will then consist of ordinary spectacles which meet the conditions of equivalence just given and a zero power meridional iseikonic lens before one or both eyes which changes the size the same amount and symmetrically about the same meridian as the meridional size change found necessary before each eye.

(G) In addition to the above there are many cases which do not come under any of the above special cases. If all size and angular eikonic differences present after correction of the refractive defects with the dioptric test lenses cannot be corrected by overall changes in size or by meridional changes in size the following procedure is adopted. The size differences in the 90° and 180° eikonic meridian are corrected with overall size changes and meridional size changes which are symmetrical about the 90° or 180° meridian and the size changes necessary are noted. Then the size differences in the 45° and 135° meridians are corrected with overall size changes and meridional size changes which are symmetrical about the 45° or 135° meridians, and the size changes necessary are noted. Then the angular differences present are corrected in each eikonic meridian, one at a time, with lens or lenses 5 and the axis setting of 5 necessary to correct each meridian is noted.

The above procedure may also be used in cases which come under special cases C(2), E, and F since it will in most instances be very much quicker for the clinician to use this procedure and then use the following analysis to ascertain if the case is one which falls under C(2) or E or F than it would be for the clinician to find by trial and error just those size changes in the principal meridians which correct all the size and angular eikonic differences if the case is one which falls under E, or to find by trial and error just what size changes symmetrical about what meridians are necessary to correct all the size and angular eikonic differences present after the refractive errors have been corrected with the dioptric test lenses if the case is one which falls under C(2) or F. In general the above procedure may be used in all cases to measure the eikonic differences present after the refractive errors have been corrected with the dioptric test lenses. If the following analysis is then used, correct iseikonic spectacles will be provided if the case is any one of those given under A, B, C, D, E or F, and the best practical spectacles will be provided if the case is such as discussed under G.

When the above procedure is used the conditions of equivalence are the following, whereby it will be evident that the magnifications of a lens element which has power and of one which has no power (the element of no power being between the power element and the object) are combined by multiplying them and that angular displacements are combined by adding the angular deviations of the meridians as imaged by the various elements $$\left.\begin{array}{l}g^m_{SR} = g^m_{DR} \\ g^{m+90}_{SR} = g^{m+90}_{DR} \\ g^n_{SL} = g^n_{DL} \\ g^{n+90}_{SL} = g^{n+90}_{DL}\end{array}\right\} \text{IG}$$

In these conditions $m$ is a principal meridian of the right eye and $n$ a principal meridian of the left eye.

$$\left.\begin{array}{ll}\dfrac{[M]^{90}_{SR}}{[M]^{90}_{SL}} = \dfrac{[M]^{90}_{DR} \times [M]^{90}_{ER}}{[M]^{90}_{DL} \times [M]^{90}_{EL}} & (1) \\ \dfrac{[M]^{180}_{SR}}{[M]^{180}_{SL}} = \dfrac{[M]^{180}_{DR} \times [M]^{180}_{ER}}{[M]^{180}_{DL} \times [M]^{180}_{EL}} & (2) \\ \dfrac{[M]^{45}_{SR}}{[M]^{45}_{SL}} = \dfrac{[M]^{45}_{DR} \times [M]^{45}_{ER}}{[M]^{45}_{DL} \times [M]^{45}_{EL}} & (3) \\ \dfrac{[M]^{135}_{SR}}{[M]^{135}_{SL}} = \dfrac{[M]^{135}_{DR} \times [M]^{135}_{ER}}{[M]^{135}_{DL} \times [M]^{135}_{EL}} & (4)\end{array}\right\} \text{IIaG}$$

In these conditions IIa the subscript E in (1) and (2) refers to the eikonic test lenses which corrected the size differences in the 90° and 180° meridians. The subscript E in (3) and (4) refers to the eikonic test lenses which corrected the size differences in the 45° and 135° meridians. Therefore, conditions for case G are not identical with those for F.

$$\left.\begin{array}{l}[A]^{45}_{SR} - [A]^{45}_{SL} = [A]^{45}_{DR} - [A]^{45}_{DL} + [A]^{45}_{ER} - [A]^{45}_{EL} \quad (1) \\ {[A]}^{90}_{SR} - [A]^{90}_{SL} = [A]^{90}_{DR} - [A]^{90}_{DL} + [A]^{90}_{ER} - [A]^{90}_{EL} \quad (2) \\ {[A]}^{135}_{SR} - [A]^{135}_{SL} = [A]^{135}_{DR} - [A]^{135}_{DL} + [A]^{135}_{ER} - [A]^{135}_{EL} \quad (3) \\ {[A]}^{180}_{SR} - [A]^{180}_{SL} = [A]^{180}_{DR} - [A]^{180}_{DL} + [A]^{180}_{ER} - [A]^{180}_{EL} \quad (4)\end{array}\right\} \text{IIbG}$$

In these conditions IIb the subscript E refers in (1) to the eikonic test lenses which corrected the angular eikonic difference in the 45° meridian; in (2) to the eikonic test lenses which corrected the angular eikonic difference in the 90° meridian; in (3) to the eikonic test lens which corrected the angular eikonic difference in the 135° meridian; and in (4) to the eikonic test lens which corrected the angular eikonic difference in the 180° meridian.

According to the present invention, when a patient is examined with the ophthalmo-eikonometer and the refractive errors and eikonic differences present after correction of the refractive errors with the dioptric test lenses are not then given under any of the simple cases given in (A), (B), (C), (1), (D) or E(1) above, the eikonic differences may be measured by the procedure given in (G) after which the following procedure will determine whether or not the case is one coming under (A), (B), (C), (D), (E) or (F), and in either of these provide iseikonic spectacles which completely correct the refractive errors and eikonic differences. If the case is one which does not come under either (A), (B), (C), (D), (E) or (F), the following procedure will provide spectacles which completely correct the refractive errors, completely correct some of the eikonic differences, and partially but for practical purposes sufficiently correct the other eikonic differences. The choice as to which eikonic differences are to be completely corrected and which are to be only partially corrected is to be determined by their relative importance in the functioning of the eyes in binocular vision. If the eight eikonic differences considered, one size and one angular in each eikonic meridian, are weighted in importance in any manner whatsoever, then the present method will in most cases provide spectacles in which the amount of uncorrected eikonic difference is inversely proportional to its assigned importance in the functioning of the eye in binocular vision.

In the practical carrying out of the computations of the iseikonic eyeglasses it has been found best to use the parameter 230 log M instead of M. This is so because all the conditions of equivalence II are expressed as ratios and products of the M's. When the parameter 230 log M is used all the ratios can be expressed as simple differences and the products as simple sums. The factor 230 (which is $100 \times ln 10$) is introduced to bring the parameter substantially equal to per cent when the value of M is close to unity. This value will be referred to shortly as LM; that is, $LM = 230 \log M$. The replacement of the products and ratios by sums and differences brings about very considerable simplifications in the graphical methods preferred in carrying out the present invention.

The first step in computing iseikonic eyeglasses from the clinical record is to determine the reciprocal image distance $$g_D = \frac{1}{b}$$

and the magnification parameter $$LM_D = 230 \log \frac{\alpha'}{\alpha} \text{ values}$$

(compare the previous explanation with reference to Fig. 9) for the dioptric test lenses (1 and 2 of Fig. 7) in the principal meridians. For practical purposes, these values are calculated, according to well known conventional methods, for each combination of units of the dioptric trial lens set belonging to the particular ophthalmoeikonometer used for the distances from the cornea at which these lenses are placed, and put down in tables for convenient reference. These values will herein be referred to as $g_D$ and $LM_D$ values.

The second step in computing iseikonic eyeglasses from the clinical record is to find the values of $LM_E$, the angular magnification of the eikonic test lenses. $M_E$ is expressed in the clinical record in per cent size. If the eikonic test lenses give an image which is five (5%) per cent larger than the object the value of $M_E$ is 1.05. The logarithm of 1.05 is .02119. Then $LM_E$ is $230 \times .02119 = 4.87$. If the eikonic test lenses give an image which is five (5%) per cent smaller than the object the value of $M_E$ is 0.95. The logarithm of 0.95 is $-.02228$. Then $LM_E$ is $230 \times -.02228 = -5.12$. In the same way the value of $LM_E$ can be found for any value of per cent increase or decrease. These values for each value of the eikonic test lenses used are put down in tables for convenient reference. If the eikonic test lenses are continuously adjustable a better way is to plot the relation between $LM_E$ and per cent on a graph which has per cent for abscissa and $LM_E$ for ordinate. From this graph the value of $LM_E$ for any value of per cent increase or decrease can be quickly and easily read.

In special cases (A), (B), (C), (D), and (E) the third step in the computation is to find the total value of 230 times the logarithm of the angular magnification in the principal meridians when there is astigmatism, in the meridians about which the meridional size changes are symmetrical when there is no astigmatism, and for any meridian when there is no meridional size change. This value will be referred to as $LM_1$ with superscripts and subscripts referring to the meridian and eye respectively as before. In these special cases the value of $LM_1$ for any meridian of any eye is the sum of the values $LM_D$ and the $LM_E$'s for the same meridian for the same eye. i. e.

$$LM^\theta_{IR} = LM^\theta_D + LM^\theta_{ER}|_O + LM^\theta_{ER}|_M$$

wherein $\theta$ is a principal or symmetrical meridian and the O refers to the overall size change and the M to the meridional size changes. If more eikonic lenses are used there will be more terms on the right hand of the above, a term for each lens or lens system.

In the special cases (F) and (G) and in the other cases when the test given under (G) is used, the following procedure is adopted according to the present invention. In these cases the conditions of equivalence involve ratios of the angular magnification in meridians other than the principal ones and relations between the angular relationships in which radial lines in the eikonic target are imaged. Before the computation can proceed in these cases it is necessary to select values of the angular magnifications in the principal meridians such that the ratios in eikonic meridians are the correct ones and such that the angular relationship in which lines in the eikonic target and in the eikonic meridians are imaged are the correct ones according to general conditions of equivalence IIa and IIb, if such a solution is possible. If such a solution is not possible it is necessary to select such values of the angular magnification in the principal meridians that the remaining size and angular eikonic differences are either present only where they have small importance in the functioning of the eyes in binocular vision or can be substantially corrected with the addition before one or both eyes of a zero power meridional magnifier of selected magnification symmetrical about a selected meridian, both of which quantities may be different in the two eyes.

Before explaining the details of the procedure which is used to select the proper values of the angular magnification in the principal meridians it will be well to remember that the angular magnifications in meridians other than the principal ones has been defined as the radius vector of the ellipse of which the angular magnification in the principal meridians are the axes. The angle in which any radial line is imaged is defined as that angle which the radius vector of the ellipse, which vector corresponds to the radius of the eccentric circle formed by the radial line, makes with the axis of reference. The meaning of these definitions will be clear from Fig. 12. In this figure the ellipse CM of angular magnification for an optical system which has an angular magnification of $M^\theta$ in meridian $\theta$ and $M^{\theta+00}$ in meridian $(\theta+90)$ is plotted in polar coordinates. The eccentric circles for the ellipse is indicated by C. The value of $[M]^\phi$ and $[A]^\phi$ for meridian $\phi$ is then given as indicated in the figure.

Let $M^\theta$ and $M^{\theta+90}$ be the values of the angular magnifications in the principal meridians $\theta$ and $\theta+90$. Then as is well known from the geometry of conic sections the length of the radius vector of the ellipse defined by the above axes in meridian $\theta+\phi$, referring now to Fig. 12a, where the angle $\phi$ is measured in the eccentric circle is given by the relation:

$$([M]^{\theta+\phi})^2 = (M^\theta)^2 - \{(M^\theta)^2 - (M^{\theta+90})^2\} \sin^2(\phi)$$

From this relation it is seen that the relation between $([M]^{\theta+\phi})^2$ and $\sin^2(\phi)$ is a linear one. Hence if coordinate paper be used in which the abscissa are equal intervals of $\sin^2(\phi)$ and the ordinates are equal intervals of $([M]^{\theta+\phi})^2$ the value of the radius vector plotted on this paper will be a straight line. In practice the lines for equal steps of $(\phi)$ are preferably drawn and labelled on the abscissa axis and the lines for equal steps of LM are drawn and labelled on the ordinate axis. On such paper the value of $$L[M]^{\theta+\phi}$$

for any value of $(\theta+\phi)$ can be quickly and easily found in the following manner: The point $$LM = LM^\theta$$

is plotted on the $\phi=0$ line and the point $$LM = LM^{\theta+90}$$

is plotted on the $\phi=90°$ line. These two points are then connected by a straight line. The value of LM where this line intersects the line $\phi=\phi$ is the value of $L[M]^{\theta+\phi}$.

The image meridian in which any object meridian is imaged by an optical system which has angular magnifications in the principal meridians given by $LM^\theta$ and $LM^{\theta+90}$ can be found as follows: Let the meridian the positions of whose image is sought be given by $\theta+\phi$ and the meridian of the image be given by $[A]^{\theta+\phi}$. Then as is well known from the geometry of the ellipse, $$[A]^{\theta+\phi} = \arctan\left\{\frac{M^{\theta+00}}{M^\theta}\tan(\phi)\right\} + \theta$$

From this relation it is seen that the angular position of the image is a function of $M^{\theta+90}/M^\theta$ and $\phi$ only, or a function of $(LM^{\theta+90} - LM^\theta)$ and $\phi$ only. It also shows that when this ratio is unity the image is in the same meridian as the object. This is also true when $\phi$ is either 0° or 90°, i. e., in the principal meridians.

This relation is used to set up a table giving the angular changes introduced by lenses or lens system 5 in Fig. 7. For example let lens system 5 be such that it magnifies four (4%) per cent in one meridian and does not magnify in the meridian at right angles to this one, that is, the meridian of symmetry. Let this lens system be set with its meridian of symmetry at angle $\theta$. Then the angular position of the image of a meridian of the object at angle $\theta+\phi$ can be found as follows from the relation for $[A]^{\theta+\phi}$:

$$[A]^{\theta+\phi} = \theta + \arctan\{1.04 \times \tan(\phi)\}$$

From this relation the value of $[A]^0$, $[A]^{45}$, $[A]^{90}$, and $[A]^{135}$ can be tabulated for various values of $\theta$ and the meridian of the image of any eikonic meridian for any value of $\theta$ can be immediately read from the tabular values. In practice it is better to tabulate $[A]^{\theta+\phi} - (\theta+\phi)$, as will be obvious from the subsequent explanation of the procedure of handling the angular differences.

In the actual carrying out of the computation of iseikonic eyeglasses the above relations are used in the following manner:

Three transparencies are prepared. The first of these has ruled upon it horizontal lines for equal steps of LM on a linear scale for $M^2$. The range covered is sufficient to include the maximum difference in LM between the principal meridian of the lenses before a single eye. Three vertical lines, equidistant from one another, and at a convenient separation are also drawn on this sheet. These lines, for reasons which will be apparent from the following description, are labelled the 0°, 90°, and 180° lines. Such a sheet is shown in Fig. 14. The two other transparencies, which are exactly alike, are ruled with vertical lines for equal steps of the angle $\theta$ on a linear scale for $\sin^2\theta$. The scale is so chosen that the lines $\theta=0$ and $\theta=90°$ have exactly the same separation as the lines 0° and 90° on the lower transparency. Such a transparency is shown in Fig. 15. As will be seen from this figure, the range from 0 to 180° in $\theta$ is covered, but the center line is labelled 0° and the two end lines are both labelled 90°, with the intervening lines labelled accordingly.

These three transparencies are placed and mounted over a diffuse light source, so that two of them can be moved parallel to the constant LM lines only. The first sheet is placed below the other two. Such an arrangement with the lower and upper transparencies movable parallel to the constant LM lines is shown in Fig. 16 where 51 represents the first sheet according to Fig. 14, and 52 and 53 the identical sheets according to Fig. 15. Over the three transparencies is placed a sheet of semi-transparent paper upon which to draw the lines representing the ellipses of magnification.

Suppose the dioptric test lenses before the right eye in a particular test record have principal meridians $\theta$, $\theta+90$, and before the left eye principal meridians $\phi$, $\phi+90$ and angular magnifications given by $$LM_{DR}^{\theta}, LM_{DR}^{\theta+90}, LM_{DL}^{\phi}, LM_{DL}^{\phi+90}$$

in the principal meridians. Let $\theta$ and $\phi$ be so chosen that they are between 0° and 90°. The lower transparency is now moved until the 0° line on it is directly under the $\theta$ line to the left of 0° on the middle sheet. The upper transparency is now moved until the $\phi$ line to the left of 0° is directly over the 0° line of the lower transparency. The value of $LM_{DR}^{\theta}$ is now plotted on the 0° line of the middle transparency and the value of $LM_{DR}^{\theta+90}$ is plotted on both the 90° lines. The value of $LM_{DL}^{\phi}$ is plotted on the 0° line of the upper transparency and the value of $LM_{DL}^{\phi+90}$ is plotted on both the 90° lines. These points are plotted on the semi-transparent sheet using the scale of LM values given by the constant LM lines which are on the lower transparency. The points for $LM_{DR}^{\theta}$ and $LM_{DR}^{\theta+90}$ are now connected with straight lines. Similarly for the points for $LM_{DL}^{\phi}$ and $LM_{DL}^{\phi+90}$. The separation of these lines, i. e., the one for the lenses before the right eye and for lenses before the left eye where they cross the 0° and 90° lines on the lower transparency is then $$L[M]_{DR}^{0}-L[M]_{DL}^{0} \qquad (1)$$

and $$L[M]_{DR}^{90}-L[M]_{DL}^{90} \qquad (2)$$

The value of $L[M]_{DR}^{45}$ will be given by the value of $L[M]$ where the line for the right eye lenses crosses the $(45-\theta)°$ or $(\theta-45)°$ line (whichever is positive) on the middle transparency. This point is marked. The value of $L[M]_{DR}^{135}$ will be given by the value of $L[M]$ where the line for the right eye lenses crosses the $(135-\theta)°$ or the $(45+\theta)°$ (whichever is between 0° and 90°) on the middle transparency. This point is marked. In the same way using the upper transparency and the lines for the left eye lenses the points for $L[M]_{DL}^{45}$ and $L[M]_{DL}^{135}$ are marked. It should be noticed that in general the points $L[M]_{DR}^{45}$ and $L[M]_{DL}^{45}$ will not be on the same vertical line. Similarly the points for $L[M]_{DR}^{135}$ and $L[M]_{DL}^{135}$ will in general not be on the same vertical line.

From these plotted points the values of $$L[M]_{DR}^{45}-L[M]_{DL}^{45} \qquad (3)$$

and $$L[M]_{DR}^{135}-L[M]_{DL}^{135} \qquad (4)$$

can now be immediately read on the scale of the lower transparency.

The general condition of equivalence IIa state that the analogous differences for the iseikonic spectacles shall be the following:

$$L[M]_{SR}^{0}-L[M]_{SL}^{0}=L[M]_{DR}^{0}-L[M]_{DL}^{0}+L[M]_{ER}^{0}-L[M]_{EL}^{0} \qquad (5)$$

with similar relations for the 45°, 90° and 135° meridians. The values $L[M]_{ER}-L[M]_{EL}$ for the 0°, 45°, 90° and 135° meridians are known from the clinical record.

It will be evident that each inclined line of Fig. 17 represents one ellipse quadrant and that actually only two half ellipses are shown in that figure, which corresponds to actual practice where the diagram is simplified in this manner. Hence, in order to obtain the correct LM values in the 45° and 135° eikonic meridians, the above procedure of using the angle values of the upper and middle sheets instead of the lower sheet (as for the 0° and 90° meridians) must be applied, which is equivalent to using full ellipses and a correspondingly extended lower sheet.

The above explanation will perhaps be made clearer by Fig. 17. In this figure values of the angular magnifications of the dioptric test lenses before the right eye plotted in polar coordinates is shown in curve $R_P$, the corresponding values for the left eye on the same diagram by $L_P$. The same values plotted according to the method just given are shown below the polar coordinate system. The polar diagram corresponds to Fig. 13.

On this plot the curve for the lenses before the right eye is indicated by $R_N$ and for the lenses before the left eye by $L_N$. The various quantities used in the above relations are shown in both diagrams and the same quantities in each diagram are connected with each other by lines.

It will now be apparent that a similar diagram for the iseikonic spectacles will have the proper values of $L[M]_{SR}-L[M]_{SL}$ in the 0°, 45°, 90° and 135° meridians. If such a diagram can be drawn the values $$LM_{IR}^{\theta}, LM_{IR}^{\theta+90}, LM_{IR}^{\phi}, \text{ and } LM_{IR}^{\phi+90}$$

can be read immediately from the intersection of the 0° and 90° lines of middle and upper transparencies with the lines for the right and left eyes respectively. Eyeglasses with the $M_1$ values would satisfy general conditions of equivalence IIa.

Such a diagram or the closest approach possible can quickly be drawn from the above diagram and the values of $L[M]_{ER}^{0}-L[M]_{EL}^{0}$, etc. which are known directly from the clinical record. But before describing the details of this process it will be well to consider the second part of the general conditions of equivalence, namely condition IIb. Before taking this up it should be noticed that in relation (5) a constant $K_R$ may be added to $L[M]_{DR}$ for all meridians and a constant $K_L$ may be added to $L[M]_{DL}$ for all meridians. The values $$L[M]_{DR}^{\theta}+K_R, \quad L[M]_{DR}^{\theta+90}+K_R, \quad L[M]_{DL}^{\theta}+K_L, \quad L[M]_{DL}^{\theta+90}+K_L$$

are now used instead of the actual values of $L[M]$ for the dioptric test lenses. Then if new lines are drawn having the proper altered differences in the eikonic meridians, the intersections of these new lines with the principal meridian must be decreased by $K_R$ and $K_L$ for the right and left eyes respectively. The final values will then be such that spectacles having these values for the angular magnifications will satisfy general conditions of equivalence IIa.

The above procedure is used in order to permit the use of a lower transparency according to Fig. 14, where the LM range only covers the maximum difference in LM. This is made possible by choosing $K_R$ so that the least $LM+K_R$ for the right eye lenses is 0.00 and choosing $K_L$ so that the least $LM+K_L$ for the left eye lenses is also 0.00. This procedure also makes easier the selection of the values of the angular magnifications in the principal meridians which will correct the angular eikonic differences. In what follows it is assumed that the lowest $LM+K$ for each eye lens or lenses has been reduced to 0.00 by the procedure given above.

The first step in selecting such values of the angular magnifications in the principal meridians that the angular eikonic differences are corrected is to find the angular deviations introduced by the dioptric test lenses. These can be found by the following procedure from the straight lines drawn on the semi-transparent sheet as shown in Fig. 17.

The relation given for the meridian $[A]^{\theta+\phi}$ in which any meridian $\theta+\phi$ is imaged by an optical system having angular magnifications $M^{\theta}$ and $M^{\theta+90}$ was $$[A]^{\theta+\phi}=\arctan\left\{\frac{M^{\theta+90}}{M^{\theta}}\tan(\phi)\right\}+\theta \quad (6)$$

Hence the value of the angular deviation is $$[A]^{\theta+\phi}-(\theta+\phi)=\arctan\left\{\frac{M^{\theta+90}}{M^{\theta}}\tan(\phi)\right\}-\phi \quad (7)$$

From this relation a fourth transparency is prepared as shown in Fig. 18. This figure shows the four possible positions of the transparency in relation to the nomogram shown in Fig. 17. That position is always used for which $\theta$ is greater than 45°.

In this figure the vertical scale is a linear one in $M^2$ with the same scale as used in the lower transparency according to Fig. 14. The horizontal scale is a linear one in $\sin^2\theta$ with the separation between the lines for $\theta=0°$ and $\theta=90°$ the same as on the middle and upper transparencies according to Fig. 15. Using these scales the lines for even steps of constant angular deviation are then drawn in. The angular deviation is not measured in degrees but in a unit which is analogous to per cent except that the separation is at right angles to, instead of along a radius vector. Hence one angular deviation unit is equal to 1/100 radian which is 0.573 degree. This unit is used so as to keep the size and angular differences in the same units. This simplifies the process of proportioning the differences remaining in any chosen manner. The tables for evaluating the data of lens system 5, previously mentioned, are also in the new angular deviation unit. The iso-deviation lines are drawn in for each tenth unit. Only one-half units are being shown in Fig. 18 for the sake of clarity.

By placing this transparency over the straight lines which represent the ellipse of magnification with the 0° line of the transparency over the 0° or 90° line of the upper or middle diagram and the 0.00 horizontal line of the transparency over the intersection of the straight line with the 0° or 90° line of the upper or middle diagram, the angular deviation of any meridian $\phi$ can be immediately read. The value of the iso-deviation line which passes through the point where the vertical line $(\phi-\theta)$ ($\theta$ being the principal meridian between 0° and 90°) crosses the straight line representing the ellipse of magnification is the deviation for meridian $\phi$. These values can be read at once for the eikonic meridians since the 0° and 90° meridians are given on the lower transparency and the 45° and 135° meridians for both the middle and upper transparency are given by the plotted points for the log of the angular magnifications indicated on Fig. 17 at 91, 92, 93, 94, respectively. The value of the deviation is now corrected by the amount of angular difference shown in the clinical record. If the principal meridians of the two eyes are nearly parallel the change in slope necessary to correct each eikonic meridian is noted. This can be done immediately with the aid of the fourth transparency in the following way:

The point where the iso-deviation line equal to the deviation given by the dioptric test lenses plus the measured difference crosses the eikonic meridian line is connected with the point 0.00, 0° (OA of Fig. 18) by a straight line. The slope of this straight line is the slope necessary to correct the angular difference in the eikonic meridian. If the principal meridians of the two eyes are not nearly parallel the difference in deviation between the two eyes necessary to correct the angular eikonic difference is noted for each meridian. This difference will be the sum of the deviations for dioptric and eikonic test lenses before the right eye when no angular difference in the eikonic meridian was present minus the sum of the deviations for dioptric and eikonic test lenses before the left eye when no angular difference in the eikonic meridian was present.

The problem now is to find such straight lines representing ellipses of angular magnification for each eye that there are no size differences in any eikonic meridian and no angular differences in any eikonic meridian. If no straight lines which correct all differences can be found then the problem is to find the ones which correct all the differences which are of first importance in the functioning of the eye in binocular vision, and to keep the differences which are of secondary importance as small as possible. If these secondary differences are still too large, or in certain cases, if all the differences of first importance can not be corrected, then the lines are chosen so that the remaining differences can be corrected with a zero power meridional magnifier of selected magnification symmetrical about a selected meridian before one eye or, if necessary, before both eyes.

The procedure used in selecting the proper straight lines for each eye is one of trial and error by successive approximations. Trial lines are drawn on the above-mentioned sheet of semi-transparent paper, which correct some of the differences, usually those considered of first importance, and the other differences determined. From a comparison of the differences present with the first trial lines and present with the lines for the dioptric test lenses only, a second set of trial lines can be drawn. This process is continued until a satisfactory solution is found. In practice it has been found that after some experience only a very few trials are necessary before a satisfactory solution is obtained. This takes only a short time since the differences present with any lines can be quickly determined by the methods just given. If no satisfactory solution can be found, lines are chosen which give differences which can be satisfactorily corrected with one or two meridional magnifiers. These are found by comparing the differences given by the trial lines with the known difference which can be corrected with meridional magnifiers.

After satisfactory lines are found by the method just described the values of LM where the lines for the right eye cross the 0° and 90° lines of the middle transparency are noted. These values are $$LM_{1R}^t + K_R \text{ and } LM_{1R}^{t+90} + K_R$$

respectively. In the same way the value of LM where the lines for the left eye cross the 0° and 90° lines of the upper transparency are noted. These values are $$LM_{1L}^t + K_L \text{ and } LM_{1L}^{t+90} + K_L$$

respectively.

From these values $$LM_{1R}^t, LM_{1R}^{t+90}, LM_{1L}^t, \text{ and } LM_{1L}^{t+90}$$

can be found since $K_R$ and $K_L$ are known. Eyeglasses having these values of the LM's will then either correct the differences found and measured to a sufficient degree of exactitude or will have differences which can be corrected to a sufficient degree of exactitude with one or two meridional magnifiers whose magnification value or values, and symmetrical meridian or meridians are known from the analysis carried out in finding the LM's.

In cases which come under (F) it may be desirable to carry out an analysis to see whether the differences found can be corrected to a sufficient degree of exactitude with eyeglasses having properly selected values of M in the principal meridians, since such eyeglasses can be made in the new form according to the present invention without the addition of separate meridional magnifiers mentioned hereinbefore. This process is carried out by finding the size and angular eikonic differences corrected in each eikonic meridian by the meridional size change before each eye. These can be found from the known properties of the meridional systems 4 (Fig. 7). After these quantities are found the analysis is carried out exactly as if the procedure given under G had been used in the measurement.

The analysis just described gives, in both cases, the four values $$LM_{1R}^t, LM_{1R}^{t+90}, LM_{1L}^t, \text{ and } LM_{1L}^{t+90}$$

In terms of these values the conditions of equivalence for the iseikonic spectacles are the following: Two cases must be distinguished; (1) when the principal meridians are parallel, and (2) when they are not parallel. For case (1) the conditions are:

$$\left.\begin{array}{l}g_{SR}^m = g_{DR}^m \\ g_{SR}^{m+90} = g_{DR}^{m+90} \\ g_{SL}^m = g_{DL}^m \\ g_{SL}^{m+90} = g_{DL}^{m+90}\end{array}\right\} I(1)$$

and $$\left.\begin{array}{l}\dfrac{M_{SR}^m}{M_{SL}^m} = \dfrac{M_{1R}^m}{M_{1L}^m} \\ \dfrac{M_{SR}^{m+90}}{M_{SL}^{m+90}} = \dfrac{M_{1R}^{m+90}}{M_{1L}^{m+90}}\end{array}\right\} II(1)$$

or expressing II in terms of LM $$\left.\begin{array}{l}LM_{SR}^m - LM_{SL}^m = LM_{1R}^m - LM_{1L}^m \\ LM_{SR}^{m+90} - LM_{SL}^{m+90} = LM_{1R}^{m+90} - LM_{1L}^{m+90}\end{array}\right\} LII(1)$$

In these relations $m$ is a principal meridian of both eyes.

For case (2) the conditions are $$\left.\begin{array}{l}g_{SR}^m = g_{DR}^m \\ g_{SR}^{m+90} = g_{DR}^{m+90} \\ g_{SL}^n = g_{DL}^n \\ g_{SL}^{n+90} = g_{DL}^{n+90}\end{array}\right\} I(2)$$

and $$\left.\begin{array}{l}\dfrac{M_{SR}^m}{M_{SR}^{m+90}} = \dfrac{M_{1R}^m}{M_{1R}^{m+90}} \\ \dfrac{M_{SL}^n}{M_{SL}^{n+90}} = \dfrac{M_{1L}^n}{M_{1L}^{n+90}} \\ \dfrac{M_{SR}^m}{M_{SL}^n} = \dfrac{M_{1R}^m}{M_{1L}^n}\end{array}\right\} II(2)$$

or expressing II in terms of LM $$\left.\begin{array}{l}LM_{SR}^m - LM_{SR}^{m+90} = LM_{1R}^m - LM_{1R}^{m+90} \\ LM_{SL}^n - LM_{SL}^{n+90} = LM_{1L}^n - LM_{1L}^{n+90} \\ LM_{SR}^m - LM_{SL}^n = L_{1R}^m - LM_{1L}^n\end{array}\right\} LII(2)$$

In these relations $m$ is a principal meridian of the right eye and $n$ is a principal meridian of the left eye.

These equations can be shown to be the general conditions by reasoning exactly the same as that given under special cases C(1) and C(2).

Since $M_1$ for special cases (A), (B), (C), (D), and (E) has been defined by the relation $$M_1 = M_D \times M_E$$

Equations I(1), II(1), and LII(1) are the general conditions of equivalence in all cases when the principal meridians of the two eyes are parallel and Equations I(2), II(2), and LII(2) are the general conditions of equivalence in all cases when the principal meridians of the two eyes are not parallel.

To sum up, after the above procedure has given the values $$g_{DR}^m, g_{DR}^{m+90}, g_{DL}^n, g_{DL}^{n+90}, M_{1R}^m, M_{1R}^{m+90}, M_{1L}^n, \text{ and } M_{1L}^{n+90},$$

a pair of eyeglasses which when mounted on the patient have values of $g$ and $M$ which are related to the $g_D$ and $M_1$ values by conditions of equivalence (1) if $m=n$ or (2) if $m \neq n$ will correct the refractive defects and eliminate the size and angular eikonic differences to a sufficient degree of exactitude, i. e., will be "iseikonic" eyeglasses. The procedure used in providing such eyeglasses will now be given.

In general, there will be many different eyeglasses which will fulfill the above conditions I and II. The next step is to find among all the eyeglasses which satisfy conditions I and II those which also meet the following practical requirements; namely which (a) Are economical in manufacture;
(b) Are cosmetically satisfactory concerning general good appearance, weight and balance;
(c) Have good field properties, that is, as far as practically attainable, have the same perfection for oblique rays as for axial rays.

Further, since the condition of equivalency (II) only fixes the ratios between the angular magnification of the right and left eye iseikonic spectacle lenses, or (LII) only the differences between the logarithms of the angular magnification, other considerations are necessary in order to fix the absolute value of the angular magnification for one eye. Such considerations may be, for example, the desirability of fitting the dominant eye with a lens which gives the best dioptric correction for points of attention observed obliquely through the lens, or the determination of the absolute value of the angular magnification properties with regard to the proper monocular space perception of the dominant eye. In most cases, however, the above given practical requirements limit the absolute value within very close limits. In some cases the choice of a lens for one eye may be dictated by considerations concerning the cost of manufacture of the finished prescription, such as using stock lenses and surfaces with powers for which tools are kept in stock.

According to the present invention, such practical iseikonic eyeglasses are selected as follows with the aid of two series of charts referred to as "A" and "B" charts. In these charts, curves representing functions of previously obtained values are plotted, each curve for certain properties of the iseikonic lenses best suited for the prescription in question.

The principal types of lenses which can be used for the two lenses in the eyeglasses and which meet the practical requirements a, b, given above may be classified as follows:

(1) Single lenses with spherical ocular surfaces and spherical or toric anterior surfaces;
(2) Single lenses with toric ocular surfaces and spherical anterior surfaces;
(3) Lenses with toric ocular and anterior surfaces. Such double toric lenses are preferably ground in two pieces with adjacent surfaces of the same, positive and negative, respectively, spherical curvatures, which adjacent surfaces may be cemented or otherwise joined;
(4) Double lenses, joined at the edges, with internal spherical air lenses of comparatively small thickness; and
(5) Double lenses, joined at the edges with internal spherical air lenses of considerable thickness.

The finished eyeglasses will place a lens of one of the above types before one eye and a lens of one of the above types before the other eye. In some cases the same type may be placed before both eyes.

Lens types (1), (2) and in many cases (3) may be mounted in the customary frames for mounting lenses correcting refractive defects only. Lens types (4) and (5) can be mounted in frames which are very similar to the frames which are used to mount lenses for refractive correction only. They will, generally speaking, differ only in being restricted to a circular lens shape and by having a slightly wider eyewire with a larger groove. These restrictions are in most cases necessary properly to seal the internal air lens from dirt and moisture and to insure that the two components of the double lenses are held securely in the eyewire.

The charts for lenses of types (1) and (2) will first be described, since they are comparatively simple and provide a good foundation for the understanding of the charts for other types of lenses.

It is herein always assumed that, unless expressly otherwise specified, the optical axes of the lenses pass through the center of rotation of the eye and the point of attention, and that all computations are strictly correct only for a small field of view about the point of attention as center. While the computations are strictly correct for only a small field of view about the point of attentions, the present method permits the selection of eyeglasses whose properties for rays oblique to the optic axes are as nearly as possible the same as the properties for the axial rays. When this choice is properly made the eyeglasses are substantially correct over a field sufficiently large for all practical requirements. This consideration is included in practical requirement (c) above.

In the "A" charts the relation $$LM = f(g) \qquad (8)$$

is plotted on coordinate paper with $g$ as ordinate and $LM$ as abscissa. Any single curve for this relation is for a constant lens thickness, a constant distance between cornea pole and the lens surface next to the eye, and for a constant power or curvature of either the surface nearest the eye or the surface farthest from the eye.

In the "B" charts the relation $$g = f(P_1 \text{ or } P_2) \qquad (9)$$

is plotted on coordinate paper with $P_1$ or $P_2$ as ordinate and $g$ as abscissa. In this relation $P_1$ is the power of the surface nearest the eye and $P_2$ is the power of the surface farthest from the eye. If the "A" chart curves are drawn for a constant $P_1$, then $P_1$ is used as ordinate and in relation (9) for the "B" chart; if the "A" chart curves are drawn for a constant $P_2$, then $P_2$ is used as ordinate and in relation (9) for the "B" chart. Any single curve for relation (9) is for a constant lens thickness, for a constant power of the surface which was not kept constant in the curves forming the "A" chart, and for a specified relation between the distance from the cornea pole to the lens surface nearest the eye and the power of the surface kept constant in the "A" chart curves.

These relations are preferably obtained as follows, reference being made to Fig. 19 where, as in Fig. 9, N is the nodal point of the eye and O an object at the point of attention. O' is the image of O formed by surface $P_2$, and I is the image of O' formed by surface $P_1$. Then I is the image of O found by the lens L. The notation used in the following is given in Fig. 19. The magnification, as previously defined, is then $$M = \lim_{O \to O'} \frac{\frac{I}{NI}}{\frac{O}{NO}} = \lim_{O \to O'} \frac{I}{O} \times \frac{a}{b} \quad (10)$$

and, from the law of refraction for surface $P_2$, $$N = \frac{\sin \mu}{\sin \rho} = \lim_{O \to O'} \frac{\mu}{\rho} = \lim_{O \to O'} \times \frac{O/I_1}{O'/I'_1} = \lim_{O \to O'} \frac{O}{O'} \times \frac{I'_1}{I_1} \quad (11)$$

Similarly, for surface $P_1$ $$\frac{1}{N} = \lim_{O \to O'} \frac{O'}{I} \times \frac{I'_2}{I_2} \quad (12)$$

Multiplication of (11) and (12) gives $$\lim_{O \to O'} \frac{O}{I} = \frac{I_1 I_2}{I'_1 I'_2}$$

and, substituting in (10):

$$M = \frac{I'_1 I'_2}{I_1 I_2} \times \frac{a}{b} \quad (13)$$

or, for $n$ surfaces $$M = \frac{I'_1 I'_2 \ldots I'_n}{I_1 I_2 \ldots I_n} \times \frac{a}{b} \quad (14)$$

As well known to those skilled in geometrical optics, the relation between $l$ and $l'$ is $$\frac{N''}{l'} = P + \frac{N'}{l} \quad (15)$$

where $N'$ is the index of refraction of the meridian from which the light reaches the surface and $N''$ is the index of refraction of the medium into which the light enters through the surface, P the power of the surface which is given by the relation $$P = \frac{N'' - N'}{R} \quad (16)$$

where R is the radius of curvature of the surface, and $l$ and $l'$ the distances of object and image respectively from the surface. R, $l$, and $l'$ are measured in meters. They are positive when the point to which they are measured from the surface is on the side of the surface away from the source of light, and negative when it is on the side toward the light.

From relation (15) the following relations for $P_1$ and $P_2$ are obtained:

$$\frac{1}{l'_2} = P_1 + \frac{N'}{l_2} \quad (17)$$

$$\frac{N'}{l} = P_2 + \frac{1}{l'_1} \quad (18)$$

Further (see Fig. 19)

$$l_1 = -(a-x-d) = x+d-a \quad (19)$$

$$l_2 = l'_1 - d \quad (20)$$

$$l'_2 = -(b-x) = x-b \quad (21)$$

wherein $x$ is the distance from N to the surface $P_1$, $b$ is the distance from N to I, and $d$ is the thickness of the lens L. $x$, $b$, and $d$ are also measured in meters. $a$ and $b$ are positive for points to the right of N in Fig. 19 and negative for points to the left of N. $x$ and $d$ are always positive.

With some algebraic transformations to eliminate the quantities $l_1$, $l'_1$, $l_2$, and $l'_2$, the following equations are obtained from Equations (13), (17), (18), (19), (20), (21) above:

$$\left. \begin{array}{l} AP_1 + BM + C = 0 \\ \text{where} \quad A = ad(x-b) \\ \quad B = N'b(x+d-a) \\ \quad C = aN'(b-x) - ad \end{array} \right\} \quad (22)$$

and $$\left. \begin{array}{l} DMP_2 + EM + F = 0 \\ \text{where} \quad D = bd(x+d-a) \\ \quad E = bN'(a-x) - bd(N'-1) \\ \quad F = N'a(x-b) \end{array} \right\} \quad (23)$$

wherein $N'$ is the index of refraction of the glass.

In Equation (22) the A, B, C, values are substituted, $$g = \frac{1}{b}$$

likewise substituted and the multiplications carried out; further, a relationship between $x$ and $P_1$, expressed as $$x = f(P_1) \quad (24)$$

is assumed to exist. These manipulations result in an equation:

$$\left. \begin{array}{l} Ag + BM + C = 0 \\ \text{where} \quad A = adf(P_1)P_1 - aN'f(P_1) - ad \\ \quad B = N'f(P_1) + N'd - N'a \\ \quad C = aN' - adP_1 \end{array} \right\} \quad (25)$$

Equation (25) represents a linear relation between $g$ and M, if the quantities A, B, C are constants.

The A chart for lenses of type (1) has curves for constant values of $P_1$ according to Equation (25). The relation $x = f(P_1)$ is chosen so that the plane of a circle, of radius $r$, on the ocular surface is at a constant distance from the cornea. Since under those conditions the relation between $g$ and M given in (25) is a linear one, the relation between $g$ and LM is obtained in the following manner: Using the value of $d$, the value of $P_1$ and the value of $x$ for that $P_1$ from relation (24), rays are traced through the lens in the conventional manner for lenses with $$P_1 + P_2 = +5.0D \text{ and } P + P = -5.00D$$

This gives two points on the linear relation between $g$ and $M$ and hence the relation. From this the value of M for a suitable number of equally spaced values of $g$ is found. The value of LM for each value of M is found and the points plotted on the A chart. Joining these plotted points with a smooth curve gives the required curve.

In Equation (23) the D, E, F values are substituted, $$g = \frac{1}{b}$$

likewise substituted and the multiplications carried out; further, a relationship between $x$ and $P_2$ expressed as $$x = f(P_2) \quad (26)$$

is assumed to exist. These manipulations result in an equation:

$$\left. \begin{array}{l} Dg + EM + F = 0 \\ \text{where} \quad D = N'a[f(P_2) - d] \\ \quad E = P_2 df(P_2) - daP_2 + \\ \quad \quad N'a - N'[f(P_2) - d] - N'd + d \\ \quad F = -N'a \end{array} \right\} \quad (27)$$

Equation (27) represents a linear relation between $g$ and $M$ if the quantities $D$, $E$, $F$ are constants.

The A chart for lenses of type (2) has curves for a constant $P_2$ according to Equation (27). The relation $x=f(P_2)$ is chosen so that the plane of a circle, of radius $r$, on the anterior surface is a constant distance from the cornea. Since under these conditions the relation between $g$ and $M$ given in (27) is a linear one, the relation between $g$ and $LM$ is obtained in an exactly analogous manner to that used to obtain the relation in the A chart for lenses of type (1).

The relation (9) between $g$ and $P_1$ for the B chart for lenses of the type (1) and the relation (9) between $g$ and $P_2$ for the B chart for lenses of type (2) are not linear and are obtained by plotting a sufficient number of points obtained by conventional ray tracing and joining these plotted points by smooth curves.

In a preferably practical embodiment of these charts lines are drawn on the A chart for lenses of type (1) for the relation between $g$ and $LM$ in a number of series, each series containing curves for a single thickness $d$ and a single distance $f$ of the plane of the circle, of radius $r$, on the ocular surface from the pole of the cornea. In each series lines are drawn for unit diopter steps of all practical values of $P_1$. The curves in a single series are distinguished by writing the associated value of $P_1$ upon them. The series are distinguished from one another by a common characteristic of all the lines, for example, the color in which they are drawn. The numbers which distinguish the various lines of each series are then written in the same color as the lines. This procedure effectively distinguishes all the curves.

Lines are drawn on the A chart for lenses of type (2) in similar series except $f$ is measured to the plane of a circle on the anterior surface and each series has curves for all practical powers $P_2$ in diopter steps. The series and the curves of each series are distinguished in the manner given above.

Figure 20:
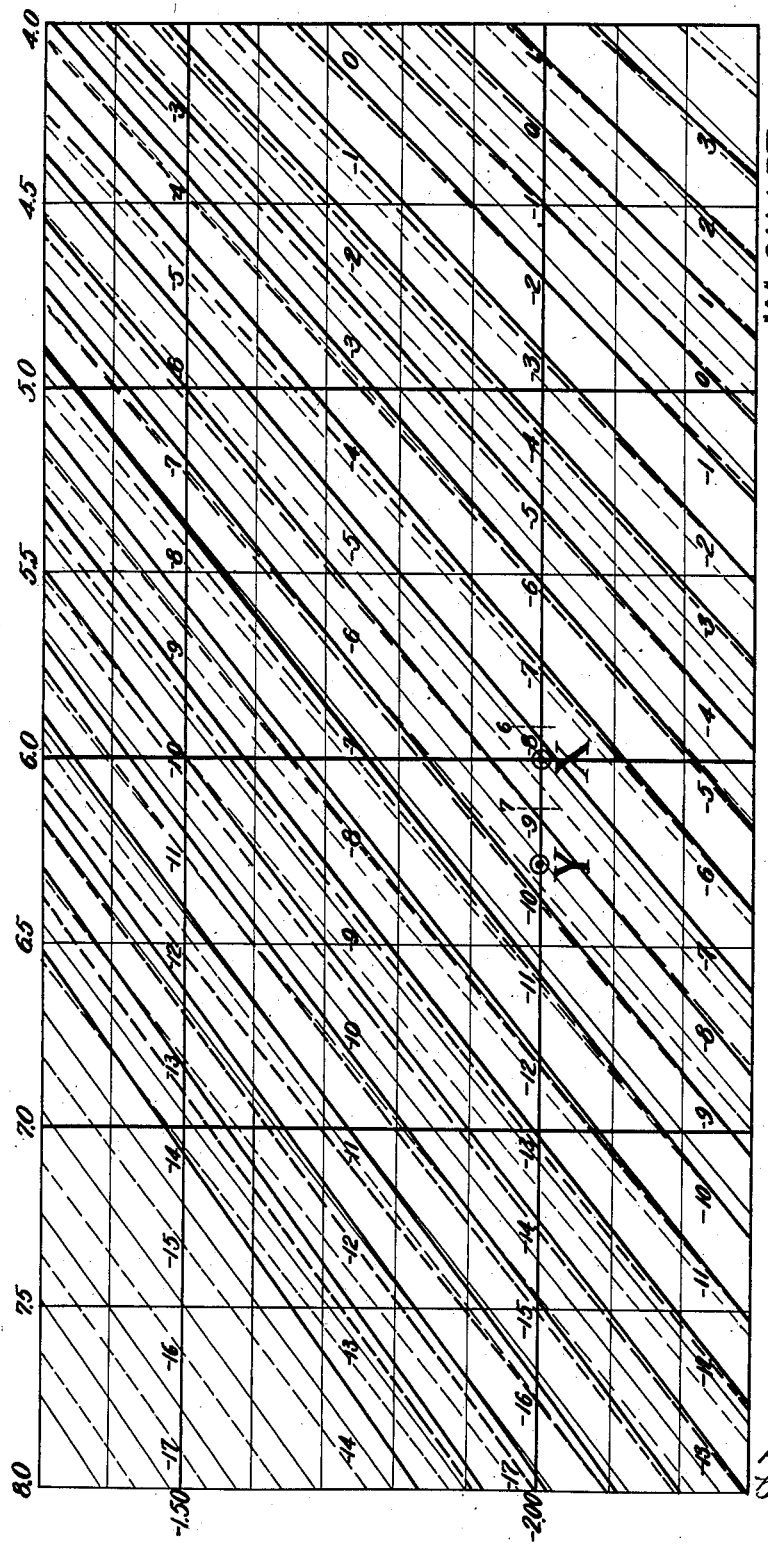
Fig. 20 is part of a so-called "A chart"; for lenses of type (1)

For practical purposes each A chart is divided into sections, each section covering a small range in $g$. All the sections may then be drawn on a continuous roll of coordinate paper whose width is the range in $g$ covered in each section (or somewhat greater to give overlapping sections). In each section four series are usually drawn for two values each of $d$ and $f$, these four values being so chosen that most practical lenses for the range in $g$ covered will have values of $d$ and $f$ which each lie between the two values for which series are drawn. A part of the section of the A chart for lenses of type (1) for an object of attention at 20 feet from N, i. e., $a=6.096$ meters, covering the range from $g=-3$ to $g=0$ is shown in Fig. 20. In this figure the colors used to distinguish the series are replaced by various kinds of lines. Four series are shown using the colors blue (heavy lines), orange (thin lines), brown (heavy dotted lines) and red (thin dotted lines). Blue is for a thickness of 2 mms. and a distance $f$ equal 12.5 mms. from the plane of a circle of 20 mms. radius on the ocular surface; orange is for a thickness of 3 mms. and a distance $f$ of 12.5 mms.; brown is for a thickness of 2.00 mms. and a distance $f$ of 11.5 mms.; and red is for a thickness of 3.00 mms. and a distance $f$ of 11.5 mms. Lines are drawn in each series for all values of $P_1$ in steps of one diopter from $+3.00$ to $-18.00$ which are in this example taken to be the limits of $P_1$ for practical lenses.

The complete A chart for lenses of type (1) will consist of a number of sections similar to that of which a part is shown in Fig. 20, but covering other short ranges in $g$. A complete chart which covers the range in $g$ from $-15$ to $+15$ (a range sufficient to cover any refractive correction between approximately $+13.00$ and $-20.00$ diopters) will consist of ten sections. The values of $d$ and $f$ for which series are drawn are given in tabular form in Fig. 21. Fig. 22 shows in tabular form the colors used for the various series. It will be noticed that the same color is used on different series, but when this is the case the series for which the same color is used are on different sections of the complete chart.

Lines are drawn on the B charts in each range of $g$ for the same series which are used on the section of the A chart covering that range. It is found that the lines for (in the case of the B chart for lenses of type (1)) a constant $P_2$ for all series lie quite close together and hence only one number need be placed on the group to indicate the value of $P_2$. A section covering the range from $g=-3.00$ to $g=0$ and the range from $P_1=-6.00$ to $-9.00$ is shown in Fig. 23. Lines are drawn as previously mentioned for the same two values each of $d$ and $f$ which are shown in the A chart given in Fig. 20. The various combinations of $d$ and $f$ are distinguished by the color of the lines and the same color is used for the same combination in both A and B charts.

The complete B chart will cover the range in $g$ desired and the range in $P_1$ for which lines are drawn in each series on the A chart. For the example of the complete A chart for lenses of type (1) given above the complete B chart will cover the range from $g=-15$ to $g=+15$ and $P_1=-3.00$ to $+18.00$. In practice this complete B chart is divided into sections by lines of constant $P_1$ and the various sections drawn on the same roll of coordinate paper on which the various sections of the A chart are drawn.

The scale chosen to plot these charts is sufficiently large to enable the various lines to be distinguished from one another and it permits points to be plotted with sufficient precision. In the chart of which Figs. 20 and 23 are small portions, the scale of the A chart is such that 1 cm. equals 0.1 in $LM$ and 0.05 in $g$ and the scale of the B chart is such that 1 cm. equals 0.1 in $g$ and 0.1 in $P_1$. The complete chart is preferably drawn on a roll of coordinate paper ruled in mms., the ruled part of which is 75 cms. wide and approximately 30 meters long.

The way in which the A and B charts are used to find the lens required for a specified value of $g$ and $LM$ is as follows: For example, suppose a lens is desired with $g=-2.00$ and $LM=6.00$ for an object of attention 20 feet from N. This lens is to be 2 mms. thick and mounted so that the plane of the circle of radius 20 cms. on the ocular surface is 12.5 mms. from the pole of the cornea. The point $g=-2.00$, $LM=-6.00$ is plotted on the proper sections of the A chart as shown by point X in Fig. 20. The proper value of $P_1$ for the lens is given by the value of $P_1$ for the line of the combination $d=2.00$, $f=12.5$ which passes through the point X. If no line passes through X the line which would pass through X is found by graphical interpolation between the unit $P_1$ lines on each side of point X. Fig. 20 shows that this line would be the line for $P_1=-7.10$. The point $P_1=-7.10$, $g=-2.00$ is now plotted on the B chart as shown by point $X_1$ in Fig. 23. The proper value of $P_2$ is given by the $P_2$ value of the line of the combination $d=2.00$, $f=12.5$ which passes through point $X_1$. Since no line passes through $X_1$ the $P_2$ value of the line which passes through is found by graphical interpolation between the unit $P_2$ lines on each side of point $X_1$. This value as seen in Fig. 23 is $P_2=9.08$. Hence a lens whose ocular surface is $-7.10$ diopters, thickness 2.00 mms., and anterior surface 9.08 diopters, when mounted so that the plane of a circle of radius 20 mms. on the ocular surface is 12.5 mms. from the cornea will have values $g=-2.00$ and $LM=6.00$ for an object on the optical axis of the lens and at distance 20 feet from N.

In the example given above the thickness and position of mounting chosen for the lens were such that the lines for the combination were drawn on the chart. However, the charts may also be used for thicknesses and positions of mounting for which no lines are drawn. For example suppose a lens is desired with again $g=-2.00$ and $LM=6.00$ for an object 20 feet from N. The lens is to be 2.3 mms. thick and mounted with $f=12.5$ mms. A piece of tracing paper is placed over the A chart and fixed in position. The point $g=-2.00$, $LM=6.00$ is plotted on this as shown by X in Fig. 20. The point where the unit diopter lines for the combination $d=2.3$, $f=12.5$ intersect the line $g=-2.00$ are now drawn by graphical interpolation between the unit diopter lines of the combinations $d=2.00$, $f=12.5$ and $d=3.00$, $f=12.5$. This interpolation is a linear one in the horizontal direction since $LM$ is substantially a linear function of $d$ when $f$, $P_1$, and $g$ are constant. These lines are shown dashed in Fig. 20. The proper value of $P_1$ is now found by graphical interpolation between the unit diopter lines on each side of point X for the combinations desired. This gives $P_1=-6.40$. The point $P_1=-6.40$, $g=-2.00$ is plotted on the B chart as shown by point $X_2$ in Fig. 23. The value of $P_2$ for the combination $d=2.00$, $f=12.5$ is 8.39, for the combination $d=3.00$, $f=12.5$ is 8.35. Linear interpolation between these values gives the proper value $P_2$ for the combination $d=2.3$, $f=12.5$. This value is 8.38.

In a similar way the values of $P_1$ and $P_2$ for a lens thickness for which two combinations are drawn and any position of mounting can be found. The interpolation is made graphically in the same way since $LM$ is substantially a linear function of $f$ when $d$, $P_1$, and $g$ are constant.

By a combination of the two methods given above the charts can be used to find the value of $P_1$ and $P_2$ for any thickness and any position of mounting. In practice the combinations drawn are so selected that it is very rarely necessary to interpolate in more than one dimension.

The A chart may also be used to find the value of $LM$ for an object at 20 feet distance when the values of $g$, $d$, $f$, and $P_1$ are chosen. For example, in order to find the value of $LM$ for a lens with $g=-2.00$, $d=3.00$, $f=12.5$ mms. and $P_1=-6.00$ the point where the line for $P_1=-6.00$ of the combination $d=3.00$, $f=12.5$ is plotted as shown by point Y in Fig. 20. The $LM$ value for this point is the $LM$ value for the lens. In this example it is seen to be 6.27. By the same process of graphical interpolation described above the $LM$ value for any thickness, any $f$ value, and any $P_1$ can be easily and quickly found.

Similarly, complete A and B charts are prepared, as previously shown, for the lenses of type (2). Fig. 24 gives in tabular form the range in $P_2$ and the combination of $d$ and $f$ which are used in each section of an A chart of that type. The range in $P_2$ is so chosen that for the value of $g$ in the particular section, $P_1$ will be between $+3.00$ and $-18.00$ diopters. In this tabulation it should be remembered that $f$ is the distance from the cornea pole to the plane of a circle of radius 20 mms. on the anterior surface. The colors used for the various combinations are given in tabular form in Fig. 25.

The B chart for lenses of type (2) is of sufficient range in $P_2$ to include all the values for which lines are plotted on the sections of the A chart.

The scale used in the A chart for lenses of type (2) is exactly the same as that used for the A chart for lenses of type (1). The sections are similarly arranged on a roll of the same kind of coordinate paper.

Comparison of the color schemes given in Fig. 22 and Fig. 25 shows that the color for any thickness and $(14-f)$ in Fig. 22 is the same as the color for the same thickness and $(f-14)$ in Fig. 25.

The distance 14 for reasons which will be clear from what follows is called the standard position of the point of the bevel. For lenses of type (1) the value $(14-f)=0.5$ is called Bevel #1, the value, $(14-f)=1.5$ is called Bevel #2, etc. For lenses of type (2) the value $(f-14)=0.5$ is called Bevel #1, etc. This terminology is indicated in Figs. 22 and 25. It will be understood from Figs. 26 and 27, where lenses of type (1) and type (2) are shown with the various quantities indicated. In Figs. 26 and 27, $f_0$ is the distance from the pole of the cornea to standard position of the point of the bevel, $f$ is the distance from the cornea pole to the plane of the circle on $P_1$ or $P_2$, and $r$ is the radius of the circle on $P_1$ or $P_2$. In the charts described above, $f_0$ has been chosen as 14 mms., and $r$ as 20 mms.

Figures 30, 31, 33:
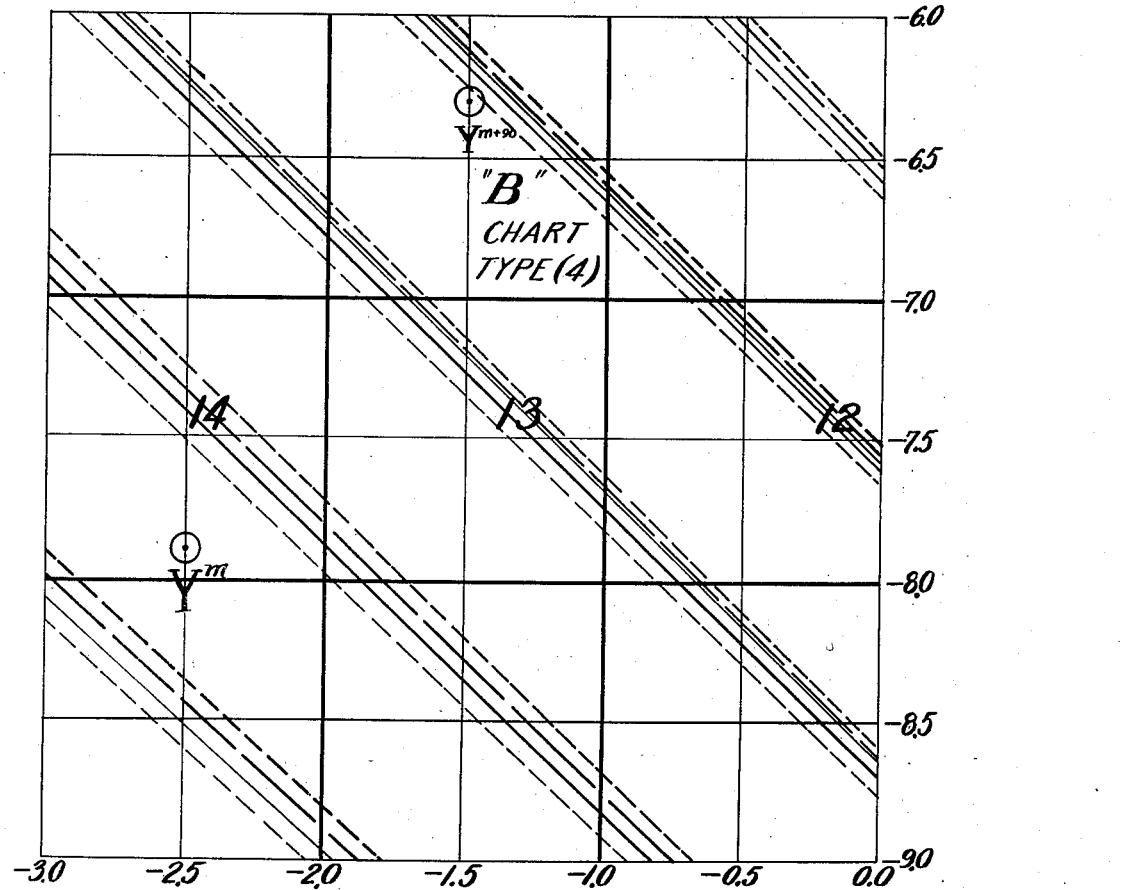
Figs. 30 and 31 are tables similar to Figs. 21 and 22, explaining the A and B charts for lenses of types (3), (4) and (5)
Fig. 33 is a part of the B chart for lenses of type (4)

Similar A and B charts can be prepared for lenses of types (3), (4) and (5). These types of lenses and the terminology which will be used in discussing them are shown in Figs. 29 and 30.

The A chart for lenses of type (3) is the same as the A chart for lenses of type (1) except that the lines for the steps of one diopter in $P_1$ are drawn for various combinations of $d_1$ and $d_2$ with the distance $f$ shown in Fig. 28 constant. The distance $f$ is chosen so that if $Pc=\pm 6.00$ the distance $f_0$ will be 14 or in general the same value used in the charts for lenses of types (1) and (2) for the same value of N. The single complete chart can be used for any value of $Pc$ by using the proper associated value of $f_0$. For example the chart made with the value of $f$ chosen as above will be the chart for the following combinations of $Pc$ and $f_0$. (1) $Pc=\pm 6.00$, $f_0=14$; (2) $Pc=\pm 3.00$, $f_0=15$; (3) $Pc=\pm 9.00$, $f_0=13$; etc. or in general for any combination where $Pc=\pm Pc$ and $f_0=14+h\pm 6.00-h\pm Pc$, wherein $h$ is the distance between the surface and the plane of a circle of radius $r$ on the surface, the distance being measured on the line perpendicular to the plane at the center of the circle. The A chart is also divided into sections similar to those used for the A charts for lenses of types (1) and (2) and the same scales are used. These sections are drawn on a roll of coordinate paper the same as used for the A charts for lenses of types (1) and (2). The combinations of $d_1$ and $d_2$ for which the lines for all practical unit values of $P_1$ are drawn are so chosen that the values of $P_1$ and $P_2$ for lenses of any desired combinations of thicknesses can be found for a given $g$ and $LM$ by a process of graphical interpolation similar to the one described. Fig. 30 gives in tabular form the combinations for which lines are drawn in each range of $g$ and Fig. 31 the colors used to distinguish the lines for the various combinations. The lines marked double black and double green are drawn as two closely spaced parallel lines. The numbers for the various values of $P_1$ in the double green and double black combinations are written and enclosed in a circle the color of the lines. This procedure enables the lines for the various combinations of thicknesses to be easily and quickly distinguished even when the lines for as many as eight combinations are drawn in a single section, since only highly contrasting colors are used. Lines for combination $d_1=1$, $d_2=1$ are not drawn in the sections from $g=-15$ to $g=+3$. Lines for combination $d_1=3$, $d_2=2.0$; $d_1=2$, $d_2=3$, and $d_1=3$, $d_2=3$; are not drawn in the sections from $g=+3$ to $g=-3$.

The B chart for lenses of type (3) is similar to the one for lenses of type (1) except the lines are drawn for a constant $f$ and for the same combinations of $d_1$ and $d_2$ as the A chart for the same $g$ ranges. As in the charts for lenses of types (1) and (2) the same color is used for the same combination of $d_1$ and $d_2$ in both the A and B charts.

The charts for lenses of types (4) and (5) are similar to the ones described for lenses of type (3). For a lens of this type with a constant spherical air lens, i. e., with $P_2$, $P_3$ and $w$ in Fig. 29 constant, the relation between $g$ and $M$ can be shown to be linear for a constant $d_1$, $d_2$, and $P_1$. The thickness of the air lens $w$ is chosen so that the air lens of radius $(r-y)$ has zero edge thickness. The radius $r$ is chosen as 20 mms., the same value as used in the chart for lenses of types (1), (2) and (3). The quantity $y$ is shown in Fig. 29. It is chosen sufficiently large so that the air lens may be securely sealed against the entrance of moisture and dirt by a layer of cement of width $y$. The computations for the charts are carried out with the edge of the air lens at the standard position for the point of the bevel, as shown in Fig. 29. This standard position is chosen the same as was used in the charts for lenses of types (1) and (2), i. e., in the examples given as 14 mms.

Since the relation between $g$ and $M$ is linear the relation between $g$ and $LM$ can be found in the same manner as that relation was found for lenses of type (1), (2) and (3), the conventional ray tracing being now carried through four surfaces instead of two.

The B chart for lenses of types (4) and (5) is similar to the B chart for lenses of type (3). Points are obtained by conventional ray tracing and joined by smooth curves. The lines on the B chart are for a constant $P_4$ instead of $P_2$.

As in the charts for lenses of type (3), lines are drawn for all practical unit values of $P_1$ for sufficient combinations of $d_1$ and $d_2$ so that the values of $P_1$ and $P_4$ for lenses of any desired combination can be found for a given $g$ and $LM$ by a process of graphical interpolation similar to the one described for the charts for lenses of type (1). This graphical interpolation can be done as described since it can be shown that the relation between $LM$ and $d_1$ is substantially linear when $g$, $P_1$, and $d_2$ are constant and that the relation between $LM$ and $d_2$ is substantially linear when $g$, $P_1$, and $d_1$ are constant.

For practical purposes, lines are drawn for the same combinations of $d_1$ and $d_2$ in each section of the A chart for lenses of types (4) and (5) as in the same sections of the A chart for lenses of type (3). The same color scheme is used. Hence, Fig. 31 gives the combination for which lines are drawn in each section of the A charts for lenses of types (4) and (5) and the colors which are used for the various combinations. The various sections of the A charts are drawn with the same scale as used before, on a roll of coordinate paper the same as used for the other charts. The sections for all the A charts are similarly placed on a roll of coordinate paper.

In practice, charts are prepared for two varieties of lens type (4); one with $P_2=+4.50$, $P_3=-9.00$, and another with $P_2=-7.50$, $P_3=-12.00$, and for one variety of lens type (5) with $P_2=+3.00$, $P_3=-12.00$. In all cases, $r$ is taken as 20 mms. and $y$ as 0.5 mm. This fixes the value of $w$ (Fig. 29) for any type. The standard position of the point of the bevel is the same for all the types of lenses for which charts are prepared. In the example given it has been chosen at 14 mms. from the pole of the cornea.

Figs. 32 and 33 show part of one section of the A chart and a portion of the B chart, respectively, for lenses of the type (4) when $P_2=4.50$, $P_3=-9.00$. Fig. 32 shows for $a=6.096$ meters part of the section from $g=-3.00$ to $g=0.00$. Lines are drawn for all unit values of $P_1$ between $+3.00$ and $-18.00$ and for the combinations; $d_1=1.00$, $d_2=2.0$ in green (thin lines); $d_1=1.0$, $d_2=3.00$ in double green (thin dotted lines); $d_1=2.0$, $d_2=1.0$ in black (heavy dotted lines); $d_1=2.0$, $d_2=2.0$ in blue (heavy lines); and $d_1=3.0$, $d_2=1.0$ in double black (dashed lines). Fig. 33 shows a portion of the B chart for this type lens. In the figure, the portion for $g=-3$ to $g=0$ and $P_1=-6.00$ to $P_1=-9.00$ is shown. Curves are drawn in this section for the same combinations as in Fig. 32. The same kinds of lines are used for the same combinations in Figs. 32 and 33.

The charts for lenses of types (3) and (5) are very similar to the ones shown in Figs. 32 and 33.

All the A charts are now preferably joined together in one continuous length. The B charts should be so mounted that any portion of any chart can be quickly and easily be made available. They may be joined into the continuous length of the A charts, each B chart being adjacent to its corresponding A chart, or they may preferably be joined into another continuous length.

The continuous length of coordinate paper made up of all the A charts (with the corresponding B charts between, if that method of mounting the B charts is used) is now preferably mounted as shown in Figs. 34 and 35. In these figures $R_1$ and $R_2$ are two flanged rollers upon which the continuous length of A (and B) charts can be wound. $M_1$ and $M_2$ are motors for turning $R_1$ and $R_2$ respectively. Switches SM are arranged at a convenient place so that the continuous length of A charts may be either wound upon $R_1$ and unwound from $R_2$ or vice versa by turning on the proper motor. The whole arrangement should be such that any section of any A chart can be quickly and easily brought between the two rollers $R_1$ and $R_2$. $H_1$ and $H_2$ are two hand wheels for turning $R_1$ and $R_2$ respectively by small amounts. T is a flat surface below the portion of the charts which is between the two rollers. It should preferably be of such length that two complete sections of any A chart may be placed upon it. Electric braking equipment BM is preferably used in order quickly to arrest the paper when the desired portion thereof is on the table. K is a semi-transparency (tracing paper) mounted above the portion of the charts upon T. As shown in Fig. 34, chart K is mounted on journals 61, 62 so as to be fixed with respect to the two dimensions of the surface T. KK is another semi-transparency (tracing paper) above K slidably mounted on rod 63, so that it may be moved from right to left or vice versa without changing its up and down relation to T. Both transparencies should be so mounted that they can be quickly and easily lifted out of the way, for example with the aid of counterweights 64 and 65. The mounting of KK must also be such that when it has been placed in any desired relationship with K, that relationship will remain fixed until intentionally altered. This can, for example, be accomplished through the effect of friction between frame extensions 66 and rod 63.

If the B charts are not joined in the same continuous length with the A chart they should be independently so mounted that any portion of any B chart can be easily and quickly brought into position for use. An arrangement such as shown in Fig. 34 without the KK sheet, is a convenient arrangement.

As shown in Fig. 34, the shaft supporting one of the drums, for example $R_1$, also has fixed to it a sprocket 71 of comparatively small diameter, which drives a chain 72 with an index 73 sliding on guide track 74. The index moves over a scale 75 which, as shown, indicates the various charts contained on the paper rolled over $R_1$ and $R_2$.

In the present instance, it is assumed that A and B charts are alternately arranged for each type of vision, so that the scale of Fig. 33 results. It will be evident that index 73 and the paper moving mechanism can be connected in any manner suitable to assure sufficiently exact coordination of chart sections and corresponding index positions, and also a convenient scale arrangement.

Figure 36:
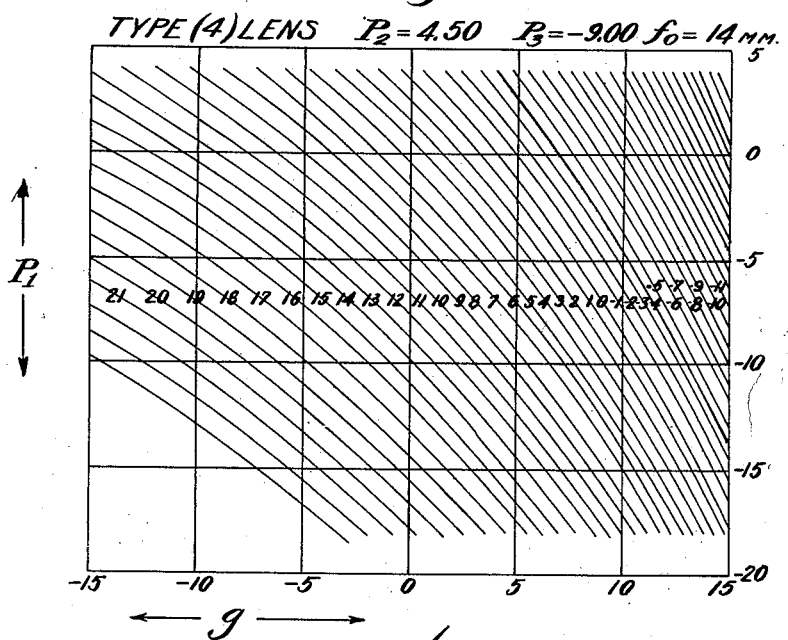
Figs. 36 and 37 are charts used in connection with the A chart for lenses of type (4)
Figure 37:
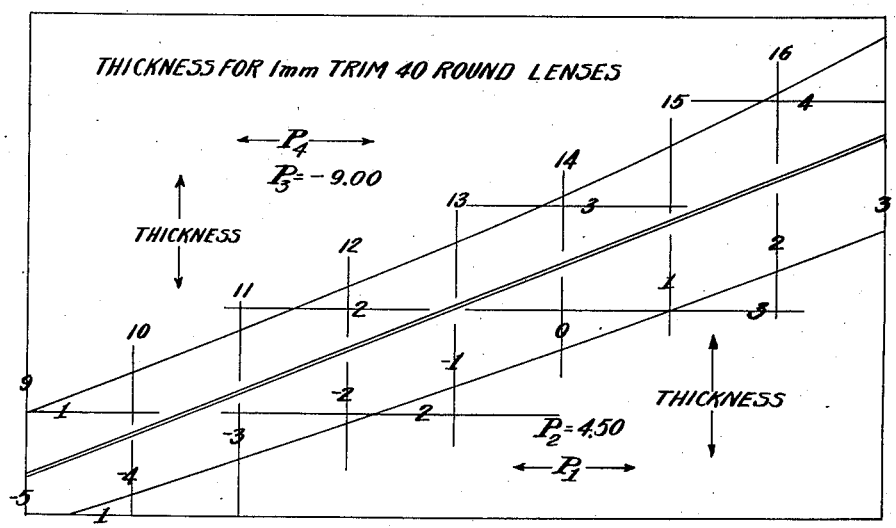

In addition to the above there should be immediately adjacent to the table on which the A charts are mounted, either graphs or tables which give the approximate power of the surface not used in the (that is, $P_2$ if $P_1$ is used in the A chart and vice versa.) A chart and graphs or tables which give the center thickness necessary to use in order to get any required edge thickness of a lens whose diameter and surface powers are known. A convenient way to do this is shown in Figs. 36 and 37, which is a graph to be used in connection with the charts for lenses of types (4) and (5). This graph corresponds to charts for lenses of type (4) where $P_2=+4.50$ and $P_3=-9.00$. The graph shown in Fig. 36 is simply the B chart plotted on a much smaller scale and with only a single line drawn for each $P_4$. This line is the average of the separate lines on the B chart itself. The chart, shown in Fig. 37, gives the center thickness necessary for a one millimeter edge thickness for both the lens nearest the eye and the lens farthest from the eye. The use of these graphs is obvious.

Similar graphs are prepared for each type lens for which A and B charts have been prepared. These are mounted adjacent to the table on which the A and B charts (or the A chart only if the B charts are mounted separately) are mounted in such a way that any single graph is easily and quickly available.

As already explained, and as will be evident when the use of these charts in finding the specifications for iseikonic eyeglasses is described, a considerable amount of linear graphical interpolation is carried out. In order to do this quickly and easily some form of interpolation ruler is necessary. A well known form of ruler which is convenient for this purpose is shown in Fig. 38. The use of this ruler will be evident from the figure. Any space on the chart may be easily and quickly divided into ten equal parts by placing the 00 mark of the ruler on one end of the space and moving the slider on the other end of the ruler until the 10 mark is on the other end of the space, whereby the intermediate lazy tong arrangement always provides the equal subdivisions numbered 1 to 10. The way in which such a ruler is used for graphical interpolation and extrapolation will be given in connection with the description of the use of the A and B charts.

It will be remembered that both the A and B charts for all types of lenses are drawn for a single distance of the point of attention or distance of testing the eyes for refractive defects and eikonic differences. It is necessary to prepare such A and B charts for each distance of testing. If the test is made for different distances, as for example for distant vision and for near vision (reading distance), two complete sets of A and B charts are prepared, one set for each distance of testing. The use of the charts is precisely the same for any object distance.

In order to find the specifications for iseikonic eyeglasses, using the A and B charts described above, the following procedure is used. The procedure will be explained for a single testing distance since it is identical for all testing distances, except that the appropriate tables for the $g$ and LM values of the dioptric test lenses and the A and B charts for the particular testing distance are used. A brief summary of the procedure up to this point will first be given.

The values of $g_D$ and $LM_D$ for the dioptric test lenses which corrected the refractive defects are found in the appropriate tables. Then by the procedure given under special cases (A), (B), (C), (D), (E), (F), and (G), the values of $LM_1$ are found. The iseikonic eyeglasses must be such that their $g_s$ and $LM_s$ values are related to the $g_D$ and $LM_1$ values by conditions of equivalence $I_{(1)}$ and $LII_{(1)}$ when the principal meridians of the two eyes are parallel, and by conditions of equivalence $I_{(2)}$ and $LII_{(2)}$ when the principal meridians of the two eyes are not parallel. These two types of cases will be discussed separately since the procedure in handling them is slightly different. For convenience the length of coordinate paper with all the A charts on it will be called the A roll and the length with all the B charts on it will be called the B roll.

For case (1) the conditions of equivalence are, as given hereinbefore, $$\left.\begin{array}{l} g_{SR}^m = g_{DR}^m \\ g_{SR}^{m+90} = g_{DR}^{m+90} \\ g_{SL}^m = g_{DL}^m \\ g_{SL}^{m+90} = g_{DL}^{m+90} \end{array}\right\} I(1)$$

and $$\left.\begin{array}{l} LM_{SR}^m - LM_{SL}^m = LM_{IR}^m - LM_{IL}^m \\ LM_{SR}^{m+90} - LM_{SL}^{m+90} = LM_{IR}^{m+90} - LM_{IL}^{m+90} \end{array}\right\} LII(1)$$

The A roll is now adjusted so that the part of the A chart for lenses of type (1) which has the sections containing the $g_D$'s is on T in such a position that the points defined by coordinates $g_{DR}^m$, $LM_{1R}^m$; $g_{DL}^m$, $LM_{1L}^m$; $g_{DR}^{m+90}$, $LM_{1R}^{m+90}$; and $g_{DL}^{m+90}$, $LM_{1L}^{m+90}$ can be plotted on sheet K using the scales for abscissa and ordinate on the section or sections of the A roll below K. Points $g_{DR}^m$, $LM_{1R}^m$ and $g_{DL}^m$, $LM_{1L}^m$ are then plotted on sheet K. A convenient way to distinguish the points for the left and right eyes is to indicate the position of the point for the right eye by an encircled dot and the point for the left eye by a small cross. A mark is also placed on K to indicate its relation to the part of the A chart beneath. Since the A chart can only move in such a way as to change the abscissae, this will be sufficiently indicated by marking and labelling the position of one of the constant abscissa lines.

The sheet KK is now placed over K and the points $g_{DR}^{m+90}$, $LM_{1R}^{m+90}$ and $g_{DL}^{m+90}$, $LM_{1L}^{m+90}$ plotted on this sheet, the points for the right and left eyes being distinguished in the manner given above.

The importance of similarly arranging all the sections of the A charts for the different type lenses will now be noted. In order to plot the above points on the A chart for any type lens it is only necessary to bring the same sections of any other A chart under the sheets K and KK in such a position that the same constant abscissa line is under the mark placed and labelled on the K chart when the points were plotted.

Sheet KK is now shifted until the line for the same $P_1$ for a roughly estimated suitable thickness and bevel for a spectacle lens before that eye passes through both points for one eye. Inspection of the $P_1$ lines, for a roughly estimated suitable thickness and bevel for a spectacle lens before the other eye, which pass through the points for the other eye will determine if it is possible to make up the iseikonic eyeglass with two lenses of type (1).

It should be noted that sheet KK can be shifted at will, since it can only move parallel to the constant $g$ lines of the chart. Also the A roll may be shifted under both K and KK since it can move only parallel to the constant $g$ lines. Since both points for meridian $m+90$ are on the same sheet, their separation in LM will remain constant. Since both points for meridian $m$ are on the same sheet, their separation in LM will remain constant. Therefore the $g$ and LM values under the plotted points after any shifting of the A roll or of sheet KK will satisfy conditions of equivalence I(1) and LII (1) if they are used for the $g$s and LMs values.

In special case (A) where all meridians have like properties two lenses of type (1) can always be used, as only a single point will be plotted for each eye. In this simple case (A) the A roll is shifted until the $P_1$ lines for suitable thicknesses and bevels which pass through the plotted points are equidistant from the $P_1$ value which gives the best oblique properties for the thickness and bevel used. This value is found from the well known properties of single lenses for oblique rays. The values of $P_1$ and $P_2$ for each eye for the $g$ and LM points under the plotted points are found as before explained. Then the iseikonic eyeglass will consist of two lenses of type (1) (Fig. 26) with the values of $P_1$ and $P_2$ found, of the thicknesses chosen, beveled so that the edge of $P_1$ is in proper relation to the point of the bevel and mounted before the eyes with the points of the bevels at the standard distance from the pole of the cornea.

In the more general case, i. e., with astigmatism present, if the first rough inspection shows that a single $P_1$ line passes close to the two points for the other eye the procedure is practically the same as above, except that care must be used in selecting the proper thicknesses and bevels so that a single $P_1$ line passes through the points for each eye, or a negligible distance from the two points. The processes of selecting the proper thicknesses and bevels, shifting the A roll and the KK sheet are carried on at the same time until a suitable selection has been made. With some experience this can be done very quickly. When suitable selections and settings have been made the values of $P_1$ are noted and the values of $P_2$ found from the B chart. This gives the specifications for the iseikonic eye-glasses as before.

If the rough inspection shows that no $P_1$ line passes through the two points for the other eye, the A roll is moved until the proper section of the A chart for lenses of type (2) is under K in the correct position as shown by the mark on K and the same inspection is made. If a constant $P_2$ line passes near to the two points for the other eye it will usually be possible to furnish iseikonic eyeglasses with a lens of type (1) before one eye and a lens of type (2) before the other eye. The procedure is essentially the same as for two lenses of type (1) except that the sections for types (1) and (2) must be alternately placed under K in proper position during the adjustments and selections. A temporary mark on KK before each shift from (1) to (2) or from (2) to (1) enables this to be easily and quickly done. Then the value of $P_1$ for one eye and $P_2$ for the other eye is noted, the proper values of $P_2$ and $P_1$ respectively found from the B charts. This gives the specifications for the iseikonic eyeglasses as before.

If the rough inspection shows that no single $P_2$ line passes through the points for the other eye the next step is to adjust KK until the same $P_2$ line passes through the two points which were previously so adjusted that the same $P_1$ line passed through them. The same procedure with $P_1$ replaced by $P_2$ in every instance will then show if the iseikonic eyeglass can be made up of two lenses of type (2) or a lens of type (2) before one eye and a lens of type (1) before the other.

With some experience the whole procedure given above can be carried out in a few minutes and should always be applied, since the iseikonic eyeglass should, if at all possible, be made up of lenses of types (1) and (2) so as to meet to the highest possible degree the practical requirements (a) and (b) given above. There will be a small number of border-line cases where judgment must be exercised as to whether practical requirements (a) and (b) are best met by using very thick lenses of types (1) and (2) for both lenses of the eyeglass or by using a lens of type (1) or (2) before one eye and a lens of type (3) before the other eye.

If the above procedure shows that the eyeglass cannot be made up with lenses of types (1) and (2) the following procedure is used. A preliminary selection of $P_1$, $d$, and bevel is made for a lens of type (1) before one eye. Or, if desired, a lens of type (2) with selected $P_2$, $d$, and bevel is chosen for one eye. The procedure is the same in both cases except that the proper A chart is used. The A roll and sheet KK are now adjusted until the line for the selected $P_1$, $d$, and bevel passes through both points for the selected eye. A mark for any constant abscissa is placed and labelled on sheet KK.

The A roll is now adjusted until the proper section of the A chart for lenses of type (3) is in proper position under sheet K. A quick inspection will show if a lens of type (3) will meet practical requirements (a) and (b). If it will, then as before, adjustments of the A roll are made by placing the proper A charts under K in turn until two lenses which best meet practical requirements (a), (b) and (c) have been selected. As before, a temporary alignment mark is placed on sheet KK before each shift to the A chart for the lens of the other type. With some experience only a few shifts from one chart to another are necessary. After the proper adjustments have been made the values of $P_1$ and $P_2$ for both types are found. These give the specifications of the iseikonic eyeglasses.

The procedure used in selecting the proper values of $P_1$, $d_1$, $d_2$, and $P_2$ for a lens of type (3) is just the same as that used for types (4) and (5). The details of the procedure will be given for lens type (4) using the A and B charts shown in Figs. 32 and 33.

If the quick inspection with the proper section of the A chart under K shows that a lens of type (3) will not meet practical requirements (a), (b), (c), the proper sections of the A chart for lens type (4) are brought under the K sheet and a quick inspection made. If a suitable lens can be furnished the same process of shifting back and forth between the A charts for the lenses to be placed before the right and left eyes is carried out until an adjustment of the A roll under K has been found which will give the specifications for lenses best satisfying the practical requirements.

This procedure is carried on through the A chart for lenses of type (5) if nothing satisfactory is found earlier in the process. If no practical lens can be found of type (5) for one eye when a lens of type (1) or (2) is used for the other eye, a solution is sought with lenses of types (3), (4) and (5) before both eyes. Type (3) is tried first, (4) next and (5) last, the process being carried through to completion at the first trial which gives practical lenses.

In cases when practical requirement (c) is especially important, it is better to use lenses of types (3), (4) or (5) before both eyes if lenses of types (1) and (2) only cannot be used.

It should be understood that after some experience many of the above trials can be excluded as not applying to the case in question at all and what remaining trials must be made can be carried out in a very short time.

The procedure for finding the values of $P_1$, $d_1$, $d_2$, and $P_2$ for lenses of type (3) and $P_1$, $d_1$, $d_2$, and $P_4$ for lenses of types (4) and (5) is, as said before, exactly the same and will be explained for a lens of type (4) with $P_2=+4.50$, $P_3=-9.00$, $r=20$, $y=0.5$ referring to the sections of A and B chart for this type lens which are shown in Figs. 32 and 33.

In Fig. 32 let $X^m$ and $X^{m+90}$ be the points in the A chart which are directly under the points for meridian $m$ and $m+90$ on the K and KK sheets after the A roll has been suitably adjusted. In this example $X^m$ is the point $g=-2.50$, $LM=10.80$ and $X^{m+90}$ is the point $g=-1.50$, $LM=7.60$. A quick inspection shows that the value of $P_1$ will be around $-10.00$ for point $X^m$ and around $-8.00$ for point $X^{m+90}$. Hence $d_1$ may be chosen as 1 mm. since the lens formed by $P_1$ and $P_2$ will be a negative lens. A glance at the graph shown in Figs. 36 and 37 will show that with the given $g$ values and the estimated values of $P_1$, the value of $P_4$ in meridian $m$ will be approximately 16.00 and in meridian $m+90$ approximately 14.00. Since the lens farthest from the eye must have the same thickness in both meridians and must have minimum edge thickness of one millimeter, the value 16 is used in the graph shown in Fig. 37 to estimate the required $d_2$. This is found to be 4.4 mms. The nearest combination for which $P_1$ lines are given on the A chart to the combination $d_1=1.0$, $d_2=4.4$ is the $d_1=1.0$, $d_2=3.0$ combination. The next approximation is carried out using the $P_1$ lines for this combination. The $P_1$ value of the line of this combination which passes through $X^m$ is $-9.10$. Point $X^{m+90}$ can be disregarded for the time being since the value of $d_2$ must be selected so that the meridian which has the greatest $P_4$ value will have sufficient edge thickness. Fig. 36 shows that for $g=-2.50$ and $P_1=-9.10$, $P_4$ will be approximately 15.60 and the trim graph of Fig. 37 shows that this value of $P_4$ requires a thickness of 4 mms. A glance at the A chart shows that as $d_2$ is increased, $P_1$ will become smaller. Hence as a first approximation a graphical extrapolation will be made for the combination $d_1=1.00$, $d_2=3.50$. This is done by placing the 0 mark of the interpolation ruler shown in Fig. 38 on the point where the $P_1=-8.00$ line for the combination $d_1=1.00$, $d_2=2.00$ crosses the $g=-2.50$ line and adjusting the length of the ruler until the 10 mark on it is on the point where the $P_1=-8.00$ line of the combination $d_1=1.00$, $d_2=3.00$ crosses the $g=-2.50$ line. Since the relation between LM and $d_2$ is substantially linear when $P_1$, $g$, and $d_1$ are constant, the line for $P_1=-8.00$ for the combination $d_1=1.00$, $d_2=3.50$ would cross the $g=-2.50$ line half the distance between the 0 and 10 marks beyond the 10 mark. This point is found by measuring 5 divisions of the ruler as now set along the $g=-2.50$ line and the point is marked. It falls slightly to the left of $X^m$. The point where the line for $P_1=-7.00$ for the combination $d_1=1.00$, $d_2=3.50$ crosses the $g=-2.50$ line is found in exactly the same manner and marked. It falls to the right of $X^m$. Then by estimation (which is amply good with the large scales used) the value of the $P_1$ line for the combination $d_1=1.00$, $d_2=3.50$ which would pass through point $X^m$ is seen to be $P_1=-7.90$. Fig. 37 shows the $P_4$ value to be 14.50 and the necessary $d_2$ to be 3.30. The combination chosen is sufficiently close for all practical purposes. Graphical interpolation in an analogous manner for point $X^{m+90}$, for combination $d_1=1.00$, $d_2=3.50$, gives $P_1=-6.30$.

The points $P_1=-7.90$, $g=-2.50$ and $P_1=-6.30$, $g=-1.50$ are now plotted on the B chart as shown by points $Y^m$ and $Y^{m+90}$ respectively in Fig. 33. Graphical interpolation between the unit $P_4$ lines for combination $d_1=1.00$, $d_2=2.00$ gives $P_4=14.53$ and 12.17 for points $Y^m$ and $Y^{m+90}$ respectively. The use of the interpolation ruler shown in Fig. 38 in finding these values will be obvious. The same process for combination $d_1=1.00$, $d_2=3.00$ gives $P_4=14.38$ and 12.07 for $Y^m$ and $Y^{m+90}$. From these values by simple proportion the value of $P_4$ for the combination $d_1=1.00$, $d_2=3.50$ in meridian $m$ is 14.30 and in meridian $(m+90)$ is 12.02. The complete specifications of the lens of type (4) having the required $g$ and LM values in meridians $m$ and $m+90$ are given in tabular form in Fig. 39. This lens, when mounted so that the plane of the circle of intersection of $P_2$ and $P_3$ is at the standard position of the point of the bevel for which the A and B charts were computed and drawn, will have the desired $g$s and LMs values.

For case (2), that is, when the principal meridians of the two eyes are not parallel, the conditions of equivalence are, as given hereinbefore $$\left.\begin{array}{c}g_{SR}^m=g_{DR}^m\\ g_{SR}^{m+90}=g_{DR}^{m+90}\\ g_{SL}^n=g_{DL}^n\\ g_{SL}^{n+90}=g_{DL}^{n+90}\end{array}\right\}\mathrm{I}(2)$$

and $$\left.\begin{array}{c}LM_{SR}^m-LM_{SR}^{m+90}=LM_{1R}^m-LM_{1R}^{m+90}\\ LM_{SL}^n-LM_{SL}^{n+90}=LM_{1L}^n-LM_{1L}^{n+90}\\ LM_{SR}^m-LM_{SL}^n=LM_{1R}^m-LM_{1L}^n\end{array}\right\}\mathrm{LII}(2)$$

wherein $m$ is a principal meridian of the right eye and $n$ is a practical meridian of the left eye.

The procedure in this case is almost the same as in case (1) except that the four points $g=g_{DR}^m$, $LM=LM_{1R}^m$; $g=g_{DR}^{m+90}$, $LM=LM_{1R}^{m+90}$; $g=g_{DL}^n$, $LM=LM_{1L}^n$; and $g=g_{DL}^{n+90}$, $LM=LM_{1L}^{n+90}$ are all plotted on the K sheet. The A roll may now be adjusted to any position in the analogous section of any A chart and the values of $g$ and $LM$ for the points on the chart underneath the plotted points will satisfy conditions of equivalence I(2) and LII(2) if substituted for the S values. Since the movement is parallel to the constant $g$ lines condition I(2) is always satisfied. Since all the points are on a sheet of fixed dimensions, any movement of the A chart will add the same quantity to all the $LM_1$ values. The new values will then always satisfy conditions of equivalence LII(2).

The proper section or sections of the A charts for the various lens types are now brought in turn under the K sheet until a solution which satisfies practical conditions (a), (b) and (c) is found. The details of this are exactly the same as explained under case (1).

Since the KK sheet, with its independent freedom cannot be used in this case, the choice of lens type is more restricted. It will be only in exceptional cases that one of the lenses of the eyeglass can be a lens of type (1) or (2) and only in still more exceptional cases that both the lenses of the eyeglass can be of types (1) or (2). In most cases lenses of types (3), (4) or (5) must be used before both eyes, not necessarily the same type before each eye.

The lenses used in the eyeglass for case (2) will in general not be so good from any of the practical requirements, since the freedom given to meet these requirements by the independent movement of the KK sheet is not available. The procedure will, however, permit the lenses which best meet those practical requirements to be quickly and easily selected.

When the meridians $m$ and $n$ in case (2) differ from parallelism by a small amount, it may be possible to treat them as substantially parallel and use the procedure given for case (1) with its obvious advantages. The exact amount of departure from parallelism which is allowable when the procedure of case (1) is used is a function of the refractive defects and the eikonic differences present. In general, almost all cases in which the principal meridians of the two eyes are within five degrees (5°) of one another can be handled by the procedure of case (1) without introducing a substantial error. A considerable number of cases in which the principal meridians of the two eyes are within 10° of one another, and even a small number in which the principal meridians of the two eyes are within 20° can be so handled. Whether any particular case can be so handled can easily be determined when the $LM_1$'s are found by the nomographic process described, since in that process the maximum errors in size and angular difference which will be introduced by making independent changes in the values of $LM$ for the meridians which are close together, can be easily seen. If this is less than one-tenth unit of $LM$ or of the unit used to measure the angular deviations, the procedure for case (1) can be used with assurance that no error which is not negligible will be introduced.

The procedures given above will determine the type lenses to use which best meet practical requirements (a), (b) and (c) and will give the specifications for the lenses which are used. These specifications are the individual surface powers of all the surfaces and the thicknesses of the lenses.

The lenses so selected and made will form an iseikonic eyeglass if they are mounted on the patient's face in such a way that the position of the point of the bevel on the lenses is at the standard distance from the pole of the cornea and if the rays from the point of attention which enter the patient's eyes are in the neighborhood of the optical axis of the lenses.

The lenses of types (1) and (2) are beveled in such a way that the point of the bevel (that is, the intersection of the beveled surfaces, which is also substantially the center of the eyewire in which the lens is mounted) has the specified relation to the edge of the spherical surface. The lenses of type (3) are beveled so that the point of the bevel lies on the surface $P_c$. The lenses of types (4 and (5) are beveled so that the point of the bevel is the circle where $P_2$ and $P_3$ intersect. When this is done the lenses will be at the proper distance from the pole of the cornea if the frame used to hold them is adjusted so that the center of the eyewires is at the standard distance.

Lenses of types (1) and (2) may be cut to any lens shape that is used for ordinary lenses used to correct refractive defects only. When an odd shape is used the beveling must be so carried out that the point of the bevel on the horizontal meridian is in the correct relation to the circle of radius $r$ on the spherical surface. The frame holding the lenses is then adjusted so that the center of the eyewire horizontally opposite the pole of the cornea is at the standard distance.

Lenses of type (3) may be cut to any shape desired, although it is perhaps preferable for mechanical reasons to cut them round. If they are cut to odd shapes the point of the bevel on the horizontal must be carefully placed in the same plane as the circle of radius $r$ on the surface $P_c$ (see Fig. 28).

Lenses of types (4) and (5) should be cut round in order to permit proper sealing of the air lens, against the entrance of dirt, moisture, etc. If the diameter of the lens desired is $2r$, the two components are joined by grinding a seat of width $y$ on the negative surface of the front lens and cementing the two together. If different diameters are desired, a larger one can be used by increasing $y$ by a suitable amount. A smaller one can be used by increasing the thickness of the layer of sealing cement sufficiently or inserting a spacing washer to keep $w$ the same as for lenses of radius $r$.

The plane of center of the eyewire for round lenses and the horizontal line passing through the center of the eyewires for oddly shaped lenses have been adopted as the reference plane or line which is to be used in adjusting the frames so that the lenses will be placed at the correct distance from the poles of the corneas. The proper mounting of the lenses so that this distance is exactly the distance for which the lenses were designed is an important consideration when the eyeglasses are iseikonic. The frame must also be sufficiently rigid so that the lenses will always be at their correct position when the eyeglasses are worn. The importance of this proper distance is a function of the amount of the refractive correction. Since almost all cases have some refractive correction it is easily seen that this consideration is important in a large percentage of the cases for which iseikonic eyeglasses are prescribed.

The reference plane and line given above have been adopted for several reasons. First, it is a fairly convenient reference from which to measure the distance. Second, it bears a fixed relation to the lenses before they are mounted in the frame, namely, to the point of the bevel. Third, for practically all cases the distance is the same for both lenses of the eyeglass. Fourth, it is the natural reference point to use in a quick visual adjustment of the frame so that the distance is the same for both eyes. In most cases the difference in the deviation from the designed position for the two eyes is of more importance than the individual deviations.

There will be many cases for which the standard distance used in computing the A and B charts may not be desirable and which require a different distance of mounting. The most desirable distances vary between the limits of eight (8 mms.) millimeters and sixteen (16 mms.) millimeters. Hence it is desirable to design the iseikonic eyeglasses so that they are to be mounted with the reference plane or line at the desired distance from the poles of the corneas. This cannot practically be done by shifting the position of the bevel with relation to the standard position. Lenses of types (1) and (2) would, if designed with the usual thicknesses, have no glass present upon which to place the point of the bevel. If designed of sufficient thickness to allow this, they would be highly undesirable in most cases from the point of view of practical requirement (b) given above. Lenses of types (3), (4) and (5) should have the point of the bevel placed at the position shown in Fig. 29 so that the V-shaped groove in the eyewire will mechanically reinforce the cement which holds the two lenses in proper relation to one another and which excludes moisture, dirt, etc., from the space between the two lenses.

It is possible to use the A and B charts which have been computed for the standard distance of the point of the bevel, $f_0$, to choose the type and find the specifications of the lenses for an iseikonic eyeglass which is to be mounted on the patient at any desired distance $f_e$. The following explanation will give the procedure used to do this.

Let $f_e$ be the distance between the poles of the corneas and the center of the eyewire at which it is desired to mount the eyeglass. Let $f_0$ be the standard distance for which the A and B charts are drawn. Let the quantity $(f_e - f_0)$ be $\Delta f$.

As before, let $g_S$ and $M_S$ be the values of the reciprocal of the image distance from nodal point N and the angular magnification about N for a principal meridian of one of the lenses in the iseikonic spectacle which corrects the defects when mounted at distance $f_e$. Let the value of these quantities when the same lens is mounted at distance $f_0$ be $g_{S_o}$ and $M_{S_o}$, the amount of change in $g$ and $M$ or $\Delta g = (g_{S_o} - g_S)$ and $\Delta M = (M_{S_o} - M_S)$ can then be found from the following considerations.

If the expression for $g$ for any lens is differentiated with respect to X (see Fig. 19) the following relation is obtained $$\frac{dg}{dX} = \frac{M^2}{a^2} - g^2 \qquad (28)$$

or a good approximation for the change in $g(\Delta g)$ for a small finite change in X ($\Delta X$) will be $$\Delta g = \left[\frac{M^2}{a^2} - g^2\right]\Delta X \qquad (29)$$

If the expression for M for any lens is differentiated with respect to X and all quantities which will be negligibly small when multiplied by the small factor $\Delta X$ are neglected, the following expression is obtained $$\frac{dM}{dX} = -M\left(g + \frac{1}{L_1}\right) \qquad (30)$$

In this expression, $L_1$ is the distance from the object to the anterior surface of the lens. From (30) a good approximation for the change in $M(\Delta M)$ for a small change in $X(\Delta X)$ will be $$\Delta M = -M\left(g + \frac{1}{L_1}\right)\Delta X \qquad (31)$$

In order to apply expressions (29) and (31) to the lens under discussion the following substitutions must be made $$\left.\begin{array}{l}\Delta X = -\Delta f \\ g = g_S \\ M = M_S\end{array}\right\} \qquad (32)$$

Making these substitutions the relations $$\Delta g = \left[g_S^2 - \frac{M_S^2}{a^2}\right]\Delta f \qquad (33)$$

and $$\Delta M = M_S\left(g_S + \frac{1}{L_1}\right)\Delta f \qquad (34)$$

are obtained.
As given above $$\Delta g = g_{S_o} - g_S \qquad (35)$$

and $$\Delta M = M_{S_o} - M_S \qquad (36)$$

In expression (33) $M_S$ in all cases can be written as $1+p$ where $p$ is a small quantity. Also $g_S$ is equal to $g_D$ in any specific case if the spectacle lens satisfies conditions of equivalence (I). Making these substitutions in (33) the relation $$\Delta g = \left(g_D^2 - \frac{1 + 2p + p^2}{a^2}\right)\Delta f \qquad (37)$$

is obtained.
The factors $$\frac{2p}{a^2}\Delta f \text{ and } \frac{p^2}{a^2}\Delta f$$

can be considered negligible and the final expression becomes $$\Delta g = \left[g_D^2 - \frac{1}{a^2}\right]\Delta f \qquad (38)$$

Condition of equivalency (I) for any meridian is $$g_S = g_D \qquad (39)$$

Substituting the value of $g_S$ from (35) in (39) gives $$g_{S_o} = g_D + \Delta g \tag{40}$$

If $g_1$ is defined by $$g_1 = g_D + \Delta g \tag{41}$$

where $\Delta g$ is given by (38) the conditions of equivalency between $g_{S_o}$ and $g_1$ will be exactly the same as the conditions between $g_S$ and $g_D$.

Substituting $g_D = g_S$ in (34) and substituting for $\Delta M$ in (36) gives $$M_S \left( g_D + \frac{1}{L_1} \right) \Delta f = M_{S_o} - M_S \tag{42}$$

Solving for $M_{S_o}$ $$M_{S_o} = M_S \left[ 1 + \left( g_D + \frac{1}{L_1} \right) \Delta f \right] \tag{43}$$

Taking the logarithm of both sides of Equation (43) and multiplying through by 230 gives $$LM_{S_o} = LM_S + 230 \log \left[ 1 + \left( g_D + \frac{1}{L_1} \right) \Delta f \right] \tag{44}$$

or defining $\Delta LM$ by the relation $$\Delta LM = 230 \log \left[ 1 + \left( g_D + \frac{1}{L_1} \right) \Delta f \right] \tag{45}$$

$$LM_{S_o} = LM_S + \Delta LM \tag{46}$$

The condition of equivalence $LII_{(1)}$ are $$\left. \begin{array}{l} LM_{SR}^m - LM_{SL}^m = LM_{1R}^m - LM_{1L}^m \\ LM_{SR}^{m+90} - LM_{SL}^{m+90} = LM_{1R}^{m+90} - LM_{1L}^{m+90} \end{array} \right\} \tag{47}$$

Substituting for $LM_S$ in (47) from (46) and rearranging gives $$\left. \begin{array}{l} LM_{S_oR}^m - LM_{S_oL}^m = LM_{1R}^m + \Delta LM_R^m - (LM_{1L}^m + \Delta LM_L^m) \\ LM_{S_oR}^{m+90} - LM_{S_oL}^{m+90} = LM_{1R}^{m+90} + \Delta LM_R^{m+90} - (LM_{1L}^{m+90} + \Delta LM_L^{m+90}) \end{array} \right\} \tag{48}$$

In exactly the same manner condition of equivalence $LII_{(2)}$ and relation (46) gives $$\left. \begin{array}{l} LM_{S_oR}^m - LM_{S_oR}^{m+90} = LM_{1R}^m + \Delta LM_R^m - (LM_{1R}^{m+90} + \Delta LM_R^{m+90}) \\ LM_{S_oL}^m - LM_{S_oL}^{n+90} = LM_{1L}^m + \Delta LM_L^m - (LM_{1L}^{m+90} + \Delta LM_L^{m+90}) \\ LM_{S_oR}^n - LM_{S_oL}^n = LM_{1R}^m + \Delta LM_R^n - (LM_{1L}^n + \Delta LM_L^n) \end{array} \right\} \tag{49}$$

If $LM_2$ be defined by the relation $$LM_2 = LM_1 + \Delta LM \tag{50}$$

where $\Delta LM$ is given by (45), the conditions of equivalency between $LM_{S_o}$ and the $LM_2$ will be the same as the conditions between $LM_S$ and the $LM_1$.

Hence, in order to use A and B charts computed for the standard distance $f_o$ for selecting the types of, and to give the specifications for the lenses to be used in an iseikonic eyeglass to be mounted at distance $f_e$ from the poles of the cornea, the values of $g_1$ and $LM_2$ for each meridian are first found. Then, using these values instead of $g_D$ and $LM_1$, the procedure is identical with that already described.

In order to find quickly and easily the value of $g_1$ for any given values of $g_D$ and $\Delta f$, the relation $\Delta g_c = g_D^2 \Delta f$ is plotted for the unit values of $\Delta f$ which will be used. For convenience the log $g_D$ is used as abscissa, and the log $\Delta g_c$ is used as ordinate. Coordinate paper is used which has lines ruled for equal intervals of $g$ and $\Delta g_c$ when the logarithms are used as above. Using log $g_D$ and log $\Delta g_c$ the relation $\Delta g_c = g_D^2 \Delta f$ is a straight line for a constant $\Delta f$. This relation for unit values of $\Delta f$ is shown in Fig. 40. When $g_D$ and $\Delta f$ are known, $\Delta g_c$ is given by the value of $\Delta g_c$ where the line for the given $\Delta f$ crosses the line for the given $g_D$. Then $$\Delta g = \Delta g_c - \frac{\Delta f}{a^2} \tag{51}$$

After $\Delta g$ is found, $g_1$ can be found by adding $\Delta g$ and $g_D$.

In order to quickly and easily find the value of $LM_2$ for any given values of $g_D$ and $\Delta f$, the relation given in Equation (45) between $\Delta LM$ and $g_D$ is plotted for the unit values of $\Delta f$ which will be used. An approximation for $L_1$ must be used. It is easily seen that the approximation $$L_1 = f_o + .007 - a \tag{52}$$

will be a sufficient one. Relation (45), when $a = 6.096$ meters (that is the usual value of 20 feet for the distant vision test) and the value of $L_1$ given in (45) is used, is shown for unit values of $\Delta f$ in Fig. 41. $\Delta LM$ for a given $g_D$ and $\Delta f$ can be found from this chart in the same manner that $\Delta g_c$ is found from the chart shown in Fig. 40. After $\Delta LM$ is found, $LM_2$ can be found by adding $\Delta LM$ and $LM_1$.

As mentioned before, independent tests are made for distant vision and for near vision. In many cases it may be desirable to furnish a single eyeglass which may be used for both distance and near vision. In general it will not be possible to furnish an eyeglass which will be completely iseikonic at both distances unless very definite relations exist between the refractive defects and eikonic differences found and measured at the two distances. These relations will only exist in a small percentage of cases. The cases for which these relations do not exist can be separated into two classes, (a) when the refractive defects are corrected by the same dioptric test lenses at both distances, and (b) when the refractive defects require different dioptric test lenses for correction at the two distances.

For class (a) it is possible to furnish eyeglasses which substantially correct the refractive defects at both distances and correct the eikonic differences for each distance in proportion to the time the eyeglasses are to be used at each distance. The correction of the eikonic differences at both distances will in most cases be sufficiently good so that almost all of the harmful effects of aniseikonia will be alleviated.

For glass (b) it is possible in many cases to furnish eyeglasses which correct the refractive defects and the eikonic differences for distant vision, and which substantially correct the refractive defects and in many cases partially correct the eikonic differences for near vision.

For cases which are in class (a) the following procedure is used. The specifications of the iseikonic eyeglasses which correct both the refractive defects and eikonic differences are found for each distance; using the same type of lens before the same eye at both distances, the same thicknesses and positions of the bevels of the lenses of types (1) and (2), if they are used, for both distances, the same thicknesses of the components of lenses of types (3), (4) or (5), if they are used, at both distances, and as nearly as possible the same values of $P_1$ for the lens before the right eye. The procedure used now varies somewhat, depending if the case is (1) (principal meridians parallel) or (2) (principal meridians not parallel). They will be discussed separately. The discussion will be given when lenses of types (1) or (2) or (3) are used for both eyes, with the changes necessary when a lens of types (4) or (5) is used being indicated by placing the proper quantity to substitute in parentheses.

For cases (1) the following quantities are found, using the notation previously used in connection with $g$ and $M$ for the surface powers with an additional subscript $n$ for near and $f$ for distance:

$$\left.\begin{array}{l}[P_{1Rn}^m + P_{2Rn}^m \text{ (or } P_4)] = A_{Rn}^m \\ [P_{1Rf}^m + P_{2Rf}^m \text{ (or } P_4)] = A_{Rf}^m \\ [P_{1Rn}^{m+90} + P_{2Rn}^{m+90} \text{ (or } P_4)] = A_{Rn}^{m+90} \\ [P_{1Rf}^{m+90} + P_{2Rf}^{m+90} \text{ (or } P_4)] = A_{Rf}^{m+90} \end{array}\right.$$

and similar quantities $A_L$ for the left eye lens, and $$\left.\begin{array}{l}[P_{1Rn}^m - P_{1Ln}^m] = B_n^m \\ [P_{1Rf}^m - P_{1Lf}^m] = B_f^m \\ [P_{1Rn}^{m+90} - P_{1Ln}^{m+90}] = B_n^{m+90} \\ [P_{1Rf}^{m+90} - P_{1Lf}^{m+90}] = B_f^{m+90}\end{array}\right\} \quad (53)$$

If the relative amounts of use of the eyeglasses for distance and near vision are in the ratio $T_f/T_n$ then the specifications for the best form of eyeglasses for both distances are given by the following expressions, the subscript corresponding to $n$ or $f$ being omitted from the letters used to signify the quantities for the best eyeglasses. The ratio $T_f/T_n$ is to be determined by the clinician.

$$\left.\begin{array}{l}\left.\begin{array}{l}P_{1R}^m = P_{1Rn}^m \\ P_{1R}^{m+90} = P_{1Rf}^{m+90}\end{array}\right\} \text{ if } \frac{T_f}{T_n} > 0.5 \\ \left.\begin{array}{l}P_{1R}^m = P_{1Rn}^m \\ P_{1R}^{m+90} = P_{5Rn}^{m+90}\end{array}\right\} \text{ if } \frac{T_f}{T_n} < 0.5 \\ P_{1L}^m = P_{1R}^m - \frac{B_f^m T_f + B_n^m T_n}{T_f + T_n} \\ P_{1L}^{m+90} = P_{1R}^{m+90} - \frac{B_f^{m+90} T_f + B_n^{m+90} T_n}{T_f + T_n}\end{array}\right\} \quad (54)$$

$$\left.\begin{array}{l}P_{2R}^m(\text{or } P_4) = \frac{A_{Rf}^n T_f + A_{Rn}^n T_n}{T_f + T_n} - P_{1R}^m \\ P_{2R}^{m+90}(\text{or } P_4) = \frac{A_{Rf}^{m+90} T_f + A_{Rn}^{m+90} T_n}{T_f + T_n} - P_{1R}^{m+90} \\ P_{2L}^m(\text{or } P_4) = \frac{A_{Lf}^n T_f + A_{Ln}^n T_n}{T_f + T_n} - P_{1L}^m \\ P_{2L}^{m+90}(\text{or } P_4) = \frac{A_{Lf}^{m+90} T_f + A_{Ln}^{m+90} T_n}{T_f + T_n} - P_{1L}^{m+90}\end{array}\right\} \quad (55)$$

These expressions are derived from the relations $$\left.\begin{array}{l}\frac{A_f - A}{A - A_n} = \frac{T_n}{T_f} \\ \frac{B_f - B}{B - B_n} = \frac{T_n}{T_f}\end{array}\right\} \quad (56)$$

where $A$ and $B$ are corresponding expressions for the best eyeglasses for both distances.

Relations (56) mean that the errors in the correction of the refractive defects and the errors in the correction of the eikonic differences are in inverse proportion to the amount of time that the eyeglasses are to be used.

For cases of type (2) the following quantities are found.

$$A_{Rn}^m, A_{Rf}^m, A_{Rn}^{m+90}, A_{Rf}^{m+90}, A_{Ln}^n, A_{Lf}^n, A_{Ln}^{n+90}, A_{Lf}^{n+90},$$

which are defined in the same way as in relations (53). Also the following quantities are found. $C_{Rn}, C_{Rf}, C_{Ln}, C_{Lf}$, where $C$ is defined as $$C = P_1^\phi - P_1^\phi + 90 \quad (57)$$

and the quantities $D_n$ and $D_f$ where $D$ is defined as $$D = P_{1R}^m - P_{1L}^n \quad (58)$$

The specifications of the best eyeglasses for both distances are then given by $$\left.\begin{array}{l}P_{1R}^m = P_{1Rf}^m \text{ if } \frac{T_f}{T_n} > 0.5 \\ \\ P_{1R}^m = P_{1Rn}^m \text{ if } \frac{T_f}{T_n} < 0.5 \\ \\ P_{1R}^{m+90} = P_{1R}^m - \frac{C_{Rf} T_f + C_{Rn} T_n}{T_f + T_n} \\ \\ P_{1L}^n = P_{1R}^m - \frac{P_f T_f + D_n T_n}{T_f + T_n} \\ \\ P_{1L}^{n+90} = P_{1L}^n - \frac{C_{Lf} T_f + C_{Ln} T_n}{T_f + T_n}\end{array}\right\} \quad (59)$$

or and expressions given in (55) for the $P_2$'s (or $P_4$'s).

These expressions are derived from the relations $$\left.\begin{array}{l}\frac{C_f - C}{C - C_n} = \frac{T_n}{T_f} \\ \frac{D_f - D}{D - D_n} = \frac{T_n}{T_f}\end{array}\right\} \quad (60)$$

and wherein $C$ and $D$ are corresponding expressions for the best eyeglass for both distances.

Relations (60) have the same meaning as (56).

For cases which are in class (b), i. e. where different dioptric test lenses are used to correct the refractive defects, at the two distances, and in which the change in the dioptric test lenses consists of a change in lens (1) only, the following procedure is used.

The specifications for the eyeglass which corrects the refractive defects and eikonic differences for distant vision are first found, with lenses of types (3) or (4) before both eyes, these types being chosen for reasons appearing hereinafter. If lenses of type (3) are used before both eyes the same value of $P_c$ is used for both lenses. If a lens of type (3) is used before one eye and a lens of type (4) before the other, the same values of $P_c$ and $P_2$ are used for both lenses. If two lenses of type (4) are used the same value of $P_2$ is used for both lenses.

In selecting the type of lenses to use and in finding their specifications particular care is used to satisfy practical requirement (C), i. e. that the properties of the lenses are the same for oblique rays as they are for axial rays, as completely as possible.

Figure 43:
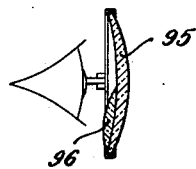
Figs. 43 and 44 show spectacle lenses according to my invention with inserts, and inserts and slipover lenses, respectively.

For the lens nearest the eye, a lens which has a fused insert of glass of higher refractive index on the anterior surface is used. This fused insert is such that it will add spherical power to the lens which is as nearly as possible equal to the differences in dioptric test lens (1) used at the two distances in that portion of the lens which is occupied by the fused insert. A lens of this type is schematically shown in Fig. 43.

The part of the lenses not occupied by the fused insert of the above eyeglass will be an iseikonic eyeglass for distant vision. The part of the lenses occupied by the fused insert of the above eyeglass will be an eyeglass which substantially corrects the refractive defects for near vision and partially corrects the eikonic differences found for near vision.

If the eikonic differences found and measured after the refractive defects are corrected at both distances, are substantially the same at both distances, and the change in dioptric test lens (1) is the same for both eyes, the above procedure will provide bifocal eyeglasses which are substantially iseikonic for near vision since in the tests for distant and near vision dioptric test lens (1) is always used at the same distance from the eyes. Therefore the changes in size introduced by the change in power of dioptric test lens (1) will be substantially the same for the two eyes when the change in power is the same for both eyes. In the procedure explained above, the fused insert is always placed in a surface which is equidistant from both eyes. Hence the change in size introduced by the fused insert will be substantially the same for the two eyes when the spherical power added by the fused inserts is the same.

For many of the cases which are in class (b) (different dioptric corrections at the two distances) the above given condition will be substantially fulfilled. Hence eyeglasses which are suitable for both distances can be provided for many of the cases. Those cases for which the above-given conditions are not fulfilled will be provided with eyeglasses which are iseikonic for distant vision and which correct the refractive defects found for near vision, if the above procedure is used. If such eyeglasses are not sufficiently good, either two separate eyeglasses must be prescribed, one of which is iseikonic for distant vision, and one of which is iseikonic for near vision or an auxiliary lens or lenses to cover the lower half or halves of the spectacle lenses must be added. The design of the auxiliary lens or lenses will be explained hereinafter.

The value of $P_c$ used in the A and B charts for lenses of type (3) and the values of $P_2$ used in the A and B charts for lenses of type (4) are selected in such a way that lenses with anterior surfaces of these powers and with fused inserts of higher index of refraction glass, which give added spherical power in small equal steps to that portion of the lens occupied by the fused insert, are commercially available. Such lenses for correcting the refractive errors at two distances have been used for many years in eyeglasses for the correction of refractive defects only. This selection of $P_c$ and $P_2$ thus makes these commercial lenses available for iseikonic eyeglasses for two distances.

In those cases which require a different refractive correction for distant and near vision, but where the difference consists of only a change in the spherical dioptric test lens (1), eyeglasses can be furnished, by the above described procedure, which are iseikonic for distant vision and which correct the refractive errors for near vision and which in certain cases correct the eikonic errors for near vision.

Such eyeglasses may be made iseikonic for near vision with the addition of so-called slip-over or fit-over lenses before one or both eyes. These slip-over lenses may consist of half lenses, covering only the lower half of the eyeglass lenses. The upper halves of the eyeglass lenses will then form an iseikonic spectacle for distant vision. That part of the lower halves of the eyeglass lenses which is occupied by the fused bi-focal insert forms an iseikonic spectacle for near vision.

In order to find the specifications for the additional slip-over lenses required, the following procedure is used. The iseikonic spectacles for distant vision with the additional spherical power required for near vision added with fused inserts of glass of higher index of refraction are furnished according to the procedure given above for such cases. The finished eyeglasses are then placed in an instrument which will measure the $g$ and LM values. The $g$ and LM values of that portion of the lenses occupied by the fused insert are measured when the eyeglasses are placed in the instrument exactly as they will be placed on the wearer.

The values of $g_D$ and $LM_1$ are then found from the clinical record for near vision. These, together with the measured values, are set down in tabular form as below.

| Meridian | Right eye | | Left eye | |
|---|---|---|---|---|
| | $n$ | $n+90$ | $n$ | $n+90$ |
| $g_D$ | | | | |
| $g_s$ | | | | |
| $g_D-g_s$ | | | | |
| $LM_1$ | | | | |
| $LM_s$ | | | | |
| $LM_1-LM_s$ | | | | |

In general the values of $(g_D-g_s)$ will be small since the eyeglasses are designed substantially to correct the refractive errors for near vision. With this assumption the $g_{s1}$ values, that is, the $g$ values of the slip-over lenses, are given by $$2.50+(g_D-g_s)$$

in each meridian.

The LM values of the spectacles and slip-overs must meet the conditions of equivalence already given, wherein two cases must again be distinguished (1) when the principal meridians are parallel; and (2) when the principal meridians are not parallel. If the LM value of the slip-over lenses is denoted by $LM_{s1}$, then for small values of $(2.50-g_{s1})$, the LM values of the spectacles and slip-overs will be $LM_{s1}+LM_s$. For case (1) the condition of equivalence can then be written $$LM_{s1R}^n - LM_{s1L}^n = (LM_{1R}^n - LM_{1L}^n) - (LM_{1R}^m - LM_{1L}^m) \quad (61)$$

with a similar relation for meridian $(m+90)$.

In case (2) the condition of equivalence can be written $$LM_{s1R}^m - LM_{s1L}^{m+90} = (LM_{1R}^m - LM_{1L}^m) - (LM_{1R}^{m+90} - LM_{1L}^{m+90}) \quad (62)$$

with similar relations for meridian $n$ and $n+90$ for the left eye lens and for meridian $m$ of the right eye lens and meridian $n$ of the left eye.

Comparing these conditions with the condition of equivalence used in the general design of iseikonic spectacles, it will now be seen that the slip-over lenses must be designed with $$g_1=2.50+(g_D-g_s) \quad (63)$$

and $$LM_2=LM_1-LM_s \quad (64)$$

Since $(g_1-2.50)$ will be small, the position of mounting before the eyes will be relatively unimportant and lenses designed for the $f_0$ distance will be substantially correct at any distance.

Lenses of types (1), (2), and (3) should be used for the slip-overs for two reasons: First, the internal air lens in lenses of types (4) and (5) could not be properly sealed if the lenses were cut along a diameter. Second, the slip-over lenses will be used with the axis of vision considerably removed from the optic axis. When $(g_1-2.50)$ is small, no substantial error is introduced for lenses of types (1), (2), and (3) by considering the properties about the optic axis to be identical with the properties about a visual axis considerably, for example, twenty (20°) degrees, removed. A similar statement can not, in general, be made concerning lenses of types (4) and (5).

Figure 44:
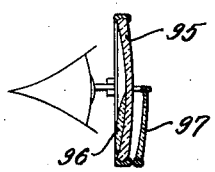

The finished iseikonic eyeglasses which are iseikonic for both distance and near vision will then consist of an iseikonic eyeglass for distant vision made up of lenses of types (3), (4), or (5) (in certain exceptional cases, lenses of types (1) and (2) may be used) with fused inserts of glass of higher index of refraction and with slip-over lenses covering all or a part (at least, as much as is covered by the fused inserts) of the lower half of the eyeglass lenses. A lens of this type is shown in Fig. 44, where 95 is the eyeglass according to my invention correcting both dioptric and eikonic defects for far vision, 96 is the insert providing correct dioptric correction for near vision, and 97 is the slip over lens providing eikonic correction for near vision.

When the specifications for the lenses used in the iseikonic eyeglass have been found as described above, they will consist, as is given for example in Fig. 39, of the surface powers of all the surfaces in the principal meridians, the thicknesses of the components of lenses of types (3), (4) and (5), the thicknesses of the lenses of types (1) and (2) and the relation of the point of the bevel to the plane of a circle of selected radius $r$ on the spherical surface of lenses of types (1) and (2). For lenses of type (3) the point of the bevel is always placed in the plane of the circle of radius $r$ on $P_c$ and in lenses of types (4) and (5) it is always placed in the plane of the circle of radius $r-y$ which is the line of intersection of $P_2$ and $P_3$.

If the lenses were made to these exact specifications new surface grinding tools would be required for almost every surface, since powers found for the two meridians of the toric surface are independent of one another. In this case practical requirement (a) would not be sufficiently fulfilled.

By making changes in the true designed values of the powers, which changes are sufficiently small so that no substantial error in the correction of the dioptric defects or the eikonic differences is introduced, according to the following procedure, it is possible in most cases to use surface powers which can be ground from a stock of surface grinding tools which is not so large as to be impractical.

The stock of tools to be used is the following:

Spherical tools in one-eighth (⅛ D.) diopter steps from minus twenty to plus twenty diopters. Such a set of tools enables a spherical surface of any power, to the nearest hundredth diopter, between minus and plus twenty diopters to be made, since as is well known it is possible to control the grinding and polishing operation so that the finished surface will be either more or less curved than the tool by a selected amount not greater than six one-hundredths of a diopter.

Positive toric tools to grind minus surfaces such that the least curved meridian of any tool is in one-eighth diopter steps from zero to plus twenty diopters; such that there is a tool for every one-half diopter step of the difference in curvature of the two meridians when this difference is between 0 and 5 diopters, and with the restriction that no curvature greater than 20 diopters is to be on any tool.

Negative toric tools to grind plus surfaces such that the least curved meridian of any tool is in one-half diopter steps from zero to minus twenty diopters; such that there is a tool for every one-eighth diopter step of the difference in curvature of the two meridians when this difference is between 0 and 5 diopters, and with the restriction that no curvature greater than 20 diopters is to be on any tool.

From the above it is easily seen that such a stock of tools will consist of three hundred and twenty (320) spherical tools, one thousand four hundred (1400) positive toric tools, and one thousand four hundred (1400) negative toric tools; a total stock of three thousand one hundred and twenty (3120) surface tools.

Such a stock of tools can be used to grind the lenses for practically all iseikonic eyeglasses whose specifications are found as described above except those which have one or both lenses of type (2), if the following procedure is adopted.

Beginning with the meridian of least curvature one of the positive toric surfaces, the nearest multiple of one-half diopter is substituted for it. Then the value of the curvature of the negative toric surface in the same meridian is changed so that the sum $(P_1+P_4)$ is the same as in the original specifications, and the nearest multiple of one-eighth diopter is substituted for the changed value. The value such that the difference in curvature between the two meridians of the negative toric surface is a multiple of one-half diopter, which gives nearest to the same change as was made in the meridian referred to above, is now substituted for the value of the curvature of the negative toric surface in the other meridian. Then the value of the curvature of the positive toric surface in the same meridian is changed so that the sum $(P_1+P_4)$ is the same as in the original specifications, and the nearest multiple of one-eighth diopter which will give as nearly as possible the same error in the sum $(P_1+P_4)$ for both meridians is substituted for the changed value.

When a lens of type (4) or (5) is used before one eye and a lens of type (1) before the other, or when there is an appreciable difference in thickness between the lenses used before each eye, the following procedure is used to keep the errors in magnification introduced by using a finite number of surface tools at a minimum.

In these cases the surface tools for the double lens are selected exactly as before described. If the eyeglasses are made up of two double lenses, the surface tools for either one of the double lenses are selected as before described. Three cases must now be distinguished; (a), when the eyeglasses consist of a double lens and a single lens; (b), when the eyeglasses consist of two double lenses and the principal meridians are parallel; and (c), when the eyeglasses consist of two double lenses and the principal meridians are not parallel.

In case (a) the average change in curvature in the two meridians of the positive surface is multiplied by a fraction whose numerator is the "equivalent" thickness of the lens for which the surface tools have been specified and whose denominator is the "equivalent" thickness of the other lens. By "equivalent" thickness is meant the thickness of glass for lenses of types (1), (2), or (3), and the total thickness of glass plus one and one-half times the air space between the lenses for lenses of types (4) and (5). The lowest curvature of the toric surface of the other lens is now changed by this amount, that is, average multiplied by above fraction, and the nearest one-half diopter tool to this changed value is used. The previously described procedure is then used for the other curvature of the toric surface and for the spherical surface.

In case (b) the change in each meridian of the lens for which surface tools have been selected is multiplied by the above fraction, the specified powers in the parallel meridians of the other eye are then changed by the product and the nearest one-half diopter positive base curve and nearest one-half diopter negative cylinder to these changed values are selected.

In case (c) the same procedure as in case (a) is used to find a changed value for the lowest curvature of the positive toric surface for which the nearest one-half diopter is selected. The previously described procedure is then used for the other meridian.

This procedure will perhaps be better understood by carrying it out for the practical example given in Fig. 39. In this example the value 12.02 of $P_4$ is replaced by 12.00. The value $-6.30$ of $P_2$ is now changed to $-6.28$ so that the sum is the same as before and $-6.25$ is substituted for this, the error of $+0.03$ being noted. The value $-7.90$ of $P_1$ is now changed to $-7.75$. The value 14.30 of $P_4$ is now changed to 14.15 so as to keep the sum in meridian $m$ the same. If 14.12 be substituted for this the error is $-0.03$. If 14.25 be substituted for this the error is $+0.10$. The error $-0.03$ is nearer to the known error of $+0.03$ in the other meridian than 0.10. Therefore 14.12 is substituted for 14.15.

The value of either $P_2$ or $P_3$ is now changed so that the error in the sum $P_1+P_2+P_3+P_4$ is equal but opposite in sign in both meridians. In the example given no change in $P_2$ or $P_3$ is made as the errors with the changed values of $P_1$ and $P_4$ are equal and opposite in sign in the two meridians.

This explains the procedure for lenses of types (4) and (5). For lenses of type (1) the sums $(P_1+P_2)$ instead of $(P_1+P_4)$ are kept constant. The value of $P_1$ is the same in both meridians, and the errors in each meridian are made equal and opposite in sign by a suitable selection of $P_1$.

It will be seen that the above procedure gives final specifications in which the sum of the surface powers in any meridian is not more than 0.03 diopter for lenses of types (1), (4) and (5) or more than 0.06 diopter for lenses of type (3) different from the same sum for the original specifications obtained from the A and B charts. This means that no error greater than 0.03 diopter for lenses of types (1), (4) and (5) or of 0.06 diopter for lenses of type (3) in the correction of the dioptric defects is introduced. In most cases the error will be less than the above given maximum limits.

Also in the final specifications the quantity $(P_{1R}-P_{1L})$ corrected for equivalent thickness, for parallel principal meridians and the quantities $$P_{TR}^m - P_{TR}^{m+90}, P_{TL}^n - P_{TL}^{n+90}, \text{ and } P_{TR}^n - P_{TL}^n,$$

corrected for equivalent thickness, for non-parallel principal meridians are not more than 0.25 diopter different from the same quantity for the original specifications. This means that in almost all cases no error greater than 0.10 per cent is introduced in the correction of the eikonic differences.

Therefore the above procedure makes it possible to grind the lenses for almost all iseikonic spectacles with the stock of tools given. The error in the correction of the dioptric defects and eikonic differences which this procedure introduces are all negligible.

A smaller stock of tools will grind the lenses for a very considerable percentage of all average iseikonic eyeglasses. Such a smaller stock comprises for example tools where the one-half diopter steps for the least curved meridian of the negative toric tools are only those between minus two and minus ten diopters and no curvature greater than minus fifteen diopters is present on any tool and where the one-eighth diopter steps for the least curved meridian of the positive toric tools are those between plus four and plus twelve diopters and so no curvature greater than seventeen diopters is present on any tool, together with the given stock of spherical tools. Such a stock as given above would consist of one thousand two hundred and eighty (1280) toric tools and again three hundred and twenty (320) spherical tools.

A still smaller list of toric tools would grind a large percentage of the lenses used in iseikonic eyeglasses if suitable care were used in the selection of the lenses. This suitable care could easily be exercised when the types of and specifications for the lenses were found with the aid of the A and B charts, as previously described.

In any of the above the term toric tool can be replaced by stock toric surface as will be obvious. Hence if it is desired to use semi-finished lenses, of which the toric side is finished, in the manufacture of the lenses for iseikonic eyeglasses, a stock consisting of not more than one thousand separate items will be sufficient for a large percentage of cases. The specifications of the separate stock surfaces must be chosen in accordance with a suitable plan so that no errors not negligible in the correction of either the dioptric defects or the eikonic differences will be introduced. An example is the abbreviated stock of toric tools given above.

A stock with considerably less than one thousand items can be used for a considerable percentage of the lenses for iseikonic eyeglasses if suitable care is used in the selection of the types of lenses and their specifications from the A and B charts.

When the above given stocks of tools (or stocks of finished toric surfaces) are used it is necessary to use a lens of type (1) before one eye whenever it is possible to use a lens of either type (1) or (2) before that eye. This will be the case in all iseikonic eyeglasses which require a single lens before one eye and a double lens before the other eye. If for any reason it would be considered better to use type (2) lenses in these cases a slight change in the selection of the stock of toric tools (or stock of finished toric surfaces) will make this possible. In this case the positive toric tools to grind minus surfaces are such that the least curved meridian of any tool is in one-half diopter steps and such that there is a tool for each one-eighth diopter step of the difference in curvature of the two meridians. The negative toric tools to grind positive surfaces are such that the least curved meridian of any tool is in one-eighth diopter steps and such that there is a tool for each one-half diopter step of the difference in curvature of the two meridians.

No matter which selection is made, there will always be a relatively small number of iseikonic eyeglasses which require a single lens of the other type, before one or both eyes. On the average it is possible to use the stock tools (or stock surfaces) for one-fourth of these lenses. That is because the stock has tools for each one-half diopter of the difference in curvature of the two meridians while any specific lens may require this difference to be selected to the nearest multiple of one-eighth diopter. The remaining three-fourths of these lenses will require toric surfaces for which a tool must be especially made. The practical advantage of using two single lenses are so great, however, that this will be more practical than using a lens of a type for which toric tools (or surfaces) are in stock.

The essential phases of my invention as above described in detail are outlined in the flow sheet of Fig. 42 which includes the material steps from the clinical test to the finished spectacles ground and mounted according to my invention.

In the following, an example of a complete translation from the Clinical Record to the Specifications for Iseikonic Spectacles will be given, whereby the following equipment is assumed to be available:

1. Tables giving the $g$ and LM value for the dioptric test lenses used.
2. Graphs for $\Delta g$ and $\Delta$LM.
3. The complete nomograph for oblique principal meridians.
4. Translation "A" and "B" charts for $f_0 = 14.0$ millimeters for lenses of types (1), (2), (3), with $P_2 = \pm 6.00$D; (4), with $P_2 = +4.50$, $P_3 = -9.00$; and (5), with $P_2 = +3.00$, $P_3 = -12.00$.

This example will be helpful for a better understanding of the invention, especially if read by referring to the flow sheet Fig. 42 The translation of the far test only will be given for the sake of brevity, since the procedure for the near test is essentially similar.

The patient was examined in the opthalmo-eikonometer according to the above-mentioned Patent No. 2,095,235. His refractive errors were measured and corrected with trial lenses of the so-called "Tillyer" type, well known in the art, used in cells #1 and #2 of the instrument. His size differences were measured in the horizontal (180°) and vertical (90°) meridians with adjustable iseikonic test lenses calibrated in per cent. His angular differences were measured in the horizontal and vertical meridians with meridional magnifiers calibrated directly in the adopted unit; namely, one-hundredth (1/100) radian of difference. These measures were assumed sufficient to determine the size and angular differences of first importance, the other possible measurements being discarded as negligible. The above examination gave the following results laid down in a clinical record given below, which will be self-explanatory.

Patient: Mr. John Doe
Measured for distant (20 ft.) vision.

|  | Right eye | Left eye |
|---|---|---|
| Cell #1 | −0.75 sph. | −0.50 sph. |
| Cell #2 | −0.62 cy at 165 | −1.50 cy at 65 |
| Size | None | None |
| Difference {O. A. | +0.75% at 180 | +3.00% at 90 |
| Difference {Mer. | +1.50 | None |
| Angular {180° M | −1.30 | None |
| Difference {90° M |  |  |

According to the recommendations of the clinician, the refractive and eikonic errors as measured above are to be corrected with spectacles made up of forty (40) millimeters round lenses mounted with the plane of the centers of the spectacle eyewires at twelve (12.0) millimeters from the pole of the cornea.

The first step in the process of finding the specifications for the above spectacles is to transfer the above measurements to a so-called "iseikonic translation blank". This blank is so arranged as to standardize the process of looking up the various $g_D$, $g_1$, $LM_D$, $LM_1$, and $LM_2$ values. It is given below and will be referred to throughout the following description.

Patient: Mr. John Doe
Eye size 40. 20 feet. Worn at 12 mms.

| R | $\Delta X = 2$ | | L | |
|---|---|---|---|---|
| Cell #1 −0.75 | | | Cell #1 −0.50 | |
| Cell #2 −0.62 x 165 | | | Cell #2 −1.50 x 65 | |
| Size 0.75 x 180 | | | Size 3.00% x 90 | |

| Mer. | 75 | 165 | 65 | 155 |
|---|---|---|---|---|
| $g_d$ | 1.488 | 0.900 | 0.657 | 2.067 |
| $\Delta g$ | −0.004 | −0.001 | −0.001 | −0.008 |
| $g_1$ | 1.484 | 0.899 | 0.656 | 2.059 |
| $LM_d$ | −2.41 | −0.92 | −0.40 | −3.96 |
| LOS | 0.00 | 0.00 | 0.00 | 0.00 |
| $LM_d$+LOS | −2.41 | −0.92 | −0.40 | −3.96 |
| K | +2.41 | +2.41 | +3.96 | +3.96 |
| $LM_d$+LOS+K | 0.00 | 1.49 | 3.56 | 0.00 |
| LMS | 0.74 x 180 | | 2.95 x 90 | |
| $LM_1$+K | 0.88 | 0.48 | 3.01 | 2.63 |
| −K | −2.41 | −2.41 | −3.96 | −3.96 |
| $LM_1$ | −1.53 | −1.93 | −0.95 | −1.33 |
| $\Delta$LM | −0.27 | −0.15 | −0.10 | −0.39 |
| $LM_2$ | −1.80 | −2.08 | −1.05 | −1.72 |
| $LM_{2_0}$ | +0.03 | −0.25 | +0.78 | +0.11 |
| $P_1$ | −6.45  3−12 | −3.00  1−2 | −2.80  1.5−2.5 | −8.12 |
|  | 13.78 | 11.07 | 11.12  2−2 | 14.76 |
|  |  | (−3.33) | 11.03  1−3 | 14.63 |
|  | −6.87 (−6.79)  −3.37 | (−3.28) | 11.08  1.5−2.5 | 14.70 |
|  | 3.12 (.058) |  | (−3.08) |  |
|  | −12.25 |  | −3.12 (−3.07)  −8.62 (−8.51) |  |
|  | 1.00−2.00 |  | 3.12 (.028) |  |
|  |  |  | 1.50−2.50 |  |
|  | (14.07) |  |  | (15.05) |
|  | 14.25 (14.12) | 11.50 (11.35) | 11.50 (11.35) | 15.25 (15.09) |

The values of $g_D$ and $LM_D$ are found in tables giving these values for the above-mentioned trial lenses when used in cells #1 and #2 of the ophthalmo-eikonometer. They are entered under the proper meridian of each eye. The values of $\Delta g$ are found from a graph according to Fig. 40, giving the relation between $g$ and $\Delta g$ for various $\Delta f$'s, that is, differences of the desired position of mounting from the standard distance $f_0$ for which the A and B charts were computed and drawn. Adding $g_D$ and $\Delta g$ for each meridian gives the values $g_1$ which are to be used on the A and B charts.

The overall size change, in LM units, necessary before each eye is now to be added to the $LM_D$ values for each eye. Since the principal meridians are not parallel in this case it is necessary to use the nomographic procedure described with reference to Figs. 14 to 17 to find the values of $LM_1$ in each meridian of each eye. The first step in doing this is to add a suitable constant K to the values of $LM_D$ plus the overall size change found necessary, i. e., $LM_D + LOS$ so that the sum $LM_D + LOS + K$ is 0.00 in one meridian of each eye and positive in the other meridian. This constant K is not the same for the two eyes.

The under sheet of the nomograph is now moved so that its 0° line is directly under the 75° line of the middle sheet. The upper sheet of the nomograph is moved until its 65° line is directly over the 0° line of the under sheet.

Points are now plotted on the semi-transparency at 0°, 0.00; 90°, 1.49; according to the scales of the lower and middle sheets and the three points are connected by straight lines. These are the lines for the right eye. Points are also plotted on the semi-transparency at 0°, 3.56; 90°, 0.00; according to the scales on the lower and upper sheets and these points are also connected by straight lines. These are the lines for the left eye.

The separation in LM of the lines for the two eyes where they cross the 0° line of the lower sheet is now corrected for the measured necessary size change in the horizontal meridian. This is done by plotting a point 2.96 units above where the line for the left eye crosses the 0° line. In the same way a point is plotted 0.74 unit above where the line for the right eye crosses the 90° line. The lines for the spectacles must have the corrected separations where they cross the 0° and 90° lines in order to correct the measured size differences in the horizontal and vertical meridians.

The fourth transparency, that is, the one according to Fig. 18 used to find the angular deviation due to lenses is now used to find the deviation for the dioptric test lenses. These deviations are given below:

| | Right eye | | Left eye | |
|---|---|---|---|---|
| Meridian | 180° | 90° | 180° | 90° |
| Deviation | −0.36 | +0.38 | +1.32 | −1.35 |

The deviation of the R. E. with relation to the L. E. is now found by subtracting the L. E. deviation from the R. E. deviation, as below:

| Meridian | 180 | 90 |
|---|---|---|
| R. E. | −0.36 | +0.38 |
| L. E. | +1.32 | −1.35 |
| R. E.−L. E. | −1.68 | +1.73 |

The clinical record shows that the R. E. must be given a deviation of +1.50 units in the 180° meridian and −1.30 units in the 90° meridian in addition to the deviation given by the dioptric test lenses if the angular differences are to be fully corrected. Hence, in order to find the required deviation of the spectacles it is necessary to add these measured values to the values found above, as follows:

| Meridian | 180 | 90 |
|---|---|---|
| [R. E.−L. E.]$_D$ | −1.68 | +1.73 |
| [R. E.−L. E.]$_E$ | +1.50 | −1.30 |
| [R. E.−L. E.] | −0.18 | +0.43 |

In this example it is assumed that the order of importance of the various corrections is as follows: Of primary importance are the size in the horizontal and vertical meridians. Next in importance is the angular difference in the horizontal meridian, and least important is the angular difference in the vertical meridian.

Next, trial lines are drawn on the nomograph which have the correct separations in LM on the 0° and 90° lines of the lower transparency. The differences in angular deviation for these trial lines are determined and compared with the desired differences.

The first trial lines used are those found by drawing new lines for the right eye through the intersection of the lines for the dioptric test lenses and the 0° line, and through the plotted point on the 90° line; and by drawing new lines for the left eye through the intersection of the lines for the dioptric test lenses and the 90° line and the plotted point on the 0° line.

The angular deviations are now determined with the following results:

| Meridian | 180 | 90 |
|---|---|---|
| R. E. | −0.14 | +0.14 |
| L. E. | −0.40 | +0.40 |
| R. E.−L. E. | +0.26 | −0.26 |

Comparing them with the desired angular deviations, new lines are drawn for the right eye. After some experience, suitable lines can be easily drawn. Lines are now drawn for the left eye which have the required separation in LM on the 0° and 90° lines from the new lines for the right eye. The angular deviations for the second trial lines are now determined with the aid of the transparency, as before, with the following results:

| Meridian | 180 | 90 |
|---|---|---|
| R. E. | +0.07 | −0.07 |
| L. E. | +0.15 | −0.15 |
| R. E.−L. E. | −0.08 | +0.08 |

In this example, these deviations are assumed sufficiently close to the desired ones for all practical purposes, especially since inspection of the trial lines shows that the more exactly angular differences are corrected, the required lenses become less desirable from the point of view of practical requirements (a), (b), and (c). Thus judgment is used to reach a compromise between the amount of angular difference remaining and the impracticability of the spectacles.

The LM value where the last trial line for the R. E. crosses the 0° line of the middle transparency is then the value $LM_1 + K$ in the 75° meridian of the R. E.; where it crosses the 90° line of the middle transparency is the value $LM_1 + K$ in the 165° meridian of the R. E. In the same way, the LM value where the last trial line for the left eye crosses the 0° line of the upper transparency is the value of $LM_1 + K$ in the 65° meridian of the L. E., and where it crosses the 90° line of the upper transparency is the value of $LM_1 + K$ in the 155° meridian of the L. E. These values are read on the scale of the lower transparency and entered under the appropriate meridian on the translation blank. Subtracting the previously used value of K from each of these, gives the values of $LM_1$.

Figure 41:
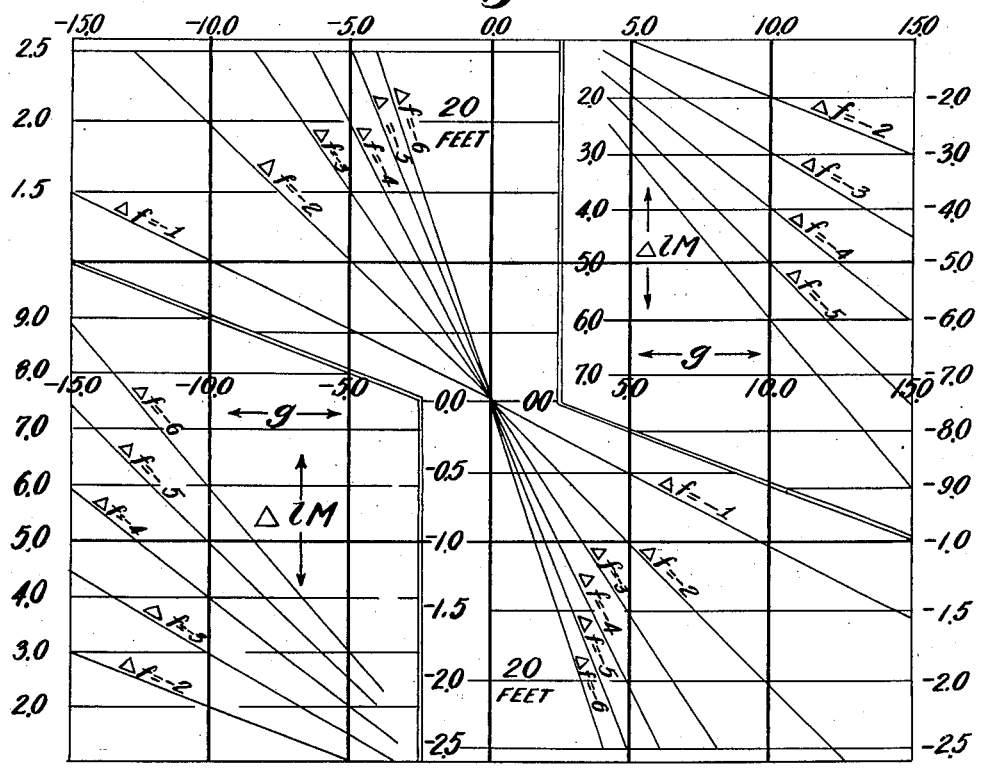
Fig. 41 is a chart for obtaining modified LM values.

The values of $\Delta LM$ are now found from the graph according to Fig. 41 giving the relation between $g$ and $\Delta LM$ for various $\Delta f$'s and entered in the translation blank. Addition of $LM_1$ and $\Delta LM$ gives the value of $LM_2$.

The proper section of the A chart (compare

Figs. 20 to 35) for lenses of type (1); in this case the section from $g=0.00$ to $g=+3.00$, is now placed under the K sheet and the values $g_1$ and $LM_2$ are plotted on the K sheet using the coordinates of the A chart. It should be noticed that since the principal meridians are not parallel all the points must be plotted on the K sheet.

An inspection of the lines under the plotted points shows at once that lenses of types (1) and (2) can not be used for either eye. A register mark is placed on the K sheet and the corresponding section of the A chart for lenses of type (3) is placed in proper position under the K sheet. Inspection shows that the lens for the R. E. will require about 5 D. difference in power of the ocular surface between the two meridians. It also shows that the lens for the L. E. will require approximately 10 D. difference in power of the ocular surface between the principal meridians. Both these values are too high to meet the practical requirements.

Therefore, the proper section of the A chart for lenses of type (4) is now placed in proper position under the K sheet. Inspection shows that the R. E. lens will require approximately 4 D. difference in power of the ocular surface between the two meridians and the L. E. lens approximately 7 D. difference. A lens of type (4) could be used for the R. E. but for practical reasons it is better to use lenses of type (5) before both eyes.

The proper section of the A chart for lenses of type (5) is now placed in proper position under the K sheet. The A roll is adjusted until the plotted points are so placed that lenses with the $g$ and LM values which are under the plotted points meet practical requirements (a), (b), and (c). In this example more weight is placed on practical requirements (a) and (b) than upon (c).

In order to use lenses of the best general appearance, it is desirable to have the lens nearest the eye somewhat thicker at the edge than in the center. Since the anterior surface of the lens nearest the eye is +3.00 for lenses of type (5), this is done by moving the A chart until the point which requires the least power of ocular surface lies on the −3.00 line for an estimated suitable combination of thicknesses. In this example, this is done by placing the point for the 165° meridian of the R. E. on the −3.00 line of the thickness combination; ocular lens, one millimeter thick; anterior lens, two millimeters thick; that is, on the −3.00 line of the 1—2 combination; since a quick inspection shows that two millimeters is sufficient thickness for the anterior lens. This inspection is made by noting, first, that in the 75° meridian of the right eye lens for thickness combination 1—2, the ocular surface power must be approximately −6.50 D. The auxiliary chart shows that this ocular surface will require the anterior surface of the anterior lens to be approximately +14.00 D. in the 75° meridian. The thickness chart shows that two millimeters is sufficient thickness for this power. The exact values of ocular surface power of the right eye lens are now found by graphical interpolation between the unit diopter lines of the 1—2 combination and noted on the translation blank. A new register mark is now placed on the K sheet and the values of $LM_{s_0}$, that is, the actual values of LM for the spectacle lens when mounted with the plane of the point of the bevel at the standard distance $f_0$ from the pole of the cornea, are noted. These values are convenient in later checking the accuracy of manufacture.

The points for the L. E. are now examined and a trial is made with thickness combination 1—3. This combination is tried since one meridian requires a high ocular surface power. This requires a high anterior surface power which in turn will require a greater thickness of the anterior lens. The A chart, the auxiliary B, and the thickness chart give the following approximate results for the L. E. lens:

| Mer. | Ocular surface | Anterior surface | Thickness of anterior lens required |
|---|---|---|---|
| 155 | −7.80 D. | 14.50 D. | 2.10 mms. |

This means that three millimeters thickness will not be required for the anterior lens. Inspection of the A charts shows that as the thickness of the anterior lens decreases the power of both ocular and anterior surface must increase. Hence, the next trial is made about half-way between the thickness used and the required thickness found.

The new trial is therefore made with thickness combination 1—2.6. This gives:

| Mer. | Ocular surface | Anterior surface | Thickness of anterior lens required |
|---|---|---|---|
| 155 | −8.50 D. | +15.00 D. | 2.40 mms. |
| 65 | −2.80 D. | | |

Now the thickness 1.0 for the ocular lens is no longer sufficient, especially in view of the large difference in power between the two meridians since this large difference makes flexure during grinding more likely. Hence, another trial is made for thickness combination 1.5—2.5. The lines for this combination are easily found by graphical interpolation since they lie half-way between the lines for the 2—2 and 1—3 combinations. This gives:

| Mer. | Ocular surface | Anterior surface | Thickness of anterior lens required |
|---|---|---|---|
| 155 | −8.10 D. | +14.80 D. | 2.30 mms. |
| 65 | −2.80 D. | +11.00 D. | |

This combination of thickness is satisfactory from a practical point of view. The above values of the ocular surface curvature for the left eye lens are now entered under the appropriate meridians on the translation blank.

The values of $g_1$ and $P_1$ in each meridian are now plotted on the B chart and the exact values of $P_4$ are found by interpolation between the unit $P_4$ lines on the chart. For the left eye lens, the values of $P_4$ for both the 2—2 combination and the 1—3 combination are found. The value for the 1.5—2.5 combination is then found by linear interpolation.

The above procedure gives the values of the ocular surface powers, the thickness of the components, and the anterior surface powers of two lenses of type (5) which, when mounted in a spectacle frame the eyewires of which are at twelve (12) millimeters from the pole of the cornea, will substantially correct the refractive and eikonic errors found on the ophthalmo-eikonometer.

In order to meet practical requirement (a), the exact specifications found above are now changed slightly in order that the necessary surfaces may be ground using a stock of surface tools. These changes are made in such a manner that no substantial error is introduced.

It is assumed in this example that there are available surface tools or stock toric surfaces on semi-finished lenses with the following specifications. Positive toric surfaces or negative toric tools for each one-half D. value for the meridian of least power with each one-eighth D. difference in power of the two meridians. Negative toric surfaces for each one-eighth D. value for the meridian of least power (absolute value) with each one-half D. difference in power of the two meridians.

It is also assumed that the above stock of tools is in the conventional power units, which are in terms of 1.530 index of refraction rather than in terms of 1.5230 index of refraction, which is the true value for the glass used for ophthalmic lenses. The relation between the two systems of units is a simple one given by the following equation:

$$P_{1.523} = P_{1.530} \times \frac{0.523}{0.530}$$

From this equation a table can be easily prepared giving the 1.5230 powers for each one-eighth D. step in 1.530 power. Such a table is assumed available in this example.

The first step is to substitute for the exact value found for the least power of one of the positive toric surfaces the nearest half value of index 1.530 power. In this example this is done for the 165° meridian of the R. E. The next higher value is selected in this particular instance in order that the value of the least curvature of the negative toric surface may not be less than −3.00, which would be undesirable since the ocular lens is only one millimeter thick. The value 11.50 is selected and the index 1.523 power of this is noted, being distinguished by placing it in parentheses. It is 11.35. This means that 11.35−11.07=0.28 D. has been added to the positive surface power in the 165° meridian. In order to keep the sum of $P_1+P_4$ the same as the specifications this same value must be subtracted from the negative surface power in the 165° meridian; i. e., −3.00−0.28=−3.28. This value is noted, being enclosed in parentheses since it is an index 1.523 power. The nearest one-eighth D. 1.530 power is now found and the exact value of the index 1.523 power is noted above.

The next step is to select the nearest one-half D. difference in power for the 75° meridian, being careful to select that one-half D. value which leaves the change made nearest the same in both meridians. This is done by first correcting the value given in the exact specifications by the change made in the 165° meridian and substituting the nearest one-half D. difference to this corrected value. The value in the 165° meridian is 0.33 less than the specified value. Hence, 0.33 is subtracted from −6.45 giving −6.78. The nearest one-half D. difference to this is −6.87 index 1.530 power, which is −6.79 index 1.523 power. These values are noted. 0.34 D. has been subtracted and hence, the same value is added to the positive power in the 75° meridian giving 14.12. The nearest one-eighth D. index 1.530 power which leaves the error in the sum nearest to the error in the 165° meridian is now selected. The error in the 165° meridian is −0.05 D. Hence, the nearest one-eighth D. value to 14.07 is selected. This is 14.25 index 1.530 power which is exactly 14.07 index 1.523 power.

Instead of using the exact values for $P_2$ and $P_3$, namely, +3.00 and −12.00, the values are used which are as nearly as possible even one-eighth D. steps in index 1.530 power and the sum of whose index 1.523 powers is −9.00. Such values are +3.12 and −12.25.

The average error in the sum of $P_1$ and $P_4$ is now corrected on one of these spherical surfaces. The average error is −0.05 D. Hence, +0.05 D. is added to the +3.12 surface giving the final value +3.12 (.05 strong).

The selection of the nearest one-half D. index 1.530 power for the meridian of lowest positive power for the L. E. lens is made in such a way that the change made in this selection is nearest to the average change made in the two meridians of the R. E. lens multiplied by the "equivalent thickness" of the R. E. lens divided by the "equivalent thickness" of the L. E. lens. The average change is ½(0.29+0.28)=+0.29. Hence, 11.08 is corrected by 0.29×8.3/9.3=0.26 to 11.08+0.26= 11.34 and the nearest one-half D. index 1.530 power is substituted for this. It is 11.50 (11.35).

The procedure for the L. E. lens is exactly the same, after the first selection, as that described above for the R. E. lens.

The above procedure thus gives the specifications of the iseikonic spectacles as follows:

DISTANT VISION

*Right eye*

| Lens nearest eye | Ocular surface | −3.37 (165°) to −6.87 (75°). |
|---|---|---|
| | Thickness | 1.00. |
| | Anterior surface | +3.12 (.05 S). |
| Lens farthest from eye | Ocular surface | −12.25. |
| | Thickness | 2.00. |
| | Anterior surface | +11.50 (165°) to +14.25 (75°). |

*Left eye*

| Lens nearest eye | Ocular surface | −3.12 (65°) to −8.62 (155°). |
|---|---|---|
| | Thickness | 1.50. |
| | Anterior surface | +3.12 (.02 S). |
| Lens farthest from eye | Ocular surface | −12.25. |
| | Thickness | 2.50. |
| | Anterior surface | +11.50 (65°) to +15.25 (155°). |

Mount finished spectacles with center of rims 12 mm. from cornea.

A rough check, sufficient to detect some gross clerical errors, and which can be quickly performed is to add the surface powers given in the final specifications for each meridian of each eye and compare these sums with the total power of the dioptric test lenses in the same meridians.

The rough check for this example is given below in tabular form. The total power of the dioptric test lenses is in brackets, the difference between the sum and the total power is underlined.

*Rough check*

| | Right Eye | | Left Eye | |
|---|---|---|---|---|
| Mer | 75 | 165 | 65 | 155 |
| | −6.87 | −3.37 | −3.12 | −8.62 |
| | −12.25 | −12.25 | −12.25 | −12.25 |
| | −19.12 | −15.62 | −15.37 | −20.87 |
| | +3.17 | +3.17 | +3.14 | +3.14 |
| | +14.25 | +11.50 | +11.50 | +15.25 |
| | +17.42 | +14.67 | +14.64 | +18.39 |
| | −19.12 | −15.62 | −15.37 | −20.87 |
| | −1.70 | −0.95 | −0.73 | −2.48 |
| | [−1.37] | [−0.75] | [−0.50] | [−2.00] |
| | −0.33 | −0.20 | −0.23 | −0.48 |

Below, several examples are given of spectacles according to my invention, of various types above discussed. In each instance, the clinical record is followed by the specification for the finished spectacles. In examples (1) to (3), it was not necessary to consider a difference between near and distant vision. In example (4) this was necessary.

(1) Spectacles with both lenses of type (1):

CLINICAL RECORD

*Distance*

| Power | Right eye | Left eye |
|---|---|---|
| Cell No. 1 | −5.50 | −5.50 |
| Cell No. 2 | −1.00 X 85 | −1.00 X 90 |
| Size | 1.50% 0 | |

Eye size: 40 mm.
Distance eyewire-cornea: 11 mm.

SPECIFICATIONS FOR FINISHED SPECTACLES

*Distance*

Right eye

| Lens nearest eye | Ocular surface | −8.50 (.01 S) |
|---|---|---|
| | Thickness | 0.50 |
| | Anterior surface | +2.00 X 175 to +2.87 |
| | Bevel | 1.38 mms. |

Left eye

| Lens nearest eye | Ocular surface | −15.12 (.04 S) |
|---|---|---|
| | Thickness | 0.50 |
| | Anterior surface | +8.50 X 180 to +9.37 |
| | Bevel | 1.28 mms. |

Mount finished spectacles with center of rims 11 mm. from cornea.

(2) Spectacles with one lens of type (1) and one lens of type (2):

CLINICAL RECORD

*Distance*

| Power | Right eye | Left eye |
|---|---|---|
| Cell No. 1 | −1.00 | −0.62 |
| Cell No. 2 | −1.00 X 15 | −1.00 X 165 |
| Size | 1.00% 0 to 0.50 X 90 | |

Eye size: 40 mm.
Distance eyewire-cornea: 12 mm.

SPECIFICATIONS FOR FINISHED SPECTACLES

*Distance*

Right eye

| Lens nearest eye | Ocular surface | −12.75 (.03 S) |
|---|---|---|
| | Thickness | 3.00 |
| | Anterior surface | +10.50 (105°) to +11.50 (15°) |
| | Bevel | 1.32 mms. |

Left eye

| Lens nearest eye | Ocular surface | −2.62 (165°) to −3.62 (75°) |
|---|---|---|
| | Thickness | 2.80 |
| | Anterior surface | +2.00 |
| | Bevel | 1.54 mms. |

Mount finished spectacles with center of rims 12 mm. from cornea.

(3) Spectacles with one lens of type (1) and one lens of type (4):

CLINICAL RECORD

*Distance*

| Power | Right eye | Left eye |
|---|---|---|
| Cell No. 1 | +0.37 | +0.12 |
| Cell No. 2 | −1.00 X 180 | −1.25 X 5 |
| Size | | 0.75% 0 to 0.75%X180 |

Eye size: 40 mm.
Distance eyewire-cornea: 12 mm.

SPECIFICATIONS FOR FINISHED SPECTACLES

*Distance*

Right eye

| Lens nearest eye | Ocular surface | −6.12 (.06 S) |
|---|---|---|
| | Thickness | 3.00 |
| | Anterior surface | +5.50 (90°) to +6.50 (180°) |
| | Bevel | 1.41 mms. |

Left Eye

| Lens nearest eye | Ocular surface | −6.00 (5°) to −8.00 (95°) |
|---|---|---|
| | Thickness | 1.00 |
| | Anterior surface | +4.37 (.04 S) |

| Lens farthest from eye | Ocular surface | −9.00 |
|---|---|---|
| | Thickness | 2.00 |
| | Anterior surface | +10.50 (5°) to +11.25 (95°). |

Mount finished spectacles with center of rims 12 mm. from cornea.

(4) Spectacles with both lenses of type (4) with bifocal addition:

CLINICAL RECORD

*Distance or near*

| Power | Right Eye | Left Eye |
|---|---|---|
| Cell No. 1 | +0.25 | None |
| Cell No. 2 | −2.25 X 95 | −3.00 X 85 |
| Size | | 2.00% X 90 |

Add+2.25 O. U.—Bifocal
Eye size: 40 mm.
Distance eyewire-cornea: 12 mm.

SPECIFICATIONS FOR FINISHED SPECTACLES

*Bifocal distance*

Right eye

| Lens nearest eye | Ocular surface | −4.50 (5°) to −6.00 (95°). |
|---|---|---|
| | Thickness | 1.30. |
| | Anterior surface | +4.44 [Add +2.25 Ful-Vue]. |

| Lens farthest from eye | Ocular surface | −9.00 (.01 S). |
|---|---|---|
| | Thickness | 1.70. |
| | Anterior surface | +7.00 (5°) to +10.62 (95°). |

Left eye

| Lens nearest eye. | Ocular surface | −4.50 (85°) to −7.50 (175°). |
|---|---|---|
| | Thickness | 1.50. |
| | Anterior surface | +4.44 [Add +2.25 Ful-Vue]. |

| Lens farthest from eye | Ocular surface | −9.00 (.03 S). |
|---|---|---|
| | Thickness | 1.50. |
| | Anterior surface | +9.00. |

Mount finished spectacles with center of rims 12 mm. from cornea.

It should be understood that the present disclosure is for the purpose of illustration only and that this invention includes all modifications and equivalents which fall within the scope of the appended claims.

I claim:

1. Spectacles for correcting eikonic defects comprising frames, and eyeglasses whose surfaces are symmetric to the principal meridians of their respective eyes and which are associated with dioptric and eikonic defects of said eyes in the principal and eikonic meridians thereof as determined by ophthalmo-eikonometric tests, by substantially fulfilling the conditions $$[g]R^{m}_{spec} = [g]R^{m}_{test} \quad 1'$$

$$[g]L^{n}_{spec} = [g]L^{n}_{test} \quad 2'$$

$$[g]R^{m+90°}_{spec} = [g]R^{m+90°}_{test} \quad 3' \Bigg\} I$$

$$[g]L^{n+90°}_{spec} = [g]L^{n+90°}_{test} \quad 4'$$

$$\frac{[M]R^{90°}_{spec}}{[M]L^{90°}_{spec}} = \frac{[M]R^{90°}_{test}}{[M]L^{90°}_{test}} \quad 5'$$

$$\frac{[M]R^{180°}_{spec}}{[M]L^{180°}_{spec}} = \frac{[M]R^{180°}_{test}}{[M]L^{180°}_{test}} \quad 6' \Bigg\} IIa$$

$$\frac{[M]R^{45°}_{spec}}{[M]L^{45°}_{spec}} = \frac{[M]R^{45°}_{test}}{[M]L^{45°}_{test}} \quad 7'$$

$$\frac{[M]R^{135°}_{spec}}{[M]L^{135°}_{spec}} = \frac{[M]R^{135°}_{test}}{[M]L^{135°}_{test}} \quad 8'$$

$$[A]R^{180°}_{spec} - [A]L^{180°}_{spec} = [A]R^{180°}_{test} - [A]L^{180°}_{test} \quad 9'$$

$$[A]R^{45°}_{spec} - [A]L^{45°}_{spec} = [A]R^{45°}_{test} - [A]L^{45°}_{test} \quad 10' \Bigg\} IIb$$

$$[A]R^{90°}_{spec} - [A]L^{90°}_{spec} = [A]R^{90°}_{test} - [A]L^{90°}_{test} \quad 11'$$

$$[A]R^{135°}_{spec} - [A]L^{135°}_{spec} = [A]R^{135°}_{test} - [A]L^{135°}_{test} \quad 12'$$

where $g$ is the reciprocal of the image distance from a point of reference, M is the angular magnification referred to said point and A is the angle between the image of an object line and a reference meridian through said point and the object line, where the letters R and L designate values for the right and left eyes, respectively, and where the superscripts denote visual meridians and the subscripts the spectacle and test corrections, respectively, said eyeglasses being fitted in said frames at predetermined distances of the eyewires from the eyes, at which they fulfill said conditions.

2. Spectacles according to claim 1 further characterized in that any deviations from said conditions are in inverse proportion to the importance of these deviations in the functioning of the eyes in binocular vision.

3. Spectacles according to claim 1 further characterized in that said predetermined eye wire distances are the same for both eyes.

4. Spectacles according to claim 1 comprising a fit over lens of zero vergence power with a selected magnification symmetric to a selected meridian before one eye.

5. Spectacles according to claim 1 comprising fit over lenses of zero vergence power with selected magnifications symmetric to a selected meridian before each eye.

6. Spectacles for correcting eikonic defects comprising frames, and eyeglasses each having surfaces symmetric to a meridian thereof and being associated with dioptric and eikonic defects of said eyes measured in the principal and eikonic meridians thereof substantially fulfilling the conditions $$[g]R^{m}_{spec} = [g]R^{m}_{test} \quad 1'$$

$$[g]L^{n}_{spec} = [g]L^{n}_{test} \quad 2' \Bigg\} I$$

$$[g]R^{m+90°}_{spec} = [g]R^{m+90°}_{test} \quad 3'$$

$$[g]L^{n+90°}_{spec} = [g]L^{n+90°}_{test} \quad 4'$$

$$\frac{[M]R^{90°}_{spec}}{[M]L^{90°}_{spec}} = \frac{[M]R^{90°}_{test}}{[M]L^{90°}_{test}} \quad 5'$$

$$\frac{[M]R^{180°}_{spec}}{[M]L^{180°}_{spec}} = \frac{[M]R^{180°}_{test}}{[M]L^{180°}_{test}} \quad 6' \Bigg\} IIa$$

$$\frac{[M]R^{45°}_{spec}}{[M]L^{45°}_{spec}} = \frac{[M]R^{45°}_{test}}{[M]L^{45°}_{test}} \quad 7'$$

$$\frac{[M]R^{135°}_{spec}}{[M]L^{135°}_{spec}} = \frac{[M]R^{135°}_{test}}{[M]L^{135°}_{test}} \quad 8'$$

$$[A]R^{180°}_{spec} - [A]L^{180°}_{spec} = [A]R^{180°}_{test} - [A]L^{180°}_{test} \quad 9'$$

$$[A]R^{45°}_{spec} - [A]L^{45°}_{spec} = [A]R^{45°}_{test} - [A]L^{45°}_{test} \quad 10' \Bigg\} IIb$$

$$[A]R^{90°}_{spec} - [A]L^{90°}_{spec} = [A]R^{90°}_{test} - [A]L^{90}_{test} \quad 11'$$

$$[A]R^{135°}_{spec} - [A]L^{135°}_{spec} = [A]R^{135°}_{test} - [A]L^{135°}_{test} \quad 12'$$

where $g$ is the reciprocal of the image distance from a point of reference, M is the angular magnification referred to said point and A is the angle between the image of an object line and a reference meridian through said point and the object line, where the letters R and L designate values for the right and left eyes, respectively, and where the superscripts denote visual meridians and the subscripts the spectacle and test corrections, respectively, said eyeglasses being fitted in said frames with said eyeglass meridians substantially coinciding with the principal meridians of the respective eyes.

7. Spectacles according to claim 6 further characterized in that any deviations from said conditions are in inverse proportion to the importance of these deviations in the functioning of the eyes in binocular vision.

8. The method of making iseikonic spectacles which comprises correcting the patient's eyes on a test instrument with dioptric test lenses involving change of image distance and of magnification with reference to principal meridians of astigmatism, and with eikonic test lenses involving change of magnification with reference to eikonic meridians of ocular image incongruity, said magnification changes defining for said meridians ratios of ocular image sizes of the respective eyes; determining for each eye a corrective change of image dimensions symmetric to said principal meridian of the respective eye and substantially effecting said image size ratios in said principal and eikonic meridians; making lenses which, for a given distance from the respective eyes, substantially effect in perpendicular lens meridians said change of focal distance and said corrective image change; and securing said lenses before the eyes at said given distances, with said lens meridians substantially in the corresponding principal meridians of the respective eyes.

9. The method of making substantially iseikonic spectacles which comprises testing the eyes by measuring dioptric defects in the principal dioptric meridians of the respective eyes and eikonic defects in the eikonic meridians, specifying these measurements in terms of image distances from a fixed point, of ratios of magnifications in respective eyes in said meridians, and of differences in angular deviation of the images of said eikonic meridians formed by the test means before the respective eyes, and providing for the respective eyes lenses whose surfaces are curved symmetrically to a single lens meridian for each eye and which produce said image distances in said principal meridians, have said magnification ratios in said principal and eikonic meridians before the respective eyes, and said differences in angular distortion when secured before the eyes with said lens meridians in the principal meridians of the respective eyes.

10. The method of making substantially iseikonic spectacles according to vergence power test data related to the principal meridians of the respective eyes and from magnification test data likewise related to said principal meridians but substantially including the correct magnification ratios for the eikonic meridians, which comprises invariably correlating said power and magnification test data for both eyes as related to corresponding principal meridians of each eye, correlating data of lens sections which can be practically manufactured as dependent upon vergence power and magnification for a given distance from a marginal lens point to the eye, varying said correlated magnification data by maintaining the vergence data until for the principal meridians of each individual eye practical lens sections are selected which satisfy said magnification data; making for each eye a lens system having in the principal meridians of the respective eye the selected sections, and securing said lens systems in frames at said given distance and with said sections in the corresponding principal meridians of the respective eyes.

11. The method of providing iseikonic spectacles which comprises the plotting of two ellipses, whose centrum vectors represent magnifications in ocular meridians at certain vector angles determined by ophthalmo-eikonic tests, in Cartesian systems as straight lines with logarithmical magnification and vector angle coordinates, said ellipses being drawn to satisfy in eikonic meridians the magnification ratios determined by said tests, reading the magnification values in the principal meridians of each eye as vectors in these meridians, making lenses for the respective eyes having meridional magnification values which are related to said meridional magnification values by conditions $$\left.\begin{array}{l} g_{SR}^{m}=g_{DR}^{m} \\ g_{SR}^{m+90}=g_{DR}^{m+90} \\ g_{SL}^{n}=g_{DL}^{n} \\ g_{SL}^{n+90}=g_{DL}^{n+90} \end{array}\right\} I(2)$$

and $$\left.\begin{array}{l} \dfrac{M_{SR}^{m}}{M_{SR}^{m+90}}=\dfrac{M_{1R}^{m}}{M_{1R}^{m+90}} \\ \dfrac{M_{SL}^{n}}{M_{SL}^{n+90}}=\dfrac{M_{1L}^{n}}{M_{1L}^{n+90}} \\ \dfrac{M_{SR}^{m}}{M_{SL}^{n}}=\dfrac{M_{1R}^{m}}{M_{1L}^{n}} \end{array}\right\} II(2)$$

where $g$ is the reciprocal of the image distance from a point of reference and M is the angular magnification referred to said point, where the superscripts denote visual meridians and where subscripts R and L denote the right and left eyes respectively, subscripts L and D denote size test and dioptric test values respectively, and 1 denotes said meridional magnification values, and mounting said lenses in frames securing coincidence of corresponding lens and principal eye meridians.

12. The method of providing iseikonic spectacles which comprises the plotting of two ellipses, whose centrum vectors represent magnifications in ocular meridians at certain vector angles as determined by ophthalmo-eikonic tests, in Cartesian systems as straight lines with logarithmical magnification and vector angle coordinates, said ellipses being drawn to satisfy in eikonic meridians the magnification ratios and angular relationship of eikonic meridian imaged by said magnifications, as determined by said tests, reading the magnification values in the principal meridians of each eye as vectors in these meridians, making lenses for the respective eyes having meridional magnification values which are related to said meridional magnification values by conditions $$\left.\begin{array}{l} g_{SR}^{m}=g_{DR}^{m} \\ g_{SR}^{m+90}=g_{DR}^{m+90} \\ g_{SL}^{n}=g_{DL}^{n} \\ g_{SL}^{n+90}=g_{DL}^{n+90} \end{array}\right\} I(2)$$

and $$\left.\begin{array}{l} \dfrac{M_{SR}^{m}}{M_{SR}^{m+90}}=\dfrac{M_{1R}^{m}}{M_{1R}^{m+90}} \\ \dfrac{M_{SL}^{n}}{M_{SL}^{n+90}}=\dfrac{M_{1L}^{n}}{M_{1L}^{n+90}} \\ \dfrac{M_{SR}^{m}}{M_{SL}^{n}}=\dfrac{M_{1R}^{m}}{M_{1L}^{n}} \end{array}\right\} II(2)$$

where $g$ is the reciprocal of the image distance from a point of reference and M is the angular magnification referred to said point, where the superscripts denote visual meridians and where subscripts R and L denote the right and left eyes respectively, subscripts L and D denote size test and dioptric test values respectively, and 1 denotes said meridional magnification values, and mounting said lenses in frames securing coincidence of corresponding lens and principal eye meridians.

13. The method of making iseikonic spectacles which comprises substantially correcting the dioptric and eikonic defects of the prospective wearer symmetrically to the principal and eikonic meridians, respectively, logarithmically plotting against the meridional angles as straight lines, ellipses which represent dioptric correction magnification symmetrical to the principal meridians of each eye, respectively, reading the values of the ratios of these dioptric magnifications in said eikonic meridians, adding in said eikonic meridians values representing ratios of eikonic magnifications of correction, drawing ellipses representing the total magnification, for each eye, respectively, by practically maintaining the directions of the major and minor axes of the ratios of magnification in the eikonic meridians of the total magnifications, making lenses with surfaces symmetrical to perpendicular meridians and producing, in said perpendicular meridians magnifications which are related to the magnifications indicated by said total magnification ellipses by conditions $$\left.\begin{array}{l} g^m_{SR} = g^m_{DR} \\ g^{m+90}_{SR} = g^{m+90}_{DR} \\ g^n_{SL} = g^n_{DL} \\ g^{n+90}_{SL} = g^{n+90}_{DL} \end{array}\right\} \mathrm{I}(2)$$

and $$\left.\begin{array}{l} \dfrac{M^m_{SR}}{M^{m+90}_{SR}} = \dfrac{M^n_{1R}}{M^{n+90}_{1R}} \\ \dfrac{M^n_{SL}}{M^{n+90}_{SL}} = \dfrac{M^n_{1L}}{M^{n+90}_{1L}} \\ \dfrac{M^m_{SR}}{M^n_{SL}} = \dfrac{M^n_{1R}}{M^n_{1L}} \end{array}\right\} \mathrm{II}(2)$$

where $g$ is the reciprocal of the image distance from a point of reference and M is the angular magnification referred to said point, where the superscripts denote visual meridians and where subscripts R and L denote the right and left eyes respectively, subscripts L and D denote size test and dioptric test values respectively, and 1 denotes values of said total magnification ellipses, and producing, in said perpendicular meridians, the vergence power of said dioptric test correction, and placing said lenses in frames securing coincidence of corresponding lens meridians and principal meridians of the eyes.

14. The method of providing iseikonic spectacles having substantially the powers of dioptric test corrections referred to principal meridians, and having the magnification ratios of said dioptric test corrections and of eikonic test corrections referred to eikonic meridians, which method comprises the plotting of two parameter ellipses, whose centrum vectors represent magnifications in ocular meridians at the vector angles, as straight lines in Cartesian systems with logarithmical magnification coordinates over vector angle coordinates and with the axes at the angles of corresponding principal meridians, said ellipses being selected to have in the eikonic meridians of the respective eyes magnification ratios, appearing in said systems as straight distances, substantially corresponding to the combined magnification ratios of said test corrections, reading the magnification parameters of said parameter ellipses in the principal axes, defining the properties including their distance from the eye, of series of lens sections which can be practically manufactured by their power and magnification plotted as Cartesian coordinates, fixing said test powers and said combined magnifications for each eye and principal meridians in similar coordinates, selecting from said plotted practical lens sections by relative shifting of said coordinates in a manner which does not substantially affect the powers and the ratios of the magnifications laid down in said similar coordinates, making lenses with said selected sections of respective principal meridians in perpendicular lens meridians, and fastening said lenses in frames securing said distances and the substantial coincidence of corresponding lens and principal meridians.

15. The method of providing iseikonic spectacles fulfilling the conditions of having substantially the powers of dioptric test corrections referred to principal meridians, of having substantially the magnification ratios of said dioptric test corrections and of eikonic test corrections referred to eikonic meridians, and of forming images of the eikonic meridians having substantially the angular relationships of predetermined test values, which method comprises the plotting of two parameter ellipses, whose centrum vectors represent magnifications in ocular meridians at the vector angles, as straight lines in Cartesian systems with logarithmical magnification coordinates over vector angle coordinates and with the axes at the angles of corresponding principal meridians, said ellipses being selected to have in the eikonic meridians of the respective eyes magnification ratios, appearing in said systems as straight distances, substantially corresponding to the combined magnification ratios of said test corrections, finding the angle deviations inherent in the magnifications in said principal meridians by superposing upon said parameter ellipses an iso deviation representation indicating for any point of a parameter ellipse the angle deviation caused at the meridian of said point by the magnification represented by said ellipse, correcting for the eikonic meridians said inherent deviations approximately to correspond to said test values by changing the slope of said straight lines by substantially maintaining said ratios to obtain optimum compliance with said conditions, reading the principal axes of the corrected parameter ellipses as magnification parameters, making lenses with surfaces symmetrical to perpendicular meridians and producing in said perpendicular meridians the optical effects defined by said corrected parameter ellipses and fastening said lenses in frames securing the substantial coincidence of corresponding perpendicular lens and principal meridians.

16. The method of making iseikonic spectacles having specified powers and magnification ratios in perpendicular lens meridians, which correspond to powers and magnification ratios determined from test corrections, which method comprises charting series of lens sections of varying surface properties which can be practically manufactured, thickness, power and distance from the eye for constant bevel distance plotted as curves defined by the corresponding power and magnification values as abscissas and logarithmic ordinates, respectively, of a Cartesian system, fixing said specified powers and ratios as four points, one for each principal meridian of each eye, in a similar system, and selecting practical lens sections by relatively moving said systems along the abscissa direction until corresponding points of each eye approximately coincide with curves for selected lenses, thereby keeping the power value ordinates constant due to the manner of moving and the magnification ratios unchanged due to the logarithmic magnification scales, making lenses having in perpendicular meridians said selected sections, and placing said lenses in frames fixing said bevel distance and securing coincidence of corresponding perpendicular lens and principal meridians.

ARTHUR F. DITTMER.